US010803475B2

United States Patent
Rao et al.

(10) Patent No.: US 10,803,475 B2
(45) Date of Patent: Oct. 13, 2020

(54) METHODS AND APPARATUS TO COMPENSATE FOR SERVER-GENERATED ERRORS IN DATABASE PROPRIETOR IMPRESSION DATA DUE TO MISATTRIBUTION AND/OR NON-COVERAGE

(71) Applicant: The Nielsen Company (US), LLC, New York, NY (US)

(72) Inventors: Kumar Nagaraja Rao, Fremont, CA (US); Tianjue Luo, Sunnyvale, CA (US); Albert Ronald Perez, San Francisco, CA (US); Stephen S. Bell, McHenry, IL (US); Mimi Zhang, San Francisco, CA (US); David Wong, New York, NY (US); Jennifer Haskell, Sunnyvale, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/247,254

(22) Filed: Jan. 14, 2019

(65) Prior Publication Data

US 2019/0147466 A1 May 16, 2019

Related U.S. Application Data

(63) Continuation of application No. 14/560,947, filed on Dec. 4, 2014, now abandoned.
(Continued)

(51) Int. Cl.
*G06Q 30/02* (2012.01)
*H04W 4/18* (2009.01)
*H04W 4/21* (2018.01)

(52) U.S. Cl.
CPC ..... *G06Q 30/0203* (2013.01); *G06Q 30/0201* (2013.01); *G06Q 30/0241* (2013.01);
(Continued)

(58) Field of Classification Search
USPC ................................................ 705/7.11–7.42
See application file for complete search history.

(56) References Cited

U.S. PATENT DOCUMENTS

| 4,621,325 A | 11/1986 | Naftzger et al. |
| 4,658,290 A | 4/1987 | McKenna et al. |

(Continued)

FOREIGN PATENT DOCUMENTS

| AU | 2013205736 | 5/2013 |
| CN | H07262167 | 10/1995 |

(Continued)

OTHER PUBLICATIONS

J. Biel and D. Gatica-Perez, "The YouTube Lens: Crowdsourced Personality Impressions and Audiovisual Analysis of Vlogs," in IEEE Transactions on Multimedia, vol. 15, No. 1, pp. 41-55, Jan. 2013. (Year: 2013).*

(Continued)

*Primary Examiner* — Amber A Misiaszek
(74) *Attorney, Agent, or Firm* — Hanley, Flight & Zimmerman, LLC

(57) ABSTRACT

Methods and apparatus to compensate impression data for misattribution and non-coverage by a database proprietor are disclosed. An example method includes obtaining a count of media impressions occurring on a first type of computing device, a first portion of the media impressions corresponding to persons for whom demographic information is recognizable by a database proprietor and a second portion of the media impressions corresponding to persons for whom demographic information is unavailable to the database (Continued)

proprietor; and determining the demographic information for the second portion of the media impressions based on a first probability that media corresponding to the media impressions is accessed on the first type of computing device and based on a second probability that media is accessed on a second type of device.

24 Claims, 22 Drawing Sheets

Related U.S. Application Data

(60) Provisional application No. 62/030,571, filed on Jul. 29, 2014, provisional application No. 62/023,675, filed on Jul. 11, 2014, provisional application No. 62/014,659, filed on Jun. 19, 2014, provisional application No. 61/991,286, filed on May 9, 2014, provisional application No. 61/986,784, filed on Apr. 30, 2014, provisional application No. 61/979,391, filed on Apr. 14, 2014, provisional application No. 61/952,726, filed on Mar. 13, 2014.

(52) U.S. Cl.
CPC ..... *G06Q 30/0242* (2013.01); *G06Q 30/0245* (2013.01); *H04W 4/18* (2013.01); *H04W 4/21* (2018.02)

(56) References Cited

U.S. PATENT DOCUMENTS

| | | | |
|---|---|---|---|
| 5,113,518 | A | 5/1992 | Durst, Jr. et al. |
| 5,214,780 | A | 5/1993 | Ingoglia et al. |
| 5,584,050 | A | 12/1996 | Lyons |
| 5,594,934 | A | 1/1997 | Lu et al. |
| 5,675,510 | A | 10/1997 | Coffey et al. |
| 5,793,409 | A | 8/1998 | Tetsumura |
| 5,796,952 | A | 8/1998 | Davis et al. |
| 5,832,520 | A | 11/1998 | Miller |
| 5,848,396 | A | 12/1998 | Gerace |
| 5,870,740 | A | 2/1999 | Rose et al. |
| 5,948,061 | A | 9/1999 | Merriman et al. |
| 6,035,339 | A | 3/2000 | Agraharam et al. |
| 6,052,730 | A | 4/2000 | Feliciano et al. |
| 6,055,573 | A | 4/2000 | Gardenswartz et al. |
| 6,098,093 | A | 8/2000 | Bayeh et al. |
| 6,102,406 | A | 8/2000 | Miles et al. |
| 6,108,637 | A | 8/2000 | Blumenau |
| 6,138,155 | A | 10/2000 | Davis et al. |
| 6,141,694 | A | 10/2000 | Gardner |
| 6,223,215 | B1 | 4/2001 | Hunt et al. |
| 6,279,036 | B1 | 8/2001 | Himmel et al. |
| 6,286,140 | B1 | 9/2001 | Ivanyi |
| 6,415,323 | B1 | 7/2002 | McCanne et al. |
| 6,434,614 | B1 | 8/2002 | Blumenau |
| 6,457,010 | B1 | 9/2002 | Eldering et al. |
| 6,460,079 | B1 | 10/2002 | Blumenau |
| 6,529,952 | B1 | 3/2003 | Blumenau |
| 6,606,657 | B1 | 8/2003 | Zilberstein et al. |
| 6,637,029 | B1 | 10/2003 | Maissel et al. |
| 6,658,410 | B1 | 12/2003 | Sakamaki et al. |
| 6,704,787 | B1 | 3/2004 | Umbreit |
| 6,714,917 | B1 | 3/2004 | Eldering et al. |
| 6,839,680 | B1 | 1/2005 | Liu et al. |
| 6,877,007 | B1 | 4/2005 | Hentzel et al. |
| 6,993,590 | B1 | 1/2006 | Gauthier et al. |
| 7,039,699 | B1 | 5/2006 | Narin et al. |
| 7,092,926 | B2 | 8/2006 | Cerrato |
| 7,139,723 | B2 | 11/2006 | Conkwright et al. |
| 7,146,329 | B2 | 12/2006 | Conkwright et al. |
| 7,150,030 | B1 | 12/2006 | Eldering et al. |
| 7,152,074 | B2 | 12/2006 | Dettinger et al. |
| 7,159,023 | B2 | 1/2007 | Tufts |
| 7,181,412 | B1 | 2/2007 | Fulgoni et al. |
| 7,260,837 | B2 | 8/2007 | Abraham et al. |
| 7,272,617 | B1 | 9/2007 | Bayer et al. |
| 7,302,447 | B2 | 11/2007 | Dettinger et al. |
| 7,343,417 | B2 | 3/2008 | Baum |
| 7,363,643 | B2 | 4/2008 | Drake et al. |
| 7,386,473 | B2 | 6/2008 | Blumenau |
| 7,406,516 | B2 | 7/2008 | Davis et al. |
| 7,546,370 | B1 | 6/2009 | Acharya et al. |
| 7,590,568 | B2 | 9/2009 | Blumenau |
| 7,613,635 | B2 | 11/2009 | Blumenau |
| 7,634,786 | B2 | 12/2009 | Knee et al. |
| 7,644,156 | B2 | 1/2010 | Blumenau |
| 7,647,418 | B2 | 1/2010 | Ash et al. |
| 7,650,407 | B2 | 1/2010 | Blumenau |
| 7,653,724 | B2 | 1/2010 | Blumenau |
| 7,716,326 | B2 | 5/2010 | Blumenau |
| 7,720,963 | B2 | 5/2010 | Blumenau |
| 7,720,964 | B2 | 5/2010 | Blumenau |
| 7,743,394 | B2 | 6/2010 | Smith et al. |
| 7,756,974 | B2 | 7/2010 | Blumenau |
| 7,788,216 | B2 | 8/2010 | Li et al. |
| 7,805,332 | B2 | 9/2010 | Wilson |
| 7,853,969 | B2 | 12/2010 | Smith et al. |
| 7,882,054 | B2 | 2/2011 | Levitan |
| 7,882,242 | B2 | 2/2011 | Chen |
| 7,890,451 | B2 | 2/2011 | Cancel et al. |
| 7,925,694 | B2 | 4/2011 | Harris |
| 7,941,525 | B1 | 5/2011 | Yavilevich |
| 7,949,565 | B1 | 5/2011 | Eldering et al. |
| 7,949,639 | B2 | 5/2011 | Hunt et al. |
| 7,958,234 | B2 | 6/2011 | Thomas et al. |
| 7,962,603 | B1 | 6/2011 | Morimoto |
| 8,006,259 | B2 | 8/2011 | Drake et al. |
| 8,046,255 | B2 | 10/2011 | Bistriceanu et al. |
| 8,060,601 | B1 | 11/2011 | Brown et al. |
| 8,087,041 | B2 | 12/2011 | Fu et al. |
| 8,091,101 | B2 | 1/2012 | Smith et al. |
| 8,131,763 | B2 | 3/2012 | Tuscano et al. |
| 8,131,861 | B2 | 3/2012 | Butler et al. |
| 8,151,194 | B1 | 4/2012 | Chan et al. |
| 8,151,291 | B2 | 4/2012 | Ramaswamy |
| 8,180,112 | B2 | 5/2012 | Kurtz et al. |
| 8,229,780 | B2 | 7/2012 | Davidow et al. |
| 8,235,814 | B2 | 8/2012 | Willis et al. |
| 8,266,687 | B2 | 9/2012 | Baldry |
| 8,271,886 | B2 | 9/2012 | Lee et al. |
| 8,280,683 | B2 | 10/2012 | Finkler |
| 8,302,120 | B2 | 10/2012 | Ramaswamy |
| 8,307,006 | B2 | 11/2012 | Hannan et al. |
| 8,307,458 | B2 | 11/2012 | Kasahara et al. |
| 8,370,489 | B2 | 2/2013 | Mazumdar et al. |
| 8,412,648 | B2 | 4/2013 | Karypis et al. |
| 8,453,173 | B1 | 5/2013 | Anderson et al. |
| 8,484,511 | B2 | 7/2013 | Tidwell et al. |
| 8,494,897 | B1 | 7/2013 | Dawson |
| 8,495,198 | B2 | 7/2013 | Sim et al. |
| 8,504,411 | B1 | 8/2013 | Subasic et al. |
| 8,504,507 | B1 | 8/2013 | Srinivasaiah |
| 8,514,907 | B2 | 8/2013 | Wright et al. |
| 8,543,454 | B2 | 9/2013 | Fleischman et al. |
| 8,549,552 | B2 | 10/2013 | Ramaswamy et al. |
| 8,560,683 | B2 | 10/2013 | Funk et al. |
| 8,600,796 | B1 | 12/2013 | Sterne et al. |
| 8,626,901 | B2 | 1/2014 | Pugh et al. |
| 8,631,122 | B2 | 1/2014 | Kadam et al. |
| 8,660,895 | B1 | 2/2014 | Saurabh et al. |
| 8,676,740 | B2 | 3/2014 | Ueki |
| 8,683,504 | B2 | 3/2014 | Ramaswamy |
| 8,688,524 | B1 | 4/2014 | Ramalingam et al. |
| 8,699,855 | B2 | 4/2014 | Harper et al. |
| 8,700,457 | B2 | 4/2014 | Craft |
| 8,713,168 | B2 | 4/2014 | Heffernan et al. |
| 8,751,461 | B2 | 6/2014 | Abraham et al. |
| 8,775,332 | B1 | 7/2014 | Morris et al. |
| 8,831,362 | B1 | 9/2014 | Steffens |
| 8,843,626 | B2 | 9/2014 | Mazumdar et al. |
| 8,843,951 | B1 | 9/2014 | Sherrets et al. |
| 8,856,235 | B2 | 10/2014 | Zhou et al. |

(56) References Cited

U.S. PATENT DOCUMENTS

| | | |
|---|---|---|
| 8,898,689 B2 | 11/2014 | Georgakis |
| 8,909,638 B2 | 12/2014 | Lin et al. |
| 8,909,771 B2 | 12/2014 | Heath |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,071,886 B2 | 6/2015 | Shkedi |
| 9,075,865 B2 | 7/2015 | Lin et al. |
| 9,083,853 B2 | 7/2015 | Shkedi |
| 9,084,013 B1 | 7/2015 | Arini et al. |
| 9,092,797 B2 | 7/2015 | Perez et al. |
| 9,105,053 B2 | 8/2015 | Cao et al. |
| 9,117,217 B2 | 8/2015 | Wilson et al. |
| 9,210,208 B2 | 12/2015 | Ramaswamy et al. |
| 9,215,288 B2 * | 12/2015 | Seth .................. G06Q 30/0201 |
| 9,215,489 B2 | 12/2015 | Williams et al. |
| 9,215,502 B1 | 12/2015 | Sherrets et al. |
| 9,237,138 B2 | 1/2016 | Bosworth et al. |
| 9,269,049 B2 | 2/2016 | McCann et al. |
| 9,313,294 B2 | 4/2016 | Perez et al. |
| 9,491,090 B1 | 11/2016 | Kumar et al. |
| 9,582,809 B2 | 2/2017 | Perez et al. |
| 2002/0099609 A1 | 7/2002 | Nascenzi et al. |
| 2002/0129368 A1 | 9/2002 | Schlack et al. |
| 2003/0006911 A1 | 1/2003 | Smith et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0074252 A1 | 4/2003 | Chandler-Pepelnjak et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2003/0229900 A1 | 12/2003 | Reisman |
| 2004/0088212 A1 | 5/2004 | Hill |
| 2004/0107125 A1 | 6/2004 | Guheen et al. |
| 2004/0167763 A1 | 8/2004 | Liebman |
| 2004/0167928 A1 | 8/2004 | Anderson et al. |
| 2004/0186840 A1 | 9/2004 | Dettinger et al. |
| 2005/0106550 A1 | 5/2005 | Hayashi et al. |
| 2005/0144069 A1 | 6/2005 | Wiseman et al. |
| 2005/0166233 A1 | 7/2005 | Beyda et al. |
| 2005/0223093 A1 | 10/2005 | Hanson et al. |
| 2005/0257141 A1 | 11/2005 | Brandrud et al. |
| 2005/0267799 A1 | 12/2005 | Chan et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0156532 A1 | 7/2007 | Nyhan et al. |
| 2007/0198327 A1 | 8/2007 | Yazdani et al. |
| 2007/0208640 A1 | 9/2007 | Banasiak et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0086356 A1 | 4/2008 | Glassman et al. |
| 2008/0091639 A1 | 4/2008 | Davis et al. |
| 2008/0097806 A1 | 4/2008 | Hoover et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0076899 A1 | 3/2009 | Gbodimowo |
| 2009/0157512 A1 | 6/2009 | King |
| 2009/0171762 A1 | 7/2009 | Alkove et al. |
| 2009/0217315 A1 | 8/2009 | Malik et al. |
| 2009/0292587 A1 | 11/2009 | Fitzgerald |
| 2009/0300675 A1 | 12/2009 | Shkedi |
| 2009/0307084 A1 | 12/2009 | Monighetti et al. |
| 2009/0327026 A1 | 12/2009 | Bistriceanu et al. |
| 2010/0004977 A1 | 1/2010 | Marci et al. |
| 2010/0010866 A1 | 1/2010 | Bal et al. |
| 2010/0017049 A1 | 1/2010 | Swearingen et al. |
| 2010/0046553 A1 | 2/2010 | Daigle et al. |
| 2010/0076814 A1 | 3/2010 | Manning |
| 2010/0088152 A1 | 4/2010 | Bennett |
| 2010/0070621 A1 | 5/2010 | Urdan et al. |
| 2010/0121676 A1 | 5/2010 | Jackson |
| 2010/0153175 A1 | 6/2010 | Pearson et al. |
| 2010/0153544 A1 | 6/2010 | Krassner et al. |
| 2010/0161385 A1 | 6/2010 | Karypis et al. |
| 2010/0191689 A1 | 7/2010 | Cortes et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0016482 A1 | 1/2011 | Tidwell et al. |
| 2011/0041062 A1 | 2/2011 | Singer et al. |
| 2011/0087519 A1 | 4/2011 | Fordyce, II et al. |
| 2011/0093327 A1 | 4/2011 | Fordyce et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0282730 A1 | 11/2011 | Tarmas |
| 2011/0288907 A1 | 11/2011 | Harvey et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0072469 A1 | 3/2012 | Perez et al. |
| 2012/0078725 A1 | 3/2012 | Maitra et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0151079 A1 | 6/2012 | Besehanic et al. |
| 2012/0151322 A1 | 6/2012 | Lindsay et al. |
| 2012/0158490 A1 | 6/2012 | Naumeyer et al. |
| 2012/0158954 A1 | 6/2012 | Heffernan et al. |
| 2012/0166520 A1 | 6/2012 | Lindsay et al. |
| 2012/0143713 A1 | 7/2012 | Dittus et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0239407 A1 | 9/2012 | Lynch et al. |
| 2012/0239809 A1 | 9/2012 | Mazumdar et al. |
| 2012/0265606 A1 | 10/2012 | Patnode |
| 2012/0302222 A1 | 11/2012 | Williamson et al. |
| 2012/0310729 A1 | 12/2012 | Dalto et al. |

(56) References Cited

U.S. PATENT DOCUMENTS

| | | |
|---|---|---|
| 2012/0311017 A1 | 12/2012 | Sze et al. |
| 2012/0331137 A1 | 12/2012 | Olsen et al. |
| 2013/0007794 A1 | 1/2013 | Besehanic et al. |
| 2013/0013308 A1 | 1/2013 | Cao et al. |
| 2013/0014144 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0066713 A1 | 3/2013 | Umeda |
| 2013/0080263 A1 | 3/2013 | Goldman et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1 | 8/2013 | Oliver et al. |
| 2013/0204694 A1 | 8/2013 | Banister et al. |
| 2013/0210455 A1 | 8/2013 | Carlsson et al. |
| 2013/0212188 A1 | 8/2013 | Duterque et al. |
| 2013/0246389 A1 | 9/2013 | Osann, Jr. |
| 2013/0246609 A1 | 9/2013 | Topchy et al. |
| 2013/0254143 A1 | 9/2013 | Ueki et al. |
| 2013/0254787 A1 | 9/2013 | Cox et al. |
| 2013/0262181 A1 | 10/2013 | Topchy et al. |
| 2013/0282898 A1 | 10/2013 | Kalus et al. |
| 2013/0290070 A1 | 10/2013 | Abraham et al. |
| 2013/0297411 A1 | 11/2013 | Van Dana et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2013/0339991 A1 | 12/2013 | Ricci |
| 2014/0033317 A1 | 1/2014 | Barber |
| 2014/0040171 A1 | 2/2014 | Segalov et al. |
| 2014/0067950 A1 | 3/2014 | Winograd |
| 2014/0075004 A1 | 3/2014 | Van Dusen et al. |
| 2014/0108130 A1 | 4/2014 | Vos et al. |
| 2014/0122703 A1 | 5/2014 | Pugh et al. |
| 2014/0156761 A1 | 6/2014 | Heffernan et al. |
| 2014/0173646 A1 | 6/2014 | Ramaswamy |
| 2014/0233430 A1 | 8/2014 | Russell |
| 2014/0279074 A1 | 9/2014 | Chen et al. |
| 2014/0282665 A1 | 9/2014 | Arini |
| 2014/0298025 A1 | 10/2014 | Burbank et al. |
| 2014/0310058 A1 | 10/2014 | Aral et al. |
| 2014/0324544 A1* | 10/2014 | Donato .............. G06Q 30/0204 |
| | | 705/7.33 |
| 2014/0324545 A1 | 10/2014 | Splaine et al. |
| 2014/0337104 A1* | 11/2014 | Splaine .............. G06Q 30/0204 |
| | | 705/7.33 |
| 2014/0347991 A1 | 11/2014 | Blicker |
| 2015/0006752 A1 | 1/2015 | OHare et al. |
| 2015/0019322 A1 | 1/2015 | Alla et al. |
| 2015/0019327 A1 | 1/2015 | Mazumdar et al. |
| 2015/0046579 A1 | 2/2015 | Perez et al. |
| 2015/0052245 A1 | 2/2015 | McMillan |
| 2015/0181267 A1 | 6/2015 | Morales et al. |
| 2015/0193816 A1 | 6/2015 | Toupet et al. |
| 2015/0186403 A1 | 7/2015 | Srivastava et al. |
| 2015/0189500 A1 | 7/2015 | Bosworth et al. |
| 2015/0193813 A1 | 7/2015 | Toupet et al. |
| 2015/0222951 A1 | 8/2015 | Ramaswamy |
| 2015/0262207 A1 | 9/2015 | Rao et al. |
| 2015/0278858 A1 | 10/2015 | Lyons et al. |
| 2015/0332297 A1* | 11/2015 | Perez .................. G06Q 10/067 |
| | | 705/7.33 |
| 2015/0341684 A1 | 11/2015 | Kitts et al. |
| 2016/0189182 A1 | 6/2016 | Sullivan et al. |
| 2016/0191970 A1 | 6/2016 | Sheppard et al. |
| 2016/0269783 A1 | 9/2016 | Mowrer et al. |
| 2016/0350773 A1 | 12/2016 | Sullivan et al. |
| 2017/0004526 A1 | 1/2017 | Morovati et al. |
| 2017/0006342 A1 | 1/2017 | Nagaraja Rao et al. |
| 2017/0011420 A1 | 1/2017 | Sullivan et al. |
| 2017/0064411 A1 | 3/2017 | Goli et al. |

FOREIGN PATENT DOCUMENTS

| | | |
|---|---|---|
| CN | 2004504674 | 2/2004 |
| CN | 1898662 | 1/2007 |
| CN | 101077014 | 11/2007 |
| CN | 101222348 | 7/2008 |
| CN | 101505247 | 8/2009 |
| CN | 101536503 | 9/2009 |
| CN | 104520839 | 4/2015 |
| CN | 104541513 | 4/2015 |
| EP | 1059599 | 12/2000 |
| EP | 1379044 | 1/2004 |
| GB | 2176639 | 12/1986 |
| JP | 2001084272 | 3/2001 |
| JP | 2001282982 | 10/2001 |
| JP | 2001357192 | 12/2001 |
| JP | 2002163562 | 6/2002 |
| JP | 2002373152 | 12/2002 |
| JP | 2003044396 | 2/2003 |
| JP | 2003067289 | 3/2003 |
| JP | 2003519877 | 6/2003 |
| JP | 2006127320 | 5/2006 |
| JP | 2006127320 A | 5/2006 |
| JP | 2006127321 | 5/2006 |
| JP | 2007052633 | 3/2007 |
| JP | 2008234641 | 10/2008 |
| JP | 2008252536 A | 10/2008 |
| JP | 2009181459 | 8/2009 |
| JP | 2009259119 A | 11/2009 |
| JP | 2010039845 | 2/2010 |
| JP | 2010257448 | 11/2010 |
| JP | 2011015355 A | 1/2011 |
| JP | 2012068828 | 4/2012 |
| JP | 2012093970 | 5/2012 |
| JP | 2013544384 A | 12/2012 |
| KR | 20020037980 | 5/2002 |
| KR | 20120091411 | 8/2002 |
| KR | 100765735 | 10/2007 |
| KR | 20090020558 | 2/2009 |
| KR | 20100094021 | 8/2010 |
| KR | 20110017895 | 2/2011 |
| KR | 20110023293 | 3/2011 |
| KR | 20120123148 | 11/2012 |
| WO | 9617467 | 6/1996 |
| WO | 9628904 | 9/1996 |
| WO | 9641495 | 12/1996 |
| WO | 9809447 | 3/1998 |
| WO | 2000041115 | 7/2000 |
| WO | 0152168 | 7/2001 |
| WO | 0154034 | 7/2001 |
| WO | 200207054 | 1/2002 |
| WO | 3027860 | 4/2003 |
| WO | 2003027860 | 4/2003 |
| WO | 2005013072 | 2/2005 |
| WO | 2005024689 | 3/2005 |
| WO | 2005111897 | 11/2005 |
| WO | 2010104280 | 2/2010 |
| WO | 2010083450 | 7/2010 |
| WO | 2010088372 | 8/2010 |
| WO | 2010095867 | 8/2010 |
| WO | 2010104285 | 9/2010 |
| WO | 200152168 | 7/2011 |
| WO | 2011097624 | 8/2011 |
| WO | 2011127027 | 10/2011 |
| WO | 2012019643 | 2/2012 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014176343 | 10/2014 |
| WO | 2014179218 | 11/2014 |

(56) References Cited

FOREIGN PATENT DOCUMENTS

| | | |
|---|---|---|
| WO | 2014182764 | 11/2014 |
| WO | 2015005957 | 1/2015 |
| WO | 2015023589 | 2/2015 |

OTHER PUBLICATIONS

European Patent Office, "Communication Pursuant to Article 94(3) EPC" dated Jun. 9, 2020 in connection with European Patent Application No. 14885507.5, 6 pages.

United States Patent and Trademark Office, "Notice of Allowance," dated May 14, 2020 in connection with U.S. Appl. No. 16/525,218, 9 pages.

Braverman, Samantha, "Are the Online Marketing Efforts of TV Shows and Programs Worthwhile?" Mar. 30, 2011 (5 pages).

Danaher, Peter J., Journal of Marketing Research, vol. XXVIII, "A Canonical Expansion Model for Multivariate Media Exposure Distributions: A Generalization of the 'Duplication of Viewing Law,'" Aug. 1991 (7 pages).

Enoch, Glenn. and Johnson, Kelly. Journal of Advertising Research, "Cracking the Cross-Media Code: How to Use Single-Source Measures to Examine Media Cannibalization and Convergence," Jun. 2010 (13 pages).

Headen, Robert S., Klompmaker, Jay E. And Rust, Roland T., Journal and Marketing Research, vol. XVI, "The Duplication of Viewing Law and Television Media Schedule Evaluation," Aug. 1979 (9 pages).

Huang, Chun-Yao and Lin Chen-Shun, Journal of Advertising Research, vol. 35, No. 2, "Modeling the Audience's Banner Ad Exposure for Internet Advertising Planning," Summer 2006 (15 pages).

Nielsen, "How Teens Use Media: A Nielsen Report on the Myths and Realities of Teem Media Trends," Jun. 2009 (17 pages).

Arbitron Inc., Edison Research, "The Infinite Dial 2011: Navigating Digital Platforms," 2011 (83 pages).

Rust, Roland T., Klompmaker, Jay E., Journal for Advertising, vol. 10, No. 3, "A Comparative Study of Television Duplication Models," 1981 (6 pages).

Edwards, Jim. "Apple Wants More Advertisers to Use Its iPhone Tracking System." Business Insider. Jun. 13, 2013. Retrieved from <http://www.businessinsider.com/apples-idfa-and-ifa-tracking-system-2013-6>on Jul. 24, 2014. 2 pages.

Patent Cooperation Treaty, "International Search Report and Written Opinion of the International Searching Authority," issued in connection with Application No. PCT/US2014/031342, Jul. 28, 2014, 13 pages.

Facebook for Business. "Measuring Conversions on Facebook, Across Devices and in Mobile Apps" Aug. 14, 2014. Retrieved from <https://www.facebook.com/business/news/cross-device-measurement> on Aug. 14, 2014. 3 pages.

Japanese Patent Office, "Office Action" with English translation, issued in connection with application No. JP 2013-544887, dated Aug. 12, 2014, 21 pages.

Patent Cooperation Treaty, "International Search Report," issued in connection with Application No. PCT/US2014/035156, dated Aug. 25, 2014, 5 pages.

Patent Cooperation Treaty, "Written Opinion," issued in connection with Application No. PCT/US2014/035156, dated Aug. 25, 2014, 5 pages.

Patent Cooperation Treaty, "International Search Report and Written Opinion of the International Searching Authority," issued in connection with Application No. PCT/US2014/034389, dated Sep. 5, 2014, 15 pages.

European Patent Office, "Extended European Search Report," issued in connection with application No. EP 12760524.4, dated Aug. 18, 2014, 8 pages.

Patent Cooperation Treaty, "International Search Report and Written Opinion," issued in connection with Application No. PCT/US2014/035683, dated Sep. 12, 2014, 13 pages.

Patent Cooperation Treaty, "International Search Report and Written Opinion," issued in connection with Application No. PCT/US2014/037064, dated Sep. 12, 2014, 9 pages.

Adam et al., "Privacy Preserving Integration of Health Care Data," AMIS 2007 Symposium Proceedings, 6 pages.

Australian Government, IP Australia, "Examination Report," issued in connection with application No. AU 2013205736, dated Jun. 18, 2013, 2 pages.

Chloe Albanesius, Facebook Issues Fix for Several Tracking Cookies, internet article, www.pcmag.com, Sep. 28, 2011, 2 pages.

Emil Protalinski, Facebook denies cookie tracking allegations, internet article, www.zdnet.com, Sep. 25, 2011, 2 pages.

Emil Protalinski, Facebook fixes cookie behavior after logging out, internet article, www.zdnet.com, Sep. 27, 2011, 2 pages.

Emil Protalinski, US congressmen ask FTC to investigate Facebook cookies, internet article, www.zdnet.com, Sep. 28, 2011, 2 pages.

Fliptop, "Fliptop Person API Documentation," https://developer.fliptop.com/documentation, retrieved on May 7, 2013(6 pages).

Fliptop, "Get, Keep and Grow Customers with Fliptop's Customer Intelligence Application," www.fliptop.com/features#social_matching, retrieved on May 7, 2013 (3 pages).

Fliptop, "What is Fliptop?", www.fliptop.com/about_us, retrieved on May 7, 2013 (1 page).

International Bureau, "International Preliminary Report on Patentability," issued in connection with PCT application serial No. PCT/US2011/052623, datd Mar. 26, 2013 (5 pages).

International Searching Authority, "International Preliminary Report on Patentability," issued in connection with application No. PCT/US2012/026760, dated Sep. 24, 2013 (4 pages).

International Searching Authority, "International Search Report," issued in connection with application No. PCT/US2011/052623, dated Mar. 8, 2012 (3 pages).

International Searching Authority, "International Search Report," issued in connection with application No. PCT/US2012/026760, dated Jan. 2, 2013 (3 pages).

International Searching Authority, "International Search Report," issued in connection with International Application No. PCT/US2013/025687 dated Jun. 2, 2013, 5 pages.

International Searching Authority, "Written Opinion of the International Searching Authority," issued in issued in connection with International Application No. PCT/US2013/025687 dated Jun. 2, 2013, 5 pages.

International Searching Authority, "Written Opinion," issued in connection with application No. PCT/US2011/052623, dated Mar. 8, 2012 (4 pages).

International Searching Authority, "Written Opinion," issued in connection with application No. PCT/US2011/065881, dated Jul. 9, 2012 (6 pages).

International Searching Authority, "Written Opinion," issued in connection with application No. PCT/US2012/026760, dated Jan. 2, 2013 (3 pages).

JavaScript and AJAX Forum, Sep. 28, 2005, [retrieved from Internet at http://www.webmasterworld.com/ forum91/4465.htm on Jun. 29, 2011] 4 pages.

Launder, "Media Journal: Nielsen to Test Online-TV Viewing Tool," The Wall Street Journal, Apr. 30, 2013, 2 pages.

Mental Poker, Wikipedia, Jan. 12, 2010, [retrieved from Internet at http://en.wikipedia.org/wiki/Mental_poker on Sep. 21, 2010] 5 pages.

Nielsen Unveils New Online Advertising Measurement, The Nielsen Company, Sep. 27,2010, [retrieved from Internet at http://nielsen.com/us/en/insights/press-room/2010/nielsen_unveils_newonlineadvertisingmeasurement.html on May 31, 2012] 3 pages.

Nik Cubrilovic, Logging out of Facebook is not enough, internet article, www.nikcub.appspot.com, Sep. 25, 2011, 3 pages.

Patent Cooperation Treaty, "International Search Report," issued by the International Searching Authority in connection with PCT application No. PCT/US2011/065881, dated Jul. 9, 2012 (3 pages).

Rapleaf, "Fast. Simple. Secure," www.rapleaf.com/why-rapleaf/, retrieved on May 7, 2013 (3 pages).

Rapleaf, "Frequently Asked Questions," www.rapleaf.com/about-us/faq/#where, retrieved on May 7, 2013 (3 pages).

Rapleaf, "The Consumer Data Marketplace," www.rapleaf.com/under-the-hood/, retrieved on May 7, 2013 (2 pages).

(56) References Cited

OTHER PUBLICATIONS

Sharma, "Nielsen Gets Digital to Track Online TV Viewers," All Things, Apr. 30, 2013, 3 pages.

Steve Coffey, "Internet Audience Measurement: A Practitioner's View," Journal of Interactive Advertising, vol. 1, No. 2, Spring 2001, 8 pages.

United States Patent and Trademark Office, "Final Office Action," issued in connection with U.S. Appl. No. 13/690,915, dated Dec. 20, 2013, 6 pages.

United States Patent and Trademark Office, "Non-Final Office Action," issued in connection with U.S. Appl. No. 13/239,005, dated Jun. 4, 2013 (28 pages).

United States Patent and Trademark Office, "Non-Final Office Action," issued in connection with U.S. Appl. No. 13/690,915, dated Sep. 5, 2013 (36 pages).

United States Patent and Trademark Office, "Non-Final Office Action," issued in connection with U.S. Appl. No. 13/691,175, dated Sep. 9, 2013 (35 pages).

United States Patent and Trademark Office, "Notice of Allowance," issued in connection with U.S. Appl. No. 13/239,005, dated Nov. 27, 2013, 46 pages.

United States Patent and Trademark Office, "Notice of Allowance," issued in connection with U.S. Appl. No. 13/513,148, dated Nov. 5, 2012 (27 pages).

United States Patent and Trademark Office, "Notice of Allowance," issued in connection with U.S. Appl. No. 13/691,175, dated Jan. 27, 2014, 15 pages.

United States Patent and Trademark Office, "Notice of Allowance," issued in connection with U.S. Appl. No. 13/691,175, dated May 9, 2014, 6 pages.

Vega, Tanzina, "Nielsen Introduces New Ad Measurement Product," The New York Times, Sep. 27, 2010 (7 pages).

Vranica, "Nielsen Testing a New Web-Ad Metric," The Wall Street Journal, Sep. 23, 2010, 2 pages.

United States Patent and Trademark Office, "Non-Final Office Action," issued in connection with U.S. Appl. No. 13/756,493, dated Jan. 17, 2014, 32 pages.

United States Patent and Trademark Office, "Notice of Allowance and Fee(s) Due," issued in connection with U.S. Appl. No. 13/690,915, filed Apr. 9, 2014, 28 pages.

Japan Patent Office, "Notice of Reasons for Rejection," issued in connection with Application No. 2013-529435, dated Aug. 20, 2013, 4 pages.

Patent Cooperation Treaty, "International Search Report and Written Opinion of the International Searching Authority," issued by the International Searching Authority in connection with PCT/US2013/045211, dated Feb. 25, 2014 (13 pages).

United States Patent and Trademark Office, "Non-Final Office Action," issued in connection with U.S. Appl. No. 13/396,071, filed May 9, 2014, 35 pages.

United States Patent and Trademark Office, "Non-Final Office Action," issued in connection with U.S. Appl. No. 13/209,292, filed Apr. 8, 2014, 15 pages.

Patent Cooperation Treaty, "International Search Report," issued by the International Searching Authority in connection with PCT/US2011/052762, dated Aug. 22, 2012 (3 pages).

International Searching Authority, "Written Opinion," issued in connection with application No. PCT/US2011/0052762, dated Aug. 22, 2012 (4 pages).

Patent Cooperation Treaty, "International Search Report," issued by the International Searching Authority in connection with PCT/US2013/057045, dated Dec. 27, 2013 (3 pages).

International Searching Authority, "Written Opinion," issued in connection with application No. PCT/US2013/057045, dated Dec. 27, 2013 (5 pages).

United States Patent and Trademark Office, "Notice of Allowance," issued in connection with U.S. Appl. No. 13/756,493, dated May 20, 2014, 32 pages.

Hothorn et al. "Unbiased Recursive Partitioning: A Conditional Inference Framework," Journal of Computational and Geographical Statistics, vol. 15, No. 3, 2006, pp. 651-674 (21 pages).

United States Patent and Trademark Office, "Notice of Allowance," issued in connection with U.S. Appl. No. 13/396,071, filed Oct. 24, 2014, 31 pages.

Canadian Intellectual Property Office, "Office Action," issued in connection with Canadian Patent Application No. 2,819,268, dated Nov. 24, 2014 (4 pages).

United States Patent and Trademark Office, "Office Action," issued in connection with U.S. Appl. No. 14/014,050, filed Sep. 12, 2014, 32 pages.

Patent Cooperation Treaty, "International Search Report and Written Opinion," issued in connection with Application No. PCT/US2014/050551, dated Nov. 24, 2014, 11 pages.

Patent Cooperation Treaty, "International Preliminary Report on Patentability," issued in connection with Application No. PCT/US2013/045211, dated Dec. 16, 2014, 8 pages.

IP Australia, "Patent Examination Report No. 1," issued in connection with Application No. 2013204865, dated Dec. 22, 2014, 3 pages.

United States Patent and Trademark Office, "Non-Final Office Action," issued in connection with U.S. Appl. No. 13/915,381, filed Jan. 30, 2015, 51 pages.

Patent Cooperation Treaty, "International Search Report," issued in connection with Application No. PCT/US2014/068621, dated Feb. 27, 2015, 3 pages.

Patent Cooperation Treaty, "Written Opinion," issued in connection with Application No. PCT/US2014/068621, dated Feb. 27, 2015, 7 pages.

Canadian Intellectual Property Office, "Examination Search Report," issued in connection with Application No. 2,810,541 dated Jan. 20, 2015, 3 pages.

The State Intellectual Property Office of China, "First Notification of Office Action," issued in connection with Application No. 201180045957.2, dated Nov. 15, 2014, 20 pages.

Japanese Patent Office, "Final Rejection," issued in connection with Japanese Patent Application No. P2014-005867 dated Aug. 26, 2014, 8 pages.

Japanese Patent Office, "Notice of Reasons for Rejection," issued in connection with Japanese Patent Application No. P2014-005867 dated Feb. 17, 2015, 6 pages.

Japanenese Patent Office, "Notice of Reasons for Rejection," issued in connection with Japanese Patent Application No. P2014-005867 dated Apr. 15, 2014, 10 pages.

United States Patenet and Trademark Office, "Office Action," issued in connection with U.S. Appl. No. 14/500,297, dated Jan. 5, 2015, 7 pages.

Australian Government, IP Australia, "Patent Examination Report No. 1," issued in connection with Australian Patent Application No. 2013203898, dated Nov. 27, 2014, 4 pages.

Australian Government, IP Australia, "Patent Examination Report No. 1," issued in connection with application No. 2011305429 dated Apr. 17, 2014, 4 pages.

The State Intellectual Property Office of China, "First Notification of Office Action," issued in connection with Application No. 201180061437.0, dated Mar. 7, 2014, 11 pages.

The State Intellectual Property Office of China, "Second Notification of Office Action," issued in connection with Application No. 201180061437.0, dated Nov. 15, 2014, 6 pages.

Australian Government, IP Australia," Patent Examination Report No. 1," issued in connection with Application No. 2011374955, dated Sep. 25, 2014, 3 pages.

Canadian Intellectual Property Office, "Examination Search Report," issued in connection with Application No. 2,873,128, dated Jan. 7, 2015, 3 pages.

Patent Cooperation Treaty, "International Search Report," issued by the International Searching Authority in connection with PCT Application No. PCT/US2014/068165, dated Feb. 25, 2015, 3 pages.

(56) References Cited

OTHER PUBLICATIONS

Patent Cooperation Treaty, "Written Opinion of the International Searching Authority," issued by the International Searching Authority in connection with PCT Application No. PCT/US2014/06815, dated Feb. 25, 2015, 5 pages.
United States Patent and Trademark Office, "Non-Final Office Action," issued in connection with U.S. Appl. No. 13/756,493, dated Nov. 19, 2014, 13 pages.
Canadian Intellectual Property Office, Office Action, issued in connection with Canadian Patent Application No. 2,810,264, dated Nov. 27, 2014, 5 pages.
IP Australia, "Examination Report No. 2," issued in connection with application No. AU 2012231667, dated Feb. 10, 2015, 3 pages.
United States Patent and Trademark Office, "Notice of Allowance," issued in connection with U.S. Appl. No. 13/756,493, dated Mar. 17, 2015, 15 pages.
Patent Cooperation Treaty, "International Search Report," issued by the International Searching Authority in connection with PCT application No. PCT/US2017/068168, dated Mar. 2, 2015, 3 pages.
Patent Cooperation Treaty, "Written Opinion of the International Searching Authority," issued by the International Searching Authority in connection with PCT application No. PCT/US2014/068168, date Mar. 2, 2015, 5 pages.
European Patent Office, "Extended European Search Report," issued in connection with application No. EP 14004028.8, dated Apr. 9, 2015, 7 pages.
United States Patent and Trademark Office, "Non-Final Office Action," issued in connection with U.S. Appl. No. 14/025,575, filed Apr. 16, 2015, 72 pages.
The State Intellectual Property Office of China, "First Notification of Office Action," issued in connection with application No. CN 201280003504.8, dated Apr. 1, 2015, 17 pages.
IP Australia, "Patent Examination Report No. 1," issued in connection with Application No. 2014260163, dated Apr. 21, 2015, 3 pages.
United States Patent and Trademark Office, "Notice of Allowance," issued in connection with U.S. Appl. No. 14/500,297, filed May 21, 2015, (31 pages).
United States Patent and Trademark Office, "Non-Final Office Action," issued in connection with U.S. Appl. No. 14/014,050, filed May 28, 2015, 20 pages.
IP Australia, "Patent Examination Report No. 1," issued in connection with Application No. 2014262739, dated May 29, 2015, 4 pages.
United States Patent and Trademark Office, "Notice of Allowance," issued in connection with U.S. Appl. No. 13/915,381, filed Jun. 8, 2015, 44 pages.
United States Patent and Trademark Office, "Non-Final Office Action, " issued in connection with U.S. Appl. No. 13/404,984, filed May 20, 2015, (27 pages).
United States Patent and Trademark Office, "Notice of Allowance," issued in connection with U.S. Appl. No. 13/690,915, dated Jun. 5, 2015, (64 pages).
Japanese Patent Office, "Notice of Allowance," issued in connection with Japanese Patent Application No. 2014-005867 dated Jun. 9, 2015 (3 pages).
IP Australia, "Patent Examination Report No. 1," issued in connection with Application No. 2011349435, dated Nov. 4, 2014 (3 pages).
Japanese Patent Office, "Office Action," issued in connection with Japanese Patent Application No. 2013543286, dated Aug. 26, 2014 (5 pages).
United States Patent and Trademark Office, "Notice of Allowance," issued in connection with U.S. Appl. No. 13/995,864, filed Oct. 28, 2014 (39 pages).
Goerg et al., "How Many Millenials Visit YouTube? Estimating Unobserved Events From Incomplete Panel Data Conditioned on Demographic Covariates," Apr. 27, 2015, 27 pages, Google Inc.
Goerg et al., "How Many People Visit YouTube? Imputing Missing Events in Panels With Excess Zeros," 2015, 6 pages, Google Inc.

United States Patent and Trademark Office, "Non-Final Office Action," issued in connection with U.S. Appl. No. 14/014,044, filed Jul. 2, 2015, 69 pages.
United States Patent and Trademark Office, "Final Office Action," issued in connection with U.S. Appl. No. 13/963,737, filed Sep. 21, 2015, 14 pages.
State Intellectual Property Office of China, "Second Office Action," issued in connection with Chinese Patent Application No. 201180045957.2, dated Jul. 29, 2015 (5 pages).
Japanese Patent Office, "Notice of Reasons for Rejection," issued in connection with Japanese Patent Application No. P2015-0524512 dated Jun. 30, 2015 (6 pages).
Taboga, Marco, (2010) "Linear combinations of normal random variables", from "Lectures on probability and statistics," <http://www.statlect.com/normal_distribution_linear_combinations.htm> (4 pages).
Australian Government, IP Australia, " Patent Examination Report No. 1," issued in connection with Australian Application No. 2013204953, Dec. 23, 2014 (5 pages).
United States Patent and Trademark Office, "Notice of Allowance," issued in connection with U.S. Appl. No. 14/641,982, filed Sep. 2, 2015 (13 pages).
Patent Cooperation Treaty, "International Preliminary Report on Patentability," issued in connection with Application No. PCT/US2013/057045, dated Mar. 3, 2015, 1 page.
Patent Cooperation Treaty, "International Search Report," issued in connection with Application No. PCT/US2014/068623, dated Mar. 23, 2015, 3 pages.
Patent Cooperation Treaty, "Written Opinion," issued in connection with Application No. PCT/US2014/068623, dated Mar. 23, 2015, 8 pages.
Patent Cooperation Treaty, "International Search Report," issued in connection with Application No. PCT/US2014/068202, dated Apr. 10, 2015, 3 pages.
Patent Cooperation Treaty, "Written Opinion," issued in connection with Application No. PCT/US2014/068202, dated Apr. 10, 2015, 7 pages.
United States Patent and Trademark Office, "Non-Final Office Action," issued in connection with U.S. Appl. No. 14/463,309, filed Aug. 5, 2015, 62 pages.
United States Patent and Trademark Office, "Non-Final Office Action," issued in connection with U.S. Appl. No. 14/025,567, filed Aug. 6, 2015, 59 pages.
Japanese Patent Office, "Notice of Reasons for Rejection," issued in connection with Japanese Patent Application No. P2015-078539 dated Jul. 14, 2015 (6 pages).
IP Australia, "Patent Examination Report No. 1," issued in connection with Australian Patent Application No. 2013204354, dated Nov. 14, 2014 3 pages.
United States Patent and Trademark Office, "Final Office Action," issued in connection with U.S. Appl. No. 14/025,575, filed Aug. 17, 2015, 78 pages.
International Searching Authority, "International Preliminary Report on Patentability," issued in connection with PCT Application No. PCT/US2014/068623, dated Sep. 13, 2016, 9 pages.
IP Australia, "Examination Report," issued in connection with application No. 2014386191 dated Feb. 10, 2017, 3 pages.
The State Intellectual Property Office of China, "Notification of Publication and Entry into Substantive Examination Procedure," issued in connection with application No. 201480077152 dated Mar. 8, 2017, 2 pages.
Canadian Intellectual Property Office, "Office Action," issued in connection with application No. 2936701 dated May 10, 2017, 4 pages.
European Patent Office, "Communication pursuant to Ruled 70(2) and 70a(2) EPC," issued in connection with application No. 14885507.5 dated Jul. 18, 2017, 1 page.
European Patent Office, "Search Report," issued in connection with application No. 14885507.5 dated Jun. 29, 2017, 6 pages.
United States Patent and Trademark Office, "Notice of Allowance," issued in connection with U.S. Appl. No. 14/500,297, dated May 21, 2015, 5 pages.

(56) References Cited

OTHER PUBLICATIONS

Japanese Patent Office, "Notice of Allowance,"dated Oct. 3, 2017 in connection with Japanese Patent Application No. 2016-556957, 3 pages (no translation available).
United States Patent and Trademark Office, "Non-Final Office Action," issued in connection with U.S. Appl. No. 14/560,947, dated Mar. 11, 2016, 19 pages.
United States Patent and Trademark Office, "Final Office Action," issued in connection with U.S. Appl. No. 14/560,947, dated Sep. 9, 2016, 14 pages.
United States Patent and Trademark Office, "Examiner's Answer to Appeal Brief," issued in connection with U.S. Appl. No. 14/560,947, dated Aug. 4, 2017, 11 pages.
United States Patent and Trademark Office, "Patent Board Decision," dated Feb. 22, 2018 in connection with U.S. Appl. No. 14/560,947, 7 pages.
United States Patent and Trademark Office, "Non-Final Office Action," dated Jun. 4, 2018 in connection with U.S. Appl. No. 14/560,947, 16 pages.
United States Patent and Trademark Office, "Final Office Action,"dated Oct. 12, 2018 in connection U.S. Appl. No. 14/560,947, 19 pages.
International Searching Authority, "International Preliminary Report on Patentability," issued in connection with International Patent Application No. PCT/US2015/067917, dated Jul. 13, 2017 (7 pages).
International Searching Authority, "International Search Report and Written Opinion," issued in connection with International Patent Application No. PCT/US2015/067917, dated May 23, 2016 (9 pages).
IP Australia, "Examination Report No. 1," issued in connection with application No. AU 2015264866, dated Dec. 19, 2016, 2 pages.
IP Australia, "Examination Report No. 2," issued in connection with application No. AU 2015264866, dated May 26, 2017, 3 pages.
United States Patent and Trademark Office, "AFCP Decision and Advisory Action," dated Jan. 2, 2019 in connection with U.S. Appl. No. 14/560,947, 3 pages.
Korean Patent Office, "Notice of Preliminary Rejection," dated Jan. 28, 2020 in connection with Korean Patent Application No. 10-2018-7037635, 7 pages, including English translation.
Song, "Classification of Program Information Genre for Intelligent Personalized EPG," $27_{th}$ Korea Information Processing Society, Proceedings of Spring Symposium Conference, vol. 14, No. 1, pp. 435-438, May 2007, 7 pages.
IP Australia, "Notice of Acceptance," issued in connection with Australian Patent Application No. 2011374955, dated Aug. 24, 2015 (2 pages).
IP Australia, "Notice of Grant," issued in connection with Australian Patent Application No. 2011374955, dated Dec. 17, 2015 (1 page).
IP Australia, "Notice of Acceptance," issued in connection with Australian Patent Application No. 2012231667, dated May 15, 2015 (3 pages).
IP Australia, "Notice of Acceptance," issued in connection with Australian Patent Application No. 2014262739, dated Oct. 30, 2015 (2 pages).
Japan Paent Office, "Notice of Allowance," issued in connection with Japanese Patent Application No. P2013-544887, dated May 26, 2015, (3 pages).
Jennings et al., "Adding Adaptive Models Makes Neural Net Fraud Models More Robust," FICO Blog, Sep. 7, 2011 (4 pages).
International Searching Authority, "International Search Report," issued by the International Searching Authority in connection with PCT Application No. PCT/US2014/068165, dated Feb. 25, 2015, 3 pages.
International Searching Authority, "Written Opinion of the International Searching Authority," issued by the International Searching Authority in connection with PCT application No. PCT/US2014/068168, dated Mar. 2, 2015, 5 pages.
Read et al., "Classifier Chains for Multi-Label Classification," Machine Learning, Jun. 30, 2011 (16 pages).

The State Intellectual Property Office of China, "Notice of Allowance," issued in connection with Chinese Patent Application No. 201180045957.2, dated Feb. 5, 2016, (5 pages).
United States Patent and Trademark Office, "Non-Final Office Action," issued in connection with U.S. Appl. No. 14/014,044, dated Apr. 8, 2016 (21 pages).
United States Patent and Trademark Office, "Advisory Action," issued in connection with U.S. Appl. No. 13/209,292, dated Dec. 24, 2014 (3 pages).
United States Patent and Trademark Office, "Corrected Notice of Allowability," issued in connection with U.S. Appl. No. 13/690,915, dated Nov. 6, 2014 (2 pages).
United States Patent and Trademark Office, "Final Office Action," issued in connection with U.S. Appl. No. 13/209,292, dated Sep. 10, 2014 (11 pages).
United States Patent and Trademark Office, "Final Office Action," issued in connection with U.S. Appl. No. 14/014,044, dated Nov. 30, 2015 (22 pages).
United States Patent and Trademark Office, "Non-Final Office Action," issued in connection with U.S. Appl. No. 14/809,988, dated Apr. 29, 2016 (13 pages).
United States Patent and Trademark Office, "Non-Final Office Action," issued in connection with U.S. Appl. No. 15/151,182, dated Feb. 8, 2017 (10 pages).
United States Patent and Trademark Office, "Notice of Allowance," issued in connection with U.S. Appl. 13/209,292, dated Feb. 17, 2015 (15 pages).
United States Patent and Trademark Office, "Notice of Allowance," issued in connection with U.S. Appl. No. 13/690,915, dated Jun. 24, 2014 (6 pages).
United States Patent and Trademark Office, "Notice of Allowance," issued in connection with U.S. Appl. No. 14/809,888, dated Oct. 19, 2016, 10 pages.
United States Patent and Trademark Office, "Notice of Allowance," issued in connection with U.S. Appl. No. 15/151,182, dated Aug. 2, 2017, 7 pages.
United States Patent and Trademark Office, "Supplemental Notice of Allowability," issued in connection with U.S. Appl. No. 13/209,292, dated Jun. 30, 2015 (2 pages).
United States Patent and Trademark Office, "Supplemental Notice of Allowability," issued in connection with U.S. Appl. No. 14/641,982, dated Sep. 23, 2015 (2 pages).
United States Patent and Trademark Office, "Supplemental Notice of Allowability," issued in connection with U.S. Appl. No. 13/690,915, dated Jul. 8, 2014 (3 pages).
IP Australia, "Patent Examination Report No. 2", issued in connection with Australian Application No. 2014386191, dated Oct. 25, 2017 (3 pages).
United States Patent and Trademark Office, "Non-Final Office action," issued in connection with U.S. Appl. No. 14/957,258, dated Oct. 18, 2017, 17 pages.
United States Patent and Trademark Office "Notice of Allowance", issued in connection with U.S. Appl. No. 14/967,355, dated Jan. 3, 2018, 11 pages.
Korean Patent Office, "Notice of Preliminary Rejection", issued in connection with Korean patent application No. 10-2016-702403, dated Dec. 29, 2017, 5 pages.
United States Patent and Trademark Office, "Final Office Action," issued in connection with U.S. Appl. No. 14/604,394, dated Apr. 24, 2018, 28 pages.
United States Patent and Trademark Office, "Non-Final Office Action," issued in connection with U.S. Appl. No. 14/984,521, dated May 1, 2018, 28 pages.
United States Patent and Trademark Office, "Final Office Action," issued in connection with U.S. Appl. No. 14/957,258, dated Apr. 27, 2018, 18 pages.
Canadian Intellectual Property Office, "Office Action," dated Feb. 25, 2020 in connection with Canadian Patent Application No. 2,936,701, 5 pages.

\* cited by examiner

METHODS AND APPARATUS TO COMPENSATE FOR SERVER-GENERATED ERRORS IN DATABASE PROPRIETOR IMPRESSION DATA DUE TO MISATTRIBUTION AND/OR NON-COVERAGE

RELATED APPLICATIONS

This patent arises from a continuation application of U.S. patent application Ser. No. 14/560,947, filed Dec. 4, 2014, which claims priority to U.S. Provisional Patent Application Ser. No. 61/952,726, filed Mar. 13, 2014, U.S. Provisional Patent Application Ser. No. 61/979,391, filed Apr. 14, 2014, U.S. Provisional Patent Application Ser. No. 61/986,784, filed Apr. 30, 2014, U.S. Provisional Patent Application Ser. No. 61/991,286, filed May 9, 2014, U.S. Provisional Patent Application Ser. No. 62/014,659, filed Jun. 19, 2014, U.S. Provisional Patent Application Ser. No. 62/023,675, filed Jul. 11, 2014, and U.S. Provisional Patent Application Ser. No. 62/030,571, filed Jul. 29, 2014. The entireties of U.S. patent application Ser. No. 14/560,947, U.S. Provisional Patent Application Ser. No. 61/952,726, U.S. Provisional Patent Application Ser. No. 61/979,391, U.S. Provisional Patent Application Ser. No. 61/986,784, U.S. Provisional Patent Application Ser. No. 61/991,286, U.S. Provisional Patent Application Ser. No. 62/014,659, U.S. Provisional Patent Application Ser. No. 62/023,675, and U.S. Provisional Patent Application Ser. No. 62/030,571 are incorporated herein by reference in their entireties.

FIELD OF THE DISCLOSURE

The present disclosure relates generally to monitoring media and, more particularly, to methods and apparatus to compensate impression data for misattribution and/or non-coverage by a database proprietor.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media (e.g., television programs or radio programs, movies, DVDs, advertisements, etc.) exposed to those panel members. In this manner, the audience measurement entity can determine exposure measures for different media based on the collected media measurement data.

Techniques for monitoring user access to Internet resources such as web pages, advertisements and/or other media have evolved significantly over the years. Some prior systems perform such monitoring primarily through server logs. In particular, entities serving media on the Internet can use such prior systems to log the number of requests received for their media at their server.

DETAILED DESCRIPTION

Figure 1:
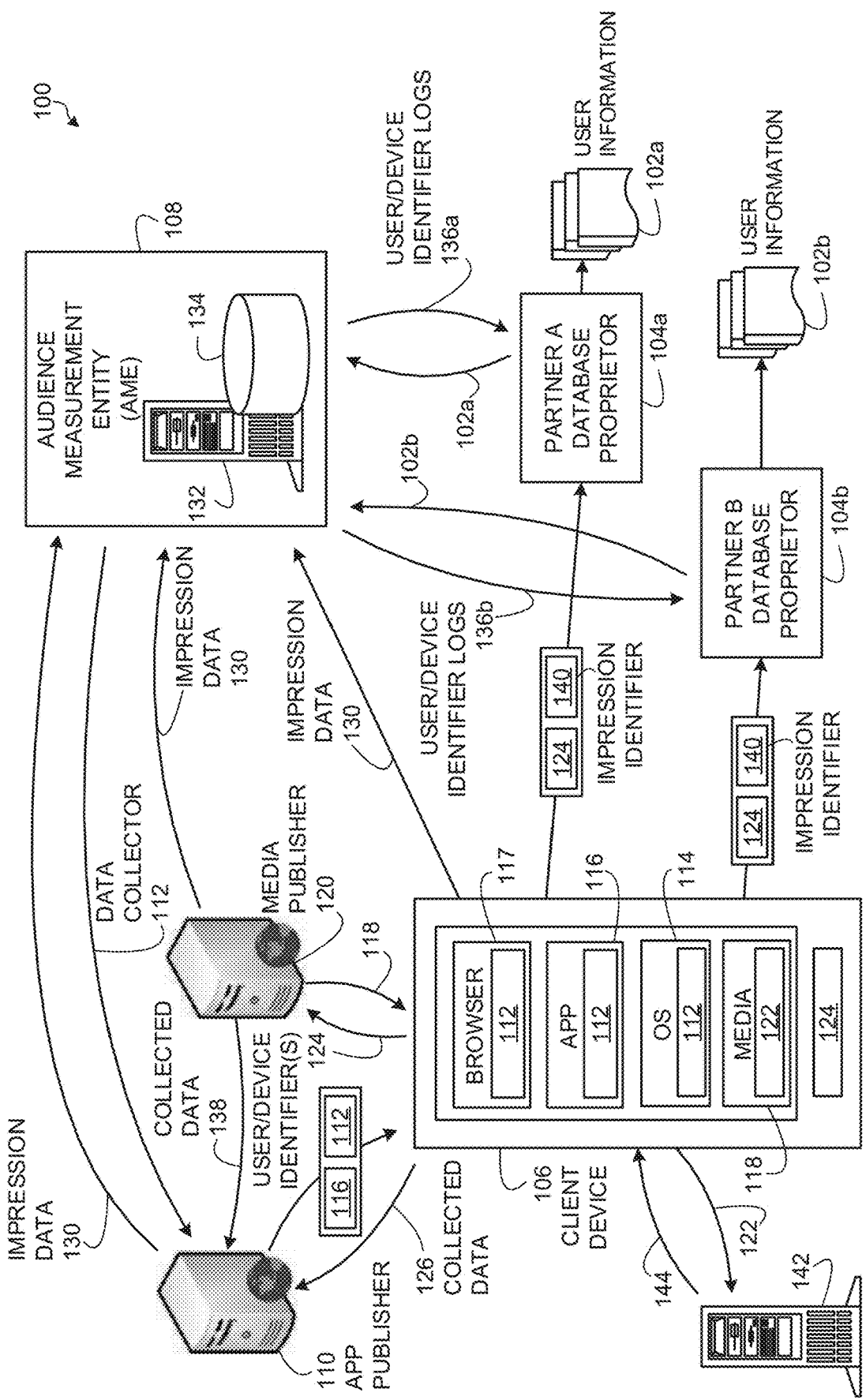
FIG. 1 depicts an example system to collect impressions of media presented at mobile devices and to collect user information from distributed database proprietors for associating with the collected impressions.

Techniques for monitoring user access to Internet resources such as web pages, advertisements and/or other media have evolved significantly over the years. At one point in the past, such monitoring was done primarily through server logs. In particular, entities serving media on the Internet would log the number of requests received for their media at their server. Basing Internet usage research on server logs is problematic for several reasons. For example, server logs can be tampered with either directly or via zombie programs which repeatedly request media from servers to increase the server log counts corresponding to the requested media. Secondly, media is sometimes retrieved once, cached locally and then repeatedly viewed from the local cache without involving the server in the repeat viewings. Server logs cannot track these views of cached media because reproducing locally cached media does not require re-requesting the media from a server. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet media to be tracked is tagged with beacon instructions. In particular, monitoring instructions are associated with the Hypertext Markup Language (HTML) of the media to be tracked. When a client requests the media, both the media and the beacon instructions are downloaded to the client. The beacon instructions are, thus, executed whenever the media is accessed, be it from a server or from a cache.

The beacon instructions cause monitoring data reflecting information about the access to the media to be sent from the client that downloaded the media to a monitoring entity. Typically, the monitoring entity is an audience measurement entity (AME) (e.g., any entity interested in measuring or tracking audience exposures to advertisements, media, and/or any other media) that did not provide the media to the client and who is a trusted third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is a panelist of the AME.

It is useful, however, to link demographics and/or other user information to the monitoring information. To address this issue, the AME establishes a panel of users who have agreed to provide their demographic information and to have their Internet browsing activities monitored. When an individual joins the panel, they provide detailed information concerning their identity and demographics (e.g., gender, race, income, home location, occupation, etc.) to the AME. The AME sets a cookie on the panelist computer that enables the AME to identify the panelist whenever the panelist accesses tagged media and, thus, sends monitoring information to the AME.

Since most of the clients providing monitoring information from the tagged pages are not panelists and, thus, are unknown to the AME, it is necessary to use statistical methods to impute demographic information based on the data collected for panelists to the larger population of users providing data for the tagged media. However, panel sizes of AMEs remain small compared to the general population of users. Thus, a problem is presented as to how to increase panel sizes while ensuring the demographics data of the panel is accurate.

There are many database proprietors operating on the Internet. These database proprietors provide services (e.g., social networking services, email services, media access services, etc.) to large numbers of subscribers. In exchange for the provision of such services, the subscribers register with the proprietors. As part of this registration, the subscribers provide detailed demographic information. Examples of such database proprietors include social network providers such as Facebook, Myspace, Twitter, etc. These database proprietors set cookies on the computers of their subscribers to enable the database proprietors to recognize registered users when such registered users visit their websites.

Examples disclosed herein can be used to determine media impressions, advertisement impressions, media exposure, and/or advertisement exposure using user information, which is distributed across different databases (e.g., different website owners, service providers, etc.) on the Internet. Not only do example methods, apparatus, and articles of manufacture disclosed herein enable more accurate correlation of Internet media exposure to user information, but they also effectively extend panel sizes and compositions beyond persons participating in the panel of an audience measurement entity and/or a ratings entity to persons registered in other Internet databases such as the databases of wireless service carriers, mobile software/service providers, social medium sites (e.g., Facebook, Twitter, Google, etc.), and/or any other Internet sites such as Yahoo!, MSN, Apple iTunes, Experian, etc. This extension effectively leverages the media impression tracking capabilities of the AME and the use of databases of non-AME entities such as social media and other websites to create an enormous, demographically accurate panel that results in accurate, reliable measurements of exposures to Internet media such as advertising and/or programming. Examples of such media include web sites, images presented on web sites, and/or streaming media accessible via a computing device (e.g., Amazon Video, Netflix, Hulu, etc.).

Traditionally, AMEs (also referred to herein as "ratings entities") determine demographic reach for advertising and media programming based on registered panel members. That is, an AME enrolls people that consent to being monitored into a panel. During enrollment, the AME receives demographic information from the enrolling people so that subsequent correlations may be made between advertisement/media exposure to those panelists and different demographic markets. Unlike traditional techniques in which AMEs rely solely on their own panel member data to collect demographics-based audience measurement, example methods, apparatus, and/or articles of manufacture disclosed herein enable an AME to share demographic information with other entities that operate based on user registration models. As used herein, a user registration model is a model in which users subscribe to services of those entities by creating an account and providing demographic-related information about themselves. Sharing of demographic information associated with registered users of database proprietors enables an AME to extend or supplement their panel data with substantially reliable demographics information from external sources (e.g., database proprietors), thus extending the coverage, accuracy, and/or completeness of their demographics-based audience measurements. Such access also enables the AME to monitor persons who would not otherwise have joined an AME panel. Any entity having a database identifying demographics of a set of individuals may cooperate with the AME. Such entities may be referred to as "database proprietors" and include entities such as wireless service carriers, mobile software/service providers, social medium sites (e.g., Facebook, Twitter, Google, etc.), and/or any other Internet sites such as Yahoo!, MSN, Apple iTunes, Experian, etc. that collect demographic data of users which may be in exchange for a service.

Examples disclosed herein may be implemented by an AME (e.g., any entity interested in measuring or tracking audience exposures to advertisements, content, and/or any other media) in cooperation with any number of database proprietors such as online web services providers to develop online media exposure metrics. Such database proprietors/online web services providers may be wireless service carriers, mobile software/service providers, social network sites (e.g., Facebook, Twitter, MySpace, etc.), multi-service sites (e.g., Yahoo!, Google, Experian, etc.), online retailer sites (e.g., Amazon.com, Buy.com, etc.), and/or any other web service(s) site that maintains user registration records.

The use of demographic information from disparate data sources (e.g., high-quality demographic information from the panels of an audience measurement entity and/or registered user data of web service providers) results in improved reporting effectiveness of metrics for both online and offline advertising campaigns. Example techniques disclosed herein use online registration data to identify demographics of users, and/or other user information, and use server impression counts, and/or other techniques to track quantities of impressions attributable to those users. Online web service providers such as wireless service carriers, mobile software/service providers, social network sites (e.g., Facebook, Twitter, MySpace, etc.), multi-service sites (e.g., Yahoo!, Google, Experian, etc.), online retailer sites (e.g., Amazon.com, Buy.com, etc.), etc. (collectively and individually referred to herein as online database proprietors) maintain detailed demographic information (e.g., age, gender, geographic location, race, income level, education level, religion, etc.) collected via user registration processes. An impression corresponds to a home or individual having been exposed to the corresponding media and/or advertisement. Thus, an impression represents a home or an individual having been exposed to an advertisement or media or group of advertisements or media. In Internet advertising, a quantity of impressions or impression count is the total number of times an advertisement or advertisement campaign has been accessed by a web population (e.g., including number of times accessed as decreased by, for example, pop-up blockers and/or increased by, for example, retrieval from local cache memory).

Examples disclosed herein adjust impression information obtained from client device(s) and database proprietor(s) to increase accuracy of demographics corresponding to the logged impressions. When using database proprietor data to provide demographic information for impressions, the audience demographics and/or impression information obtained from the client device(s) and the database proprietor(s) can be biased due to errors including: 1) misattribution error resulting from device sharing and/or 2) database proprietor non-coverage error. In some situations these two different sources of bias appear to result in similar error factors, but are actually distinct biases. Examples disclosed herein generate and apply calibration factors to the audience data to correct for these errors.

Misattribution error refers to the measurement bias that occurs when a first person belonging to a first demographic group is believed to be the person associated with a media impression on a device when, in fact, a second person belonging to a second demographic group is the person for whom the media impression occurred. In some examples of such a situation, a mobile device is shared between multiple persons of a household. Initially, a first person in the household uses the mobile device to access a web site associated with a database proprietor (e.g., via a web browser of the mobile device, via an app installed on the mobile device, etc.) and the database proprietor may recognize the first person as being associated with the mobile device based on the access (e.g., a login event) by the first person. Subsequently, the first person stops using the device but does not log out of the database proprietor system on the device and/or the second person does not log in to the database proprietor system to allow the database proprietor to recognize the second person as a different user than the first person. Consequently, when the second person begins using the same mobile device to access media, the database proprietor continues to (in this case, incorrectly) recognize uses of the mobile device (e.g., media impressions) as being associated with the first person. Therefore, impressions that should be attributed to the second person and the second demographic group are incorrectly attributed to the first person and the first demographic group. The effect of large-scale misattribution error may create measurement bias error by incorrectly representing the demographic distribution of media impressions across a large audience and, therefore, misrepresenting the audience demographics of impressions collected for advertisements and/or other media to which exposure is monitored by an audience measurement entity.

Example Technical Advantages of Disclosed Examples

Prior techniques of correcting misattribution error include determining adjustment factors by comparing A) demographic information collected for computing sessions using panelist meter software installed at client computers with B) demographic information determined using cookie-based impressions from a database proprietor for the same computing sessions. Examples of such techniques are disclosed in U.S. patent application Ser. No. 13/756,493, filed Jan. 31, 2013. The entirety of U.S. patent application Ser. No. 13/756,493 is incorporated by reference herein. Examples disclosed in U.S. patent application Ser. No. 13/756,493 rely on the panelist meter software locally-installed at client computers to accurately identify panelists enrolled in a panel of an audience measurement entity. Examples disclosed in U.S. patent application Ser. No. 13/756,493 also rely on cookies or cookie-like data to determine the adjustment factors. Such techniques are unsuitable for correcting for misattribution error on devices that do not have installed panelist meter software and/or do not provide cookies useable as client device identifiers, such as some mobile devices (e.g., iOS devices). In other words, the prior techniques rely on locally-installed panelist meter software and cookies to generate the misattribution adjustment factors. Without such locally-installed panelist meter software and/or without such cookies, the prior techniques will not successfully generate misattribution adjustment factors.

In contrast to prior systems and methods, examples disclosed herein generate misattribution factors using a misattribution correction matrix based on responses to a survey conducted on randomly selected people and/or households, and do not rely on cookies or use cookies to generate misattribution correction factors and/or a misattribution correction matrix. As used herein, the term "database proprietor registration status" as used with reference to a person refers to whether that person is registered with one or more particular database proprietor(s). Prior techniques that rely on locally-installed panelist metering software to collect database proprietor registration statuses (e.g., whether individual household members are registered with a particular database proprietor) and to collect media access data by household members may not be able to accurately correct impression information for misattribution bias error and/or non-coverage bias error for impressions that occur on device types that are not monitored by the panelist metering software. Examples disclosed herein generate misattribution correction factors without relying on panelist meter software being locally-installed at client computers to collect database proprietor registration status data. Examples disclosed herein also generate misattribution correction factors without relying on such locally-installed panelist meter software to collect data about media accesses by household members. Thus, examples disclosed herein determine misattribution correction factors for any device type(s), including device types from which database proprietor registration status data, database proprietor login data, and/or data about media accesses by household members are not collected (and/or are not collectable) using locally-installed panelist metering software. Such devices are referred to herein as "non-locally-metered devices."

In some such disclosed examples, panelist data is collected differently and used differently than in prior techniques. In such examples, panelist data is employed to adjust the misattribution correction factors to more accurately determine incidences of persons in demographic groups living together. As used herein, the "incidence of persons in demographic groups living together" refers to the relative frequency of occurrences of people in a first demographic group living with people in a second demographic group (e.g., the percentage of people in demographic group A who live with someone in demographic group B). However, the aggregated audience distributions corresponding to collected impressions are still generated without reference to the panelist data. In examples disclosed herein, the panelist data is only used to adjust generated aggregated audience distributions. The adjusted aggregated audience distributions are used to generate and/or adjust the misattribution correction factors. For example, panelist data that may be used to adjust for incidences of persons in demographic groups living together may include respective numbers of people in a first demographic group who live with a person in a second demographic group (e.g., the same demographic group or a different demographic group than the first demographic group). In some examples, the panelist data used to adjust for the incidences of persons in demographic groups living together does not indicate whether a panelist is a registered user of a database proprietor (e.g., does not include cookies) and does not include information indicating media accesses using computing devices.

Disclosed examples determine the probability of misattribution by determining a probability that, when a person in a demographic group (i) is identified by a database proprietor as a viewer of media, a person in a demographic group (j) is an actual viewer of the media. In some examples, the probability of misattribution is calculated by redistributing the audience and/or the impressions observed in association with a household using a survey calibration data source. In such examples, the survey calibration data source is used to aggregate and adjust the redistributed audience and/or impressions for multiple households for oversampling and/or undersampling by. In some such examples, the resulting probabilities are normalized to reflect the probability of misattribution for each impression observed by a database proprietor and associated with a demographic group.

Other disclosed examples determine the probability of misattribution due to device sharing as a combination of three separate probabilities: a) a probability of living in the same home, b) a probability of having access to a mobile device (of any type) in that home, and c) a probability of sharing the mobile device for a particular content type. Examples disclosed herein apply the resulting probability of misattribution to the impression data as a factor to compensate for errors in the unique audience represented by the collected impression data. In some examples, providing such error compensation involves constructing a misattribution correction matrix to reflect the probabilities that an impression recognized by a database proprietor as being associated with a first demographic group should, in fact, be associated with a second demographic group.

As used herein, non-coverage error is defined to refer to the measurement bias that occurs due to the inability of the database proprietor to recognize (e.g., identify the demographics of) a portion of the audience using mobile devices to view media. In some instances, when requests are sent from a mobile device to a database proprietor, as in the examples disclosed above, the database proprietor is not able to match the data in the request to a person. The inability of a database proprietor to recognize a person associated with a given impression may occur due to: 1) the person accessing the media giving rise to the impression has not provided his or her information to the database proprietor (e.g., the person is not registered with the database proprietor (e.g., Facebook) such that there is no record of the person at the database proprietor, the registration profile corresponding to the person is incomplete, the registration profile corresponding to the person has been flagged as suspect for possibly containing inaccurate information, etc.), 2) the person is registered with the database proprietor, but does not access the database proprietor using the specific mobile device on which the impression occurs (e.g., only accesses the database proprietor from a computer and/or other mobile devices different than the mobile device associated with the current request, and/or a user identifier for the person is not available on the mobile device on which the impression occurs), and/or 3) the person is registered with the database proprietor and accesses (e.g., the person has previously logged in to the database proprietor from the mobile device) the database proprietor using the mobile device on which the impression occurs, but takes other active or passive measures (e.g., blocks or deletes cookies) that prevent the database proprietor from associating the mobile device with the person. In some examples, a user identifier for a person is not available on a mobile device on which an impression occurs because the mobile device and/or application/software on the mobile device is not a cookie-based device and/or application.

Examples disclosed herein generate device sharing matrices and/or non-coverage factors for different combinations of media categories and/or mobile device types. Examples of media categories for which separate device sharing matrices and/or non-coverage factors may be generated include advertising, children's programming, comedy, drama, feature films, informational and/or news programming, sports, variety (e.g., game shows, reality shows, talk shows), and/or other categories. Examples of device types for which separate device sharing matrices and/or non-coverage factors may be generated include smartphones (e.g., iPhones, Android OS-based smartphones, Blackberry smartphones, Windows Mobile-based smartphones, etc.), tablet computers (e.g., iPads, Android OS-based tablet computers, etc.), portable media players (e.g., iPods, etc.), and/or other device types. Such device types may be cookie-based devices (e.g., devices that run cookie-based applications/software) and/or non-cookie-based devices (e.g., devices such as Apple iOS devices that run applications/software that do not employ cookies).

Disclosed example methods and apparatus for compensating impression information for misattribution and/or non-coverage error solve the technical problems of accurately determining demographics associated with impressions of media that are delivered and monitored via a network such as the Internet. Media impressions occur at computing devices, and data indicating the occurrences of media impressions is collected using such computing devices. The calibration of such data can include collecting, processing, and/or analyzing hundreds of thousands, millions, or more impressions. As such, the calibration and/or correction of such a large volume of data presents an enormous technical challenge. Disclosed examples may be applied to a set of media impressions collected via computing devices to produce accurate demographic information for huge volumes of media impressions (e.g., 100,000 impressions per week) in an efficient and timely manner. This provides a significant improvement in the technical field of audience measurement.

Examples disclosed herein may be used with the Online Campaign Ratings (OCR) systems developed by The Nielsen Company (US), LLC. The OCR systems are efficient systems for collecting and analyzing large amounts of data. The OCR system does not require panelist software to obtain the data to be processed. The techniques disclosed herein enable the generation of adjustment factors without requiring the introduction of panelist software. This reduces the amount of software required and eliminates the need for end user computers. These are technical advantages that reduce overhead and usage of computing resources. The techniques disclosed herein also serve to efficiently calibrate the OCR automated system to correct for misattribution errors that can arise in its operation. Thus, disclosed techniques solve the technical problem of calibrating the OCR system to accurately reflect real world conditions and, thus, calibration is achieved by eliminating the need for panelist software distributed throughout the system.

Disclosed example methods involve: receiving, at a first internet domain, a first request from a first type of computing device. In the example methods, the first request is indicative of access to media at the computing device. The example methods further involve sending a request for demographic information corresponding to requests received at the first internet domain from the first type of computing device. The requests include the first request. The example methods further involve obtaining a count of media impressions occurring on the first type of computing device, a first portion of the media impressions corresponding to persons for whom demographic information is recognizable by a database proprietor and a second portion of the media impressions corresponding to persons for whom demographic information is unavailable to the database proprietor; and determining the demographic information for the second portion of the media impressions based on a first probability that media corresponding to the media impressions is accessed on the first type of computing device and based on a second probability that media is accessed on a second type of device.

In some example methods, determining the demographic information comprises multiplying a ratio of the first probability to the second probability by a number of the media impressions attributed to a first demographic group. In some example methods, the first probability is a probability that a person in the first demographic group accesses media on the first type of computing device and the second probability is a probability that the person in the first demographic group accesses the media on the second type of computing device. Some example methods further involve adjusting the media impressions to compensate for incorrect attribution of a subset of the media impressions to second persons in a second demographic group, the number of the media impressions attributed to the first demographic group being determined from the subset of the media impressions that are adjusted to compensate for the incorrect attribution.

In some example methods, the first type of computing device comprises a mobile device and the second type of device comprises a television. In some example methods, the first type of computing device comprises at least one of a smartphone, a tablet computer, or a portable media player. In some example methods, the first and second probabilities correspond to a media category of the media. In some example methods, the media category is at least one of comedy, drama, political, reality, or a combination media category.

Some example methods further involve adjusting the media impressions, before determining the demographic information, for ones of the media impressions being incorrectly attributed to persons not having caused the ones of the media impressions. Some example methods further involve calculating the first and second probabilities based on survey responses to a survey of people, calculating the first probability comprising determining, from the survey responses, weights associated with at least one of a demographic group, a media category, a type of computing device, or a geographic region, the weights indicating respective probabilities of accessing the media associated with the media impressions on a device type of interest.

In some example methods, the survey is of at least one of a random panel or a panel of audience members maintained by an audience measurement entity. In some example methods, determining the demographic information for the portion of the media impressions involves: determining proportions of the media impressions attributable to different demographic groups corresponding to the persons and scaling the proportions of the media impressions to the portion of the media impressions.

Some example methods further involve providing instructions to a publisher, where the instructions are to be provided by the publisher to the computing device. When executed by the computing device, the instructions provided by the publisher cause the computing device to send the first request. Some example methods further involve conserving computer processing resources by not communicating with individual online users about their online media access activities and by not requesting survey responses from the online users to determine the first probability that the media corresponding to the media impressions is accessed on the first type of computing device or to determine the second probability that the media is accessed on the second type of device. Some example methods further involve conserving network communication bandwidth by not communicating with individual online users about their online media access activities and by not requesting survey responses from the online users to determine the first probability that the media corresponding to the media impressions is accessed on the first type of computing device or to determine the second probability that the media is accessed on the second type of device.

Disclosed example apparatus include an impression collector to receive, at a first internet domain, a first request from a computing device and send a request for demographic information corresponding to requests received at the first internet domain from the first type of computing device, the requests including the first request. In the disclosed example apparatus, the first request is indicative of access to media at the computing device. The disclosed example apparatus also include impression information collector to access a count of media impressions occurring on a first type of computing device, a first portion of the media impressions corresponding to persons for whom demographic information is recognizable by a database proprietor and a second portion of the media impressions corresponding to persons for whom demographic information is unavailable to the database proprietor. The disclosed example apparatus also include a non-coverage corrector to determine the demographic information for the portion of the media impressions based on a first probability that media corresponding to the media impressions is accessed on the first type of computing device and based on a second probability that media is accessed on a second type of device, at least one of the impression information collector or the non-coverage corrector being implemented by a logic circuit.

Some example apparatus further include a non-coverage calculator to multiply a ratio of the first probability to the second probability by a number of the media impressions attributed to a first demographic group. In some example apparatus, the first probability is a probability that a person in the first demographic group accesses media on the first type of computing device and the second probability is a probability that the person in the first demographic group accesses the media on the second type of computing device.

Some example apparatus further include a misattribution corrector to adjust the media impressions to compensate for incorrect attribution of a subset of the media impressions to second persons in a second demographic group, the number of the media impressions attributed to the first demographic group being determined from the subset of the media impressions that are adjusted to compensate for the incorrect attribution. In some example apparatus, the first type of computing device comprises a mobile device and the second type of computing device comprises a television. In some example apparatus, the first type of computing device comprises at least one of a smartphone, a tablet computer, or a portable media player. In some example apparatus, the non-coverage calculator is to calculate the first and second probabilities based on survey responses to a survey of people, and the non-coverage calculator is to calculate the first probability by determining, from the survey responses, weights associated with at least one of a demographic group, a media category, a type of computing device, or a geographic region, the weights indicating respective probabilities of accessing the media associated with the media impressions on a device type of interest.

In some example apparatus, the survey is of at least one of a random panel or a panel of audience members maintained by an audience measurement entity. In some example apparatus, the first and second probabilities correspond to a media category of the media. In some example apparatus, the media category is at least one of comedy, drama, political, reality, or a combination media category. In some example apparatus, the non-coverage corrector is to determine the demographic information for the portion of the media impressions by determining proportions of the media impressions attributable to different demographic groups corresponding to the persons and scaling the proportions of the media impressions to the portion of the media impressions.

Additional disclosed example methods involve receiving, at a first internet domain, a first request from a first type of computing device and sending a request for demographic information corresponding to requests received at the first internet domain from the first type of computing device, the requests including the first request. In the disclosed example methods, the first request is indicative of access to media at the computing device. The disclosed example methods further involve generating an aggregated audience distribution including a first audience distribution of a first household aggregated with a second audience distribution of a second household, the first audience distribution comprising a distribution of first household members of the first household into demographic groups, based on a survey response of the first household, of ones of the household members who are registered with a database proprietor, the first audience distribution being based on accesses to first media by the first household members; normalizing the aggregated audience distribution to generate a misattribution correction matrix, the misattribution correction matrix comprising a probability that an impression of the media is attributable to a first demographic group when the database proprietor determines the impression to correspond to a person in a second demographic group; and compensating misattribution error in the impressions by re-assigning the impressions from the second demographic group to the first demographic group using the misattribution correction matrix.

Some example methods further involve generating a correction index to correct the aggregated audience distribution for at least one of oversampling or undersampling associated with a survey calibration data source, the survey calibration data source indicating the accesses to the media by the first household members and registration statuses of the first household members with the database proprietor. In some example methods, the correction index is based on a second probability that a first person in the first demographic group lives with a second person in the second demographic group. In some example methods, generating the correction index comprises: determining, based on first survey calibration data, a first quantity of first pairs of people representing ones of the first pairs of people including a first person in the first demographic group and a second person in the second demographic group living together; determining, based on second survey calibration data, a second quantity of second pairs of people representing ones of the second pairs of people including a third person in the first demographic group and a fourth person in the second demographic group living together, the second survey calibration data having higher accuracy than the first survey calibration data; and determining a ratio of the first quantity and the second quantity.

In some example methods, the aggregated audience distribution describes, for each first demographic group, a number of people in the second demographic group who are to be attributed to that first demographic group, and normalizing the aggregated audience distribution comprises scaling respective numbers of people in the second demographic group such that a total of the number of people for the second demographic group is a designated value. Some example methods further involve determining a sharing pattern for the first household, the sharing pattern indicative of ones of the first household members who access a media category and other ones of the first household members who do not access the media category; and determining a probability density function of device sharing probabilities for the first household members in the first household based on the sharing pattern for the media category, the probability density function indicative of respective probabilities that the first household members access media in the media category, the first audience distribution being based on the device sharing probabilities.

Some example methods further involve aggregating the device sharing probabilities for the first household members when the first household has two or more registered ones of the first household members who are in a same second demographic group. Some example methods further involve generating the first audience distribution by distributing fractional numbers into the demographic groups, the fractional numbers totaling a count of those ones of the first household members who are registered with a database proprietor. In some example methods, generating the first audience distribution does not use cookies. In some example methods, generating the first audience distribution and generating the aggregated audience distribution do not use metering software to collect registration statuses of household members with the database proprietor or to collect media access data. In some example methods, re-assigning the impressions comprises determining a product of the misattribution correction matrix and an impressions matrix, the impressions matrix indicating numbers of impressions determined by the database proprietor to correspond to respective ones of the demographic groups. In some example methods, re-assigning the impressions results in a same total number of impressions as a total of the numbers of impressions in the impressions matrix.

Some example methods further involve providing instructions to a publisher, the instructions to be provided by the publisher to the computing device and, when executed by the computing device, to cause the computing device to send the first request. Some example methods further involve conserving computer processing resources by not communicating with individual online users about their online media access activities and by not requesting survey responses from the online users to generate the aggregated audience distribution. Some example methods further involve conserving network communication bandwidth by not communicating with individual online users about their online media access activities and by not requesting survey responses from the online users to generate the aggregated audience distribution.

Additional disclosed example apparatus include an impression collector to receive, at a first internet domain, a first request from a first type of computing device, and send a request for demographic information corresponding to requests received at the first internet domain from the first type of computing device, the requests including the first request. In the disclosed example apparatus, the first request is indicative of access to media at the computing device. The disclosed example apparatus also include an aggregated distribution generator to generate an aggregated audience distribution including a first audience distribution of a first household aggregated with a second audience distribution of a second household, the first audience distribution comprising a distribution of first household members of the first household into demographic groups, based on a survey response of the first household, of ones of the first household members who are registered with a database proprietor, the first audience distribution being based on accesses to first media by the first household members. The example apparatus further includes a matrix normalizer to normalize the aggregated audience distribution to generate a misattribution correction matrix, the misattribution correction matrix comprising a probability that an impression of the media is attributable to a first demographic group when the database proprietor determines the impression to correspond to a person in a second demographic group. The disclosed example apparatus further includes a misattribution corrector to compensate misattribution error in the impressions by re-assigning the impressions from the second demographic group to the first demographic group using the misattribution correction matrix, at least one of the aggregated distribution generator, the matrix normalizer, or the misattribution corrector being implemented by a logic circuit.

Some example apparatus further include a matrix corrector to generate a correction index to correct the aggregated audience distribution for at least one of oversampling or undersampling associated with a survey calibration data source, the survey calibration data source indicating the accesses to the media by the first household members and registration statuses of the first household members with the database proprietor. In some example apparatus, the correction index is based on a second probability that a first person in the first demographic group lives with a second person in the second demographic group. In some example apparatus, the matrix corrector is to generate the correction index by: determining, based on first survey calibration data, a first quantity of first pairs of people, respective ones of the first pairs of people including a first person in the first demographic group and a second person in the second demographic group living together; determining, based on second survey calibration data, a second quantity of second pairs of people, respective ones of the second pairs of people including a third person in the first demographic group and a fourth person in the second demographic group living together, the second survey calibration data having higher accuracy than the first survey calibration data; and determining a ratio of the first quantity and the second quantity.

In some example apparatus, the aggregated audience distribution describes, for each first demographic group, a number of people in the second demographic group who are to be attributed to that first demographic group, and the matrix normalizer is to normalize the aggregated audience distribution by scaling respective numbers of people in the second demographic group such that a total of the number of people for the second demographic group is a designated value.

Some example apparatus further include a household distribution generator to: determine a sharing pattern for the first household, the sharing pattern indicative of ones of the first household members who access a media category and other ones of the first household members who do not access the media category; and determine a probability density function of device sharing probabilities for the first household members in the first household based on the sharing pattern for the media category, the probability density function indicative of respective probabilities that the first household members access media in the media category, the first audience distribution being based on the device sharing probabilities.

In some example apparatus, the aggregated distribution generator is to aggregate the device sharing probabilities for the first household members when the first household has two or more registered ones of the first household members who are in a same second demographic group. Some example apparatus further include a household distribution generator to generate the first audience distribution by distributing fractional numbers into the demographic groups, the fractional numbers totaling a count of those ones of the first household members who are registered with a database proprietor. In some example apparatus, the misattribution corrector is to re-assign the impressions by determining a product of the misattribution correction matrix and an impressions matrix, the impressions matrix indicating numbers of impressions determined by the database proprietor to correspond to respective ones of the demographic groups. In some example apparatus, the misattribution corrector is to re-assign the impressions such that a total number of re-assigned impressions is a same total number of impressions as a total of the numbers of impressions in the impressions matrix.

Additional disclosed example methods involve receiving, at a first internet domain, a first request from a first type of computing device and sending a request for demographic information corresponding to requests received at the first internet domain from the first type of computing device, the requests including the first request. In the disclosed example methods, the first request is indicative of access to media at the computing device. The disclosed example methods further involve generating an aggregated audience distribution including a first audience distribution of a first household aggregated with a second audience distribution of a second household, the first audience distribution comprising a distribution of first household members of the first household into demographic groups of ones of the first household members that are registered with a database proprietor, the first audience distribution being based on accesses to first media by the first household members, and the aggregated audience distribution being generated without using cookies; normalizing the aggregated audience distribution to generate a misattribution correction matrix, the misattribution correction matrix comprising a probability that an impression of the media is attributable to a first demographic group when the database proprietor determines the impression to correspond to a person in a second demographic group; and compensating misattribution error in the impressions by re-assigning the impressions to the first demographic group using the misattribution correction matrix, the impressions being indicative of media accessed on mobile devices.

Some example methods further involve generating a correction index to correct the aggregated audience distribution for at least one of oversampling or undersampling associated with a survey calibration data source, the survey calibration data source indicating the accesses to the media by the first household members and registration statuses of the first household members with the database proprietor. In some example methods, the correction index is based on a second probability that a first person in the first demographic group lives with a second person in the second demographic group. In some example methods, generating the correction index comprises: determining, based on first survey calibration data, a first quantity of first pairs of people representing ones of the first pairs of people including a first person in the first demographic group and a second person in the second demographic group living together; determining, based on second survey calibration data, a second quantity of second pairs of people representing ones of the second pairs of people including a third person in the first demographic group and a fourth person in the second demographic group living together, the second survey calibration data having higher accuracy than the first survey calibration data; and determining a ratio of the first quantity and the second quantity.

In some example methods, the aggregated audience distribution describes, for each first demographic group, a number of people in the second demographic group who are to be attributed to that first demographic group, and normalizing the aggregated audience distribution comprises scaling respective numbers of people in the second demographic group such that a total of the number of people for the second demographic group is a designated value. Some example methods further involve determining a sharing pattern for the first household, the sharing pattern indicative of ones of the first household members who access a media category and other ones of the first household members who do not access the media category; and determining a probability density function of device sharing probabilities for the first household members in the first household based on the sharing pattern for the media category, the probability density function indicative of respective probabilities that the first household members access media in the media category, the first audience distribution being based on the device sharing probabilities.

Some example methods further involve aggregating the device sharing probabilities for the first household members when the first household has two or more registered ones of the first household members who are in a same second demographic group. Some example methods further involve generating the first audience distribution by distributing fractional numbers into the demographic groups, the fractional numbers totaling a count of those ones of the first household members who are registered with a database proprietor. In some example methods, generating the first audience distribution does not use cookies. In some example methods, generating the first audience distribution and generating the aggregated audience distribution do not use metering software to collect registration statuses of household members with the database proprietor or to collect media access data. In some example methods, re-assigning the impressions comprises determining a product of the misattribution correction matrix and an impressions matrix, the impressions matrix indicating numbers of impressions determined by the database proprietor to correspond to respective ones of the demographic groups. In some example methods, re-assigning the impressions results in a same total number of impressions as a total of the numbers of impressions in the impressions matrix.

Some example methods further involve providing instructions to a publisher, the instructions to be provided by the publisher to the computing device and, when executed by the computing device, to cause the computing device to send the first request. Some example methods further involve conserving computer processing resources by not communicating with individual online users about their online media access activities and by not requesting survey responses from the online users to generate the aggregated audience distribution. Some example methods further involve conserving network communication bandwidth by not communicating with individual online users about their online media access activities and by not requesting survey responses from the online users to generate the aggregated audience distribution.

Additional disclosed example apparatus include an impression collector to receive, at a first internet domain, a first request from a first type of computing device and send a request for demographic information corresponding to requests received at the first internet domain from the first type of computing device, the requests including the first request. In the disclosed example apparatus, the first request indicative of access to media at the computing device. The disclosed example apparatus further include an aggregated distribution generator to generate an aggregated audience distribution including a first audience distribution of a first household aggregated with a second audience distribution of a second household, the first audience distribution comprising a distribution of first household members of the first household into demographic groups of ones of the first household members that are registered with a database proprietor, the aggregated distribution generator generates the aggregated audience distribution without using cookies, and the first audience distribution is based on accesses to first media by the first household members. The example apparatus also include a matrix normalizer to normalize the aggregated audience distribution to generate the misattribution correction matrix, the misattribution correction matrix comprising a probability that an impression of the media is attributable to a first demographic group when the database proprietor determines the impression to correspond to a person in a second demographic group. The example apparatus also include a misattribution corrector to compensate misattribution error in the impressions by re-assigning the impressions to the first demographic group using the misattribution correction matrix, the impressions being indicative of media accessed on mobile devices. At least one of the aggregated distribution generator, the matrix normalizer, or the misattribution corrector is implemented by a logic circuit.

Some example apparatus further include a matrix corrector to generate a correction index to correct the aggregated audience distribution for at least one of oversampling or undersampling associated with a survey calibration data source, the survey calibration data source indicating the accesses to the media by the first household members and registration statuses of the first household members with the database proprietor. In some example apparatus, the correction index is based on a second probability that a first person in the first demographic group lives with a second person in the second demographic group. In some example apparatus, the matrix corrector is to generate the correction index by: determining, based on first survey calibration data, a first quantity of first pairs of people, respective ones of the first pairs of people including a first person in the first demographic group and a second person in the second demographic group living together; determining, based on second survey calibration data, a second quantity of second pairs of people, respective ones of the second pairs of people including a third person in the first demographic group and a fourth person in the second demographic group living together, the second survey calibration data having higher accuracy than the first survey calibration data; and determining a ratio of the first quantity and the second quantity.

In some example apparatus, the aggregated audience distribution describes, for each first demographic group, a number of people in the second demographic group who are to be attributed to that first demographic group, and the matrix normalizer is to normalize the aggregated audience distribution by scaling respective numbers of people in the second demographic group such that a total of the number of people for the second demographic group is a designated value.

Some example apparatus further include a household distribution generator to: determine a sharing pattern for the first household, the sharing pattern indicative of ones of the first household members who access a media category and other ones of the first household members who do not access the media category; and determine a probability density function of device sharing probabilities for the first household members in the first household based on the sharing pattern for the media category, the probability density function indicative of respective probabilities that the first household members access media in the media category, the first audience distribution being based on the device sharing probabilities.

In some example apparatus, the aggregated distribution generator is to aggregate the device sharing probabilities for the first household members when the first household has two or more registered ones of the first household members who are in a same second demographic group. Some example apparatus further include a household distribution generator to generate the first audience distribution by distributing fractional numbers into the demographic groups, the fractional numbers totaling a count of those ones of the first household members who are registered with a database proprietor. In some example apparatus, the misattribution corrector is to re-assign the impressions by determining a product of the misattribution correction matrix and an impressions matrix, the impressions matrix indicating numbers of impressions determined by the database proprietor to correspond to respective ones of the demographic groups. In some example apparatus, the misattribution corrector is to re-assign the impressions such that a total number of re-assigned impressions is a same total number of impressions as a total of the numbers of impressions in the impressions matrix.

Additional disclosed example methods involve: collecting media impressions from a first type of computing device; requesting demographic information for the media impressions from a database proprietor, a first portion of the media impressions corresponding to persons for whom demographic information is stored by a database proprietor and a second portion of the media impressions corresponding to persons for whom demographic information is unavailable to the database proprietor; receiving the demographic information corresponding to the first portion of the media impressions from the database proprietor; determining, using the processor, a number of media impressions in the second portion of the media impressions; and determining, using the processor, the demographic information for the second portion of the media impressions based on a first probability that media corresponding to the media impressions is accessed on the first type of computing device and based on a second probability that media is accessed on a second type of device.

Additional disclosed example methods involve receiving, at a first internet domain, a first request from a first type of computing device, the first request indicative of access to media at the computing device and receiving, at the first internet domain, a second request from the computing device, the second request indicative of access to a duration unit of the media at the computing device. The disclosed example methods further involve sending a request for demographic information corresponding to requests received at the first internet domain from the first type of computing device, the requests including the second request. The disclosed example methods further involve obtaining a count of durational units occurring on the first type of computing device, a first portion of the durational units corresponding to persons for whom demographic information is recognizable by a database proprietor and a second portion of the durational units corresponding to persons for whom demographic information is unavailable to the database proprietor, and determining the demographic information for the second portion of the durational units based on a first probability that media corresponding to the durational units is accessed on the first type of computing device and based on a second probability that media is accessed on a second type of device.

Additional disclosed example apparatus include an impression collector. In the disclosed example apparatus, the impression collector is to receive, at a first internet domain, a first request from a first type of computing device, the first request indicative of access to media at the computing device. In the disclosed example apparatus, the impression collector is also to receive, at the first internet domain, a second request from the computing device, the second request indicative of access to a duration unit of the media at the computing device. In the disclosed example apparatus, the impression collector is also to send a request for demographic information corresponding to requests received at the first internet domain from the first type of computing device, the requests including the second request. The disclosed example apparatus also include an impression information collector to access a count of duration units occurring on a first type of computing device, a first portion of the duration units corresponding to persons for whom demographic information is recognizable by a database proprietor and a second portion of the duration units corresponding to persons for whom demographic information is unavailable to the database proprietor. The disclosed example apparatus also include a non-coverage corrector to determine the demographic information for the portion of the duration units based on a first probability that media corresponding to the duration units is accessed on the first type of computing device and based on a second probability that media is accessed on a second type of device, at least one of the impression information collector or the non-coverage corrector being implemented by a logic circuit.

While examples disclosed herein are described with reference to compensating or adjusting impression information obtained from mobile devices, the examples are also applicable to non-mobile devices such as desktop computers, televisions, video game consoles, set top boxes, and/or other devices.

Impression and Demographic Information Collection

FIG. 1 depicts an example system 100 to collect user information (e.g., user information 102a, 102b) from distributed database proprietors 104a, 104b for associating with impressions of media presented at a client device 106. In the illustrated examples, user information 102a, 102b or user data includes one or more of demographic data, purchase data, and/or other data indicative of user activities, behaviors, and/or preferences related to information accessed via the Internet, purchases, media accessed on electronic devices, physical locations (e.g., retail or commercial establishments, restaurants, venues, etc.) visited by users, etc. Examples disclosed herein are described in connection with a mobile device, which may be a mobile phone, a mobile communication device, a tablet, a gaming device, a portable media presentation device, etc. However, examples disclosed herein may be implemented in connection with non-mobile devices such as internet appliances, smart televisions, internet terminals, computers, or any other device capable of presenting media received via network communications.

In the illustrated example of FIG. 1, to track media impressions on the client device 106, an audience measurement entity (AME) 108 partners with or cooperates with an app publisher 110 to download and install a data collector 112 on the client device 106. The app publisher 110 of the illustrated example may be a software app developer that develops and distributes apps to mobile devices and/or a distributor that receives apps from software app developers and distributes the apps to mobile devices. The data collector 112 may be included in other software loaded onto the client device 106, such as the operating system 114, an application (or app) 116, a web browser 117, and/or any other software. The example client device 106 of FIG. 1 is a non-locally metered device. That is, the client device 106 does not support and/or has not been provided with metering software (e.g., metering software provided by the AME 108).

Any of the example software 114-117 may present media 118 received from a media publisher 120. The media 118 may be an advertisement, video, audio, text, a graphic, a web page, news, educational media, entertainment media, or any other type of media. In the illustrated example, a media ID 122 is provided in the media 118 to enable identifying the media 118 so that the AME 108 can credit the media 118 with media impressions when the media 118 is presented on the client device 106 or any other device that is monitored by the AME 108.

The data collector 112 of the illustrated example includes instructions (e.g., Java, java script, or any other computer language or script) that, when executed by the client device 106, cause the client device 106 to collect the media ID 122 of the media 118 presented by the app program 116 and/or the client device 106, and to collect one or more device/user identifier(s) 124 stored in the client device 106. The device/user identifier(s) 124 of the illustrated example include identifiers that can be used by corresponding ones of the partner database proprietors 104a-b to identify the user or users of the client device 106, and to locate user information 102a-b corresponding to the user(s). For example, the device/user identifier(s) 124 may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), web storage data, document object model (DOM) storage data, local shared objects (also referred to as "Flash cookies"), etc. In some examples, fewer or more device/user identifier(s) 124 may be used. In addition, although only two partner database proprietors 104a-b are shown in FIG. 1, the AME 108 may partner with any number of partner database proprietors to collect distributed user information (e.g., the user information 102a-b).

In some examples, the client device 106 may not allow access to identification information stored in the client device 106. For such instances, the disclosed examples enable the AME 108 to store an AME-provided identifier (e.g., an identifier managed and tracked by the AME 108) in the client device 106 to track media impressions on the client device 106. For example, the AME 108 may provide instructions in the data collector 112 to set an AME-provided identifier in memory space accessible by and/or allocated to the app program 116, and the data collector 112 uses the identifier as a device/user identifier 124. In such examples, the AME-provided identifier set by the data collector 112 persists in the memory space even when the app program 116 and the data collector 112 are not running. In this manner, the same AME-provided identifier can remain associated with the client device 106 for extended durations. In some examples in which the data collector 112 sets an identifier in the client device 106, the AME 108 may recruit a user of the client device 106 as a panelist, and may store user information collected from the user during a panelist registration process and/or collected by monitoring user activities/behavior via the client device 106 and/or any other device used by the user and monitored by the AME 108. In this manner, the AME 108 can associate user information of the user (from panelist data stored by the AME 108) with media impressions attributed to the user on the client device 106.

In the illustrated example, the data collector 112 sends the media ID 122 and the one or more device/user identifier(s) 124 as collected data 126 to the app publisher 110. Alternatively, the data collector 112 may be configured to send the collected data 126 to another collection entity (other than the app publisher 110) that has been contracted by the AME 108 or is partnered with the AME 108 to collect media ID's (e.g., the media ID 122) and device/user identifiers (e.g., the device/user identifier(s) 124) from mobile devices (e.g., the client device 106). In the illustrated example, the app publisher 110 (or a collection entity) sends the media ID 122 and the device/user identifier(s) 124 as impression data 130 to an impression collector 132 at the AME 108. The impression data 130 of the illustrated example may include one media ID 122 and one or more device/user identifier(s) 124 to report a single impression of the media 118, or it may include numerous media ID's 122 and device/user identifier(s) 124 based on numerous instances of collected data (e.g., the collected data 126) received from the client device 106 and/or other mobile devices to report multiple impressions of media.

In the illustrated example, the impression collector 132 stores the impression data 130 in an AME media impressions store 134 (e.g., a database or other data structure). Subsequently, the AME 108 sends the device/user identifier(s) 124 to corresponding partner database proprietors (e.g., the partner database proprietors 104a-b) to receive user information (e.g., the user information 102a-b) corresponding to the device/user identifier(s) 124 from the partner database proprietors 104a-b so that the AME 108 can associate the user information with corresponding media impressions of media (e.g., the media 118) presented at mobile devices (e.g., the client device 106).

In some examples, to protect the privacy of the user of the client device 106, the media identifier 122 and/or the device/user identifier(s) 124 are encrypted before they are sent to the AME 108 and/or to the partner database proprietors 104a-b. In other examples, the media identifier 122 and/or the device/user identifier(s) 124 are not encrypted.

After the AME 108 receives the device/user identifier(s) 124, the AME 108 sends device/user identifier logs 136a-b to corresponding partner database proprietors (e.g., the partner database proprietors 104a-b). In some examples, each of the device/user identifier logs 136a-b may include a single device/user identifier, or it may include numerous aggregate device/user identifiers received over time from one or more mobile devices. After receiving the device/user identifier logs 136a-b, each of the partner database proprietors 104a-b looks up its users corresponding to the device/user identifiers 124 in the respective logs 136a-b. In this manner, each of the partner database proprietors 104a-b collects user information 102a-b corresponding to users identified in the device/user identifier logs 136a-b for sending to the AME 108. For example, if the partner database proprietor 104a is a wireless service provider and the device/user identifier log 136a includes IMEI numbers recognizable by the wireless service provider, the wireless service provider accesses its subscriber records to find users having IMEI numbers matching the IMEI numbers received in the device/user identifier log 136a. When the users are identified, the wireless service provider copies the users' user information to the user information 102a for delivery to the AME 108.

In some other examples, the data collector 112 is configured to collect the device/user identifier(s) 124 from the client device 106. The example data collector 112 sends the device/user identifier(s) 124 to the app publisher 110 in the collected data 126, and it also sends the device/user identifier(s) 124 to the media publisher 120. In such other examples, the data collector 112 does not collect the media ID 122 from the media 118 at the client device 106 as the data collector 112 does in the example system 100 of FIG. 1. Instead, the media publisher 120 that publishes the media 118 to the client device 106 retrieves the media ID 122 from the media 118 that it publishes. The media publisher 120 then associates the media ID 122 to the device/user identifier(s) 124 received from the data collector 112 executing in the client device 106, and sends collected data 138 to the app publisher 110 that includes the media ID 122 and the associated device/user identifier(s) 124 of the client device 106. For example, when the media publisher 120 sends the media 118 to the client device 106, it does so by identifying the client device 106 as a destination device for the media 118 using one or more of the device/user identifier(s) 124 received from the client device 106. In this manner, the media publisher 120 can associate the media ID 122 of the media 118 with the device/user identifier(s) 124 of the client device 106 indicating that the media 118 was sent to the particular client device 106 for presentation (e.g., to generate an impression of the media 118).

In some other examples in which the data collector 112 is configured to send the device/user identifier(s) 124 to the media publisher 120, the data collector 112 does not collect the media ID 122 from the media 118 at the client device 106. Instead, the media publisher 120 that publishes the media 118 to the client device 106 also retrieves the media ID 122 from the media 118 that it publishes. The media publisher 120 then associates the media ID 122 with the device/user identifier(s) 124 of the client device 106. The media publisher 120 then sends the media impression data 130, including the media ID 122 and the device/user identifier(s) 124, to the AME 108. For example, when the media publisher 120 sends the media 118 to the client device 106, it does so by identifying the client device 106 as a destination device for the media 118 using one or more of the device/user identifier(s) 124. In this manner, the media publisher 120 can associate the media ID 122 of the media 118 with the device/user identifier(s) 124 of the client device 106 indicating that the media 118 was sent to the particular client device 106 for presentation (e.g., to generate an impression of the media 118). In the illustrated example, after the AME 108 receives the impression data 130 from the media publisher 120, the AME 108 can then send the device/user identifier logs 136a-b to the partner database proprietors 104a-b to request the user information 102a-b as described above in connection with FIG. 1.

Although the media publisher 120 is shown separate from the app publisher 110 in FIG. 1, the app publisher 110 may implement at least some of the operations of the media publisher 120 to send the media 118 to the client device 106 for presentation. For example, advertisement providers, media providers, or other information providers may send media (e.g., the media 118) to the app publisher 110 for publishing to the client device 106 via, for example, the app program 116 when it is executing on the client device 106. In such examples, the app publisher 110 implements the operations described above as being performed by the media publisher 120.

Additionally or alternatively, in contrast with the examples described above in which the client device 106 sends identifiers to the audience measurement entity 108 (e.g., via the application publisher 110, the media publisher 120, and/or another entity), in other examples the client device 106 (e.g., the data collector 112 installed on the client device 106) sends the identifiers (e.g., the user/device identifier(s) 124) directly to the respective database proprietors 104a, 104b (e.g., not via the AME 108). In such examples, the example client device 106 sends the media identifier 122 to the audience measurement entity 108 (e.g., directly or through an intermediary such as via the application publisher 110), but does not send the media identifier 122 to the database proprietors 104a-b.

As mentioned above, the example partner database proprietors 104a-b provide the user information 102a-b to the example AME 108 for matching with the media identifier 122 to form media impression information. As also mentioned above, the database proprietors 104a-b are not provided copies of the media identifier 122. Instead, the client provides the database proprietors 104a-b with impression identifiers 140. An impression identifier uniquely identifies an impression event relative to other impression events of the client device 106 so that an occurrence of an impression at the client device 106 can be distinguished from other occurrences of impressions. However, the impression identifier 140 does not itself identify the media associated with that impression event. In such examples, the impression data 130 from the client device 106 to the AME 108 also includes the impression identifier 140 and the corresponding media identifier 122. To match the user information 102a-b with the media identifier 122, the example partner database proprietors 104a-b provide the user information 102a-b to the AME 108 in association with the impression identifier 140 for the impression event that triggered the collection of the user information 102a-b. In this manner, the AME 108 can match the impression identifier 140 received from the client device 106 to a corresponding impression identifier 140 received from the partner database proprietors 104a-b to associate the media identifier 122 received from the client device 106 with demographic information in the user information 102a-b received from the database proprietors 104a-b. The impression identifier 140 can additionally be used for reducing or avoiding duplication of demographic information. For example, the example partner database proprietors 104a-b may provide the user information 102a-b and the impression identifier 140 to the AME 108 on a per-impression basis (e.g., each time a client device 106 sends a request including an encrypted identifier 208a-b and an impression identifier 140 to the partner database proprietor 104a-b) and/or on an aggregated basis (e.g., send a set of user information 102a-b, which may include indications of multiple impressions at a mobile device 102a-b (e.g., multiple impression identifiers 140), to the AME 108 presented at the client device 106).

The impression identifier 140 provided to the AME 108 enables the AME 108 to distinguish unique impressions and avoid overcounting a number of unique users and/or devices viewing the media. For example, the relationship between the user information 102a from the partner A database proprietor 104a and the user information 102b from the partner B database proprietor 104b for the client device 106 is not readily apparent to the AME 108. By including an impression identifier 140 (or any similar identifier), the example AME 108 can associate user information corresponding to the same user between the user information 102a-b based on matching impression identifiers 140 stored in both of the user information 102a-b. The example AME 108 can use such matching impression identifiers 140 across the user information 102a-b to avoid overcounting mobile devices and/or users (e.g., by only counting unique users instead of counting the same user multiple times).

A same user may be counted multiple times if, for example, an impression causes the client device 106 to send multiple user/device identifiers to multiple different database proprietors 104a-b without an impression identifier (e.g., the impression identifier 140). For example, a first one of the database proprietors 104a sends first user information 102a to the AME 108, which signals that an impression occurred. In addition, a second one of the database proprietors 104b sends second user information 102b to the AME 108, which signals (separately) that an impression occurred. In addition, separately, the client device 106 sends an indication of an impression to the AME 108. Without knowing that the user information 102a-b is from the same impression, the AME 108 has an indication from the client device 106 of a single impression and indications from the database proprietors 104a-b of multiple impressions.

To avoid overcounting impressions, the AME 108 can use the impression identifier 140. For example, after looking up user information 102a-b, the example partner database proprietors 104a-b transmit the impression identifier 140 to the AME 108 with corresponding user information 102a-b. The AME 108 matches the impression identifier 140 obtained directly from the client device 106 to the impression identifier 140 received from the database proprietors 104a-b with the user information 102a-b to thereby associate the user information 102a-b with the media identifier 122 and to generate impression information. This is possible because the AME 108 received the media identifier 122 in association with the impression identifier 140 directly from the client device 106. Therefore, the AME 108 can map user data from two or more database proprietors 104*a*-*b* to the same media exposure event, thus avoiding double counting.

Each unique impression identifier 140 in the illustrated example is associated with a specific impression of media on the client device 106. The partner database proprietors 104*a*-*b* receive the respective user/device identifiers 124 and generate the user information 102*a*-*b* independently (e.g., without regard to others of the partner database proprietors 104*a*-*b*) and without knowledge of the media identifier 122 involved in the impression. Without an indication that a particular user demographic profile in the user information 102*a* (received from the partner database proprietor 104*a*) is associated with (e.g., the result of) the same impression at the client device 106 as a particular user demographic profile in the user information 102*b* (received from the partner database proprietor 104*b* independently of the user information 102*a* received from the partner database proprietor 104*a*), and without reference to the impression identifier 140, the AME 108 may not be able to associate the user information 102*a* with the user information 102*b* and/or cannot determine that the different pieces of user information 102*a*-*b* are associated with a same impression and could, therefore, count the user information 102*a* and the user information 102*b* as corresponding to two different users/devices and/or two different impressions.

The above examples illustrate methods and apparatus for collecting impression data at an audience measurement entity (or other entity). The examples discussed above may be used to collect impression information for any type of media, including static media (e.g., advertising images), streaming media (e.g., streaming video and/or audio, including content, advertising, and/or other types of media), and/or other types of media. For static media (e.g., media that does not have a time component such as images, text, a webpage, etc.), the example AME 108 records an impression once for each occurrence of the media being presented, delivered, or otherwise provided to the client device 106. For streaming media (e.g., video, audio, etc.), the example AME 108 measures demographics for media occurring over a period of time. For example, the AME 108 (e.g., via the app publisher 110 and/or the media publisher 120) provides beacon instructions to a client application or client software (e.g., the OS 114, the web browser 117, the app 116, etc.) executing on the client device 106 when media is loaded at client application/software 114-117. In some examples, the beacon instructions cause the client application/software 114-117 to transmit a request (e.g., a pingback message) to the impression collector 132 at regular and/or irregular intervals (e.g., every minute, every 30 seconds, every 2 minutes, etc.). By monitoring and/or counting the requests occurring at intervals, the example AME 108 monitors the duration of individual impressions of duration-based media (e.g., video, audio, etc.). The example AME 108 may determine the numbers of impressions (e.g., initial loads) of the duration-based media, the unique audience of duration-based media, and/or the total duration (in units, such as seconds or minutes) of the duration-based media viewed in the numbers of impressions. As used herein, the term "impression information" may include impressions and/or duration units. The example impression collector 132 identifies the requests from the web browser 117 and, in combination with one or more database proprietors, matches the impression information for the media with demographics of the user of the web browser 117.

In some examples, a user loads (e.g., via the browser 117) a web page from a web site publisher, in which the web page corresponds to a particular 60 minute video. As a part of or in addition to the example web page, the web site publisher causes the data collector 112 to send a pingback message (e.g., a beacon request) to a beacon server 142 by, for example, providing the browser 117 with beacon instructions. For example, when the beacon instructions are executed by the example browser 117, the beacon instructions cause the data collector 112 to send pingback messages (e.g., beacon requests, HTTP requests, pings) to the impression collector 132 at designated intervals (e.g., once every minute or any other suitable interval). The example beacon instructions (or a redirect message from, for example, the impression collector 132 or a database proprietor 104*a*-*b*) further cause the data collector 112 to send pingback messages or beacon requests to one or more database proprietors 104*a*-*b* that collect and/or maintain demographic information about users. The database proprietor 104*a*-*b* transmits demographic information about the user associated with the data collector 112 for combining or associating with the impression determined by the impression collector 132. If the user closes the web page containing the video before the end of the video, the beacon instructions are stopped, and the data collector 112 stops sending the pingback messages to the impression collector 132. In some examples, the pingback messages include timestamps and/or other information indicative of the locations in the video to which the numerous pingback messages correspond. By determining a number and/or content of the pingback messages received at the impression collector 132 from the client device 106, the example impression collector 132 can determine that the user watched a particular length of the video (e.g., a portion of the video for which pingback messages were received at the impression collector 132).

The client device 106 of the illustrated example executes a client application/software 114-117 that is directed to a host website (e.g., www.acme.com) from which the media 118 (e.g., audio, video, interactive media, streaming media, etc.) is obtained for presenting via the client device 106. In the illustrated example, the media 118 (e.g., advertisements and/or content) is tagged with identifier information (e.g., a media ID 122, a creative type ID, a placement ID, a publisher source URL, etc.) and a beacon instruction. The example beacon instruction causes the client application/software 114-117 to request further beacon instructions from a beacon server 142 that will instruct the client application/software 114-117 on how and where to send beacon requests to report impressions of the media 118. For example, the example client application/software 114-117 transmits a request including an identification of the media 118 (e.g., the media identifier 122) to the beacon server 142. The beacon server 142 then generates and returns beacon instructions 144 to the example client device 106. Although the beacon server 142 and the impression collector 132 are shown separately, in some examples the beacon server 142 and the impression collector 132 are combined. In the illustrated example, beacon instructions 144 include URLs of one or more database proprietors (e.g., one or more of the partner database proprietors 104*a*-*b*) or any other server to which the client device 106 should send beacon requests (e.g., impression requests). In some examples, a pingback message or beacon request may be implemented as an HTTP request. However, whereas a transmitted HTTP request identifies a webpage or other resource to be downloaded, the pingback message or beacon request includes the audience measurement information (e.g., ad campaign identification, content identifier, and/or device/user identification information) as its payload. The server to which the pingback message or beacon request is directed is programmed to log the audience measurement data of the pingback message or beacon request as an impression (e.g., an ad and/or content impression depending on the nature of the media tagged with the beaconing instructions). In some examples, the beacon instructions received with the tagged media 118 include the beacon instructions 144. In such examples, the client application/software 114-117 does not need to request beacon instructions 144 from a beacon server 142 because the beacon instructions 144 are already provided in the tagged media 118.

When the beacon instructions 144 are executed by the client device 106, the beacon instructions 144 cause the client device 106 to send beacon requests (e.g., repeatedly at designated intervals) to a remote server (e.g., the impression collector 132, the media publisher 120, the database proprietors 104*a-b*, or another server) specified in the beacon instructions 144. In the illustrated example, the specified server is a server of the audience measurement entity 108, namely, at the impression collector 132. The beacon instructions 144 may be implemented using Javascript or any other types of instructions or script executable via a client application (e.g., a web browser) including, for example, Java, HTML, etc.

Examples that may be used to implement the system of FIG. 1 are disclosed in U.S. patent application Ser. No. 14/127,414, filed on Aug. 28, 2013, U.S. patent application Ser. No. 14/261,085, filed on Apr. 24, 2014, U.S. Provisional Patent Application Ser. No. 61/952,726, filed on Mar. 13, 2014, U.S. Provisional Patent Application Ser. No. 61/979,391, filed on Apr. 14, 2014, U.S. Provisional Patent Application Ser. No. 61/986,784, filed on Apr. 30, 2014, U.S. Provisional Patent Application Ser. No. 61/991,286, filed on May 9, 2014, and U.S. Provisional Patent Application Ser. No. 62/014,659, filed Jun. 19, 2014. The entireties of U.S. patent application Ser. No. 14/127,414, U.S. patent application Ser. No. 14/261,085, U.S. Provisional Patent Application Ser. No. 61/952,726, U.S. Provisional Patent Application Ser. No. 61/979,391, U.S. Provisional Patent Application Ser. No. 61/986,784, U.S. Provisional Patent Application Ser. No. 61/991,286, and U.S. Provisional Patent Application Ser. No. 62/014,659 are incorporated by reference herein.

The examples of FIGS. 2-11 may be used to compensate for misattribution and/or non-coverage error in impression information collected from client devices through which users access media. Such impression information may be collected using any suitable techniques, including example techniques discussed above. For example, the impression information collected from the database proprietors 104*a-b* may be aggregated impression information describing the numbers of impressions for a media item of interest (e.g., an advertisement, streaming media, a web site, etc.), a number of duration units (e.g., minutes, seconds, etc.) for which duration-based media is presented, and/or a count of audience members corresponding to the impressions. The aggregated impression information obtained from the database proprietors 104*a-b* may be subject to misattribution error (e.g., error resulting from the database proprietor incorrectly associating an impression with a first person in a first demographic group when the impression should be associated with a second person in a second demographic group) and/or non-coverage error (e.g., error resulting from the database proprietor not being able to associate an impression with a person). Because impressions and/or duration units that cannot be associated with demographic information by the database proprietors 104*a-b* may not be included in the aggregated demographic information, in some disclosed examples, non-coverage error in the aggregated impression information may be detected using, for example, counting impressions at the AME 108 and comparing the counted impressions to a number of impressions for which the database proprietors 104*a-b* recognize demographic information. In some other examples, the database proprietors 104*a-b* return numbers of impressions and/or duration units for which the database proprietors 104*a-b* were unable to determine demographic information. The number of impressions and/or duration units for which the database proprietors 104*a-b* were unable to determine demographic information may be used as a number of non-covered impressions.

Examples disclosed herein use survey calibration data to estimate the respective errors and to generate compensated impression information that is adjusted to correct for the misattribution error and/or the non-coverage error. Examples disclosed herein may be used for impressions and/or duration units collected from client devices (e.g., mobile and/or non-mobile devices), may be applied to impressions and/or duration units collected from mobile devices only, may be applied to impressions and/or duration units collected from mobile devices separately from being applied to impressions and/or duration units collected from non-mobile devices, and/or may be applied to impressions and/or duration units collected from a first type of mobile device separately from being applied to impressions collected from a second type of mobile device. Compensated impression information is, in some examples, presented or reported separately for mobile devices and non-mobile devices and/or reported as aggregate data corresponding to both mobile devices and non-mobile devices.

Examples disclosed herein can be applied to incoming data in real-time or substantially real-time (e.g., within seconds or minutes of receiving the data), and may be used to compensate impression information (e.g., impressions, duration units) for any desirable time period (e.g., hourly, daily, weekly, monthly, etc.) and/or cumulatively (e.g., applied to impressions and/or duration units collected over numerous time periods). Therefore, examples disclosed herein may provide accurate demographic information to advertisers and/or media distributors to enable more rapid adjustment of media campaign strategies to fit measured demographics than known methods.

Figure 2:
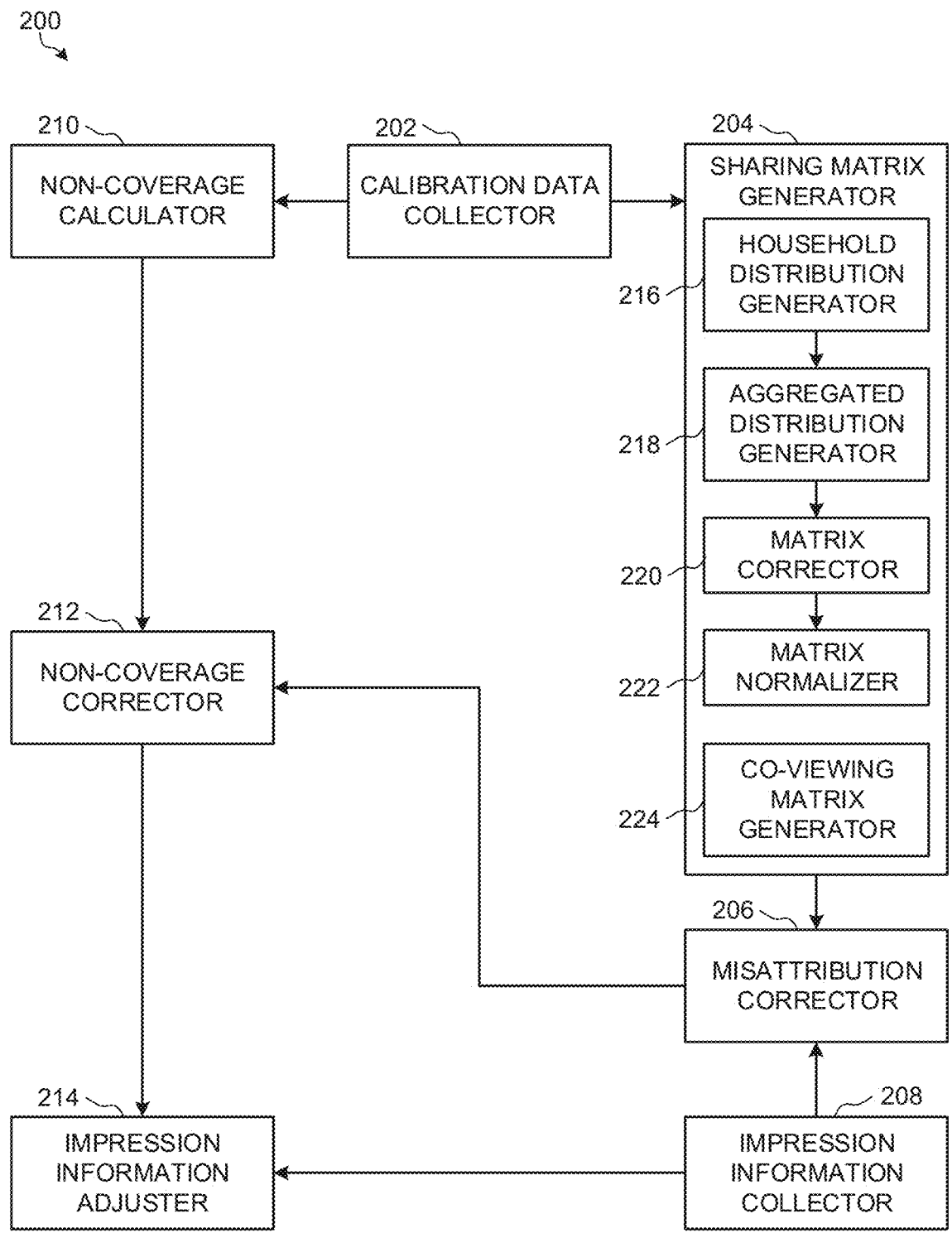
FIG. 2 is an example impression data compensator which may be implemented in the example audience measurement server of FIG. 1 to compensate impression data for inaccuracies related to misattribution and non-coverage arising from impression collection techniques of a database proprietor.

FIG. 2 is a block diagram of an example impression data compensator 200 which may be used to implement the example impression collector 132 of FIG. 1 to compensate impression information for misattribution and/or non-coverage errors. The example impression data compensator 200 of FIG. 2 compensates or adjusts impression information obtained from client devices (e.g., the client device 106 of FIG. 1) and/or from the database proprietors 104*a*-104*b* to reduce (e.g., avoid) errors such as those mentioned above.

The example impression data compensator 200 of FIG. 2 includes a calibration data collector 202, a sharing matrix generator 204, a misattribution corrector 206, an impression information collector 208, a non-coverage calculator 210, a non-coverage corrector 212, and an impression information adjuster 214.

The example calibration data collector 202 of FIG. 2 collects or obtains survey calibration data describing mobile device usage characteristics of an audience. For example, the survey calibration data may include and/or be based on responses to a survey of households selected at random. In some examples, a calibration survey obtains information including the number of persons in the household, the demographic characteristics of the household (e.g., age and gender, race, ethnicity, language characteristics, household income, geographic location, etc.), the numbers and/or types of mobile devices (e.g., smartphones, tablet computers, portable media players, etc.) present in the household, and/or registrations of persons in the household with specified database proprietors (e.g., the partner database proprietors 104a-b of FIG. 1). In some examples, the calibration survey obtains, for each person in the household, usage characteristics of each of the mobile devices and/or types of mobile devices present in the household; media categories typically viewed by the person; media categories typically viewed by the person on each mobile device and/or type of mobile device in the household; apps used by the person on each mobile device and/or type of mobile device in the household; and/or characteristics of interactions with specified database proprietors on each mobile device and/or type of mobile device in the household. The example calibration data collector 202 obtains the survey calibration data from at least a threshold number of households and, if appropriate, weights the results to be reflective of a general population or audience.

In some other examples, the survey calibration data source includes a survey of established panel(s) of respondents, such as the Nielsen National People Meter (NPM) panel for television ratings. Surveys of established panels often provide higher quality survey calibration data. In some examples, data from multiple surveys is used to calculate different compensation factors and/or is used in combination to calculate compensation factors.

Misattribution Correction

The example sharing matrix generator 204 of FIG. 2 calculates device sharing matrices based on the survey calibration data. In the example of FIG. 2, the sharing matrix generator 204 creates a separate misattribution correction matrix for each combination of device type and media category represented in the survey calibration data.

To generate a misattribution correction matrix for a device type and a media category of interest, the example sharing matrix generator 204 includes a household distribution generator 216, an aggregated distribution generator 218, a matrix corrector 220, and a matrix normalizer 222.

The example household distribution generator 216 of FIG. 2 generates an audience distribution of a household based on survey calibration data. For example, the household distribution generator 216 determines the respective likelihoods of persons represented in the survey calibration data to view media of the media category of interest using the device type of interest. To illustrate, consider the following example. An example household from which survey calibration data is collected includes four members: 1) a 45-54 year old male, 2) a 35-44 year old female, 3) an 18-24 year old female, and 4) a 12-17 year old male. The 18-24 year old female and the 12-17 year old male have registered with (e.g., are recognizable as registered users by) the example database proprietor 104a (e.g., Facebook) of FIG. 1 and access the database proprietor 104a using the tablet computer (e.g., the client device 106 of FIG. 1) (though not simultaneously). The 45-54 year old male and the 35-44 year old female are not recognizable by the database proprietor 104a on the tablet computer. Table 1 below illustrates an example sharing pattern for the tablet computer by media category. In Table 1, cells marked with an "X" indicate that the person noted at the demographic group label of the cell views media in the category noted in the content type label. Conversely, blank cells in Table 1 indicate that the person noted at the demographic group label of the cell does not view media in the category noted in the content type label.

Media categories may be defined based on, for example, media categories used in the survey calibration data and/or media categories used in television and/or other media ratings.

TABLE 1

EXAMPLE SHARING PATTERN FOR TABLET COMPUTER BY MEDIA CATEGORY IN EXAMPLE FIRST HOUSEHOLD BASED ON SURVEY CALIBRATION DATA

| | Demographic Groups | | | |
|---|---|---|---|---|
| Content Type | M45-54 | F35-44 | M12-17 | F18-24 |
| All | X | X | | X |
| Political | X | | | |
| Drama | | X | | X |
| Comedy | | X | | X |
| Reality | | X | | |

As shown in Table 1, the 45-54 year old male views media (e.g., web sites, streaming media, etc.) categorized as political media using the tablet computer, the 35-44 year old female views media (e.g., web sites, streaming media, etc.) categorized as drama, comedy, and/or reality on the tablet computer, and the 18-24 year old female views media (e.g., web sites, streaming media, etc.) categorized as drama and comedy using the tablet computer. While the 12-17 year old male uses the tablet to log into the database proprietor 104a, he does not view media monitored by the audience measurement entity 108 on the tablet computer. Based on the sharing pattern of Table 1, the example household distribution generator 216 calculates device sharing probabilities for each of the media categories of Table 1, as shown in Table 2 below. The device sharing probabilities are shown in Table 2 as probability density functions (PDFs) that the persons identified in the demographic group label views the type of content (e.g., media category) on the device.

TABLE 2

EXAMPLE DEVICE SHARING PROBABILITIES BY MEDIA CATEGORY FOR THE FIRST EXAMPLE HOUSEHOLD

| | Demographic Groups | | | |
|---|---|---|---|---|
| Content Type | M45-54 | F35-44 | M12-17 | F18-24 |
| All | 0.33 | 0.33 | 0 | 0.33 |
| Political | 1 | 0 | 0 | 0 |
| Drama | 0 | 0.5 | 0 | 0.5 |
| Comedy | 0 | 0.5 | 0 | 0.5 |
| Reality | 0 | 1 | 0 | 0 |

In this example, if the 12-17 year old male logs into the database proprietor on the tablet computer (e.g., via the browser and/or an app) and does not log out of the database proprietor, and the 35-44 year old female subsequently uses the same tablet computer (while the 12-17 year old male is still logged into the database proprietor 104a) and does not log in to the database proprietor 104a with her own credentials, the database proprietor 104a misattributes impressions and/or duration units to the 12-17 year old male that are properly attributable to the 35-44 year old female while she views media on the tablet computer. Thus, in such examples the use of the database proprietor information to associate impressions and/or duration units with demographic information results in no attribution (or under-attribution) of impressions and/or duration units to the 45-54 year old male and the 35-44 year old female, and over-attribution of impressions and/or duration units to the 18-24 year old female and/or the 12-17 year old male.

To determine the misattribution correction matrix for the household for tablet computers and the 'comedy' category, the example household distribution generator 216 converts the 'comedy' probabilities in Table 2 above to an example redistributed audience matrix shown in Table 3 below. In Table 3, the columns (recognized demographic group i) represent the demographic group identified by the database proprietor 104a as associated with an impression, and the rows (actual viewer demographic group j) represent the demographic group actually viewing (e.g., actual viewers) the media corresponding to the impression. Thus, Table 3 includes PDFs that when a person is identified by the database proprietor as being a person in the recognized demographic group i, the actual or true viewer is a person in the actual viewer demographic group j. The value in each cell is the probability $\gamma_{ij}$ that the actual viewer demographic group j of that row is viewing the media when the database proprietor 104a associates an impression for the media with the recognized demographic group i in the column.

TABLE 3

EXAMPLE REDISTRIBUTED AUDIENCE MATRIX FOR "COMEDY" MEDIA CATEGORY FOR FIRST EXAMPLE HOUSEHOLD

| | i | | | |
|---|---|---|---|---|
| j | M45-54 | F35-44 | M12-17 | F18-24 |
| M45-54 | 0 | 0 | 0 | 0 |
| F35-44 | 0 | 0 | 0.5 | 0.5 |
| M12-17 | 0 | 0 | 0 | 0 |
| F18-24 | 0 | 0 | 0.5 | 0.5 |
| Total | 0 | 0 | 1 | 1 |

As an example of determining impressions from the redistributed audience matrix of Table 3 for the household, for 10 impressions in the 'comedy' media category that are recognized by the database proprietor 104a as being viewed by the 12-17 year old male in the recognized demographic group i, five of the impressions should be credited to the 35-44 year old female in the actual viewer demographic group j (e.g., 10 impressions multiplied by a probability of 0.5 in Table 3), five of the impressions should be credited to the 18-24 year old female in the actual viewer demographic group j (e.g., 10 impressions multiplied by a probability of 0.5 in Table 3), and none of the impressions should be credited to the 12-17 year old male or the 45-54 year old male in the actual viewer demographic group j (e.g., 10 impressions multiplied by a probability of 0 in Table 3).

The example household distribution generator 216 may use PDFs in Table 2 and/or Table 3 in which the PDF has different probabilities for different demographic group label (Table 2) and/or different probabilities for different actual viewer demographic groups (Table 3). For example, the different probabilities in a PDF may be determined from the survey calibration data when one of the members of the household views the media category of interest significantly more often than another one of the members of the household. For example, if the 35-44 year old female of Table 2 reports viewing media in the 'comedy' category 'often,' while the 18-24 year old female of Table 2 reports viewing media in the 'comedy' category 'rarely,' the PDF for the 'comedy' category in Table 2 may be (0, 0.75, 0, 0.25) to reflect the different frequencies of viewing. Additionally or alternatively, the example household distribution generator 216 may use PDFs having different probabilities in the example sharing matrix of Table 2 based on the presence of multiple people in the same demographic group. For example, a household having two females aged 12-17 and one female aged 35-44 may have a PDF in which in the F12-17 demographic group has a probability that is twice the probability of the F35-44 demographic group.

The example aggregated distribution generator 218 of FIG. 2 generates an aggregated redistributed audience matrix for each combination of device type and media category based on all of the households in the example survey calibration data.

In some examples, the household distribution generator 216 generates separate device sharing matrices from the survey responses of individual households and the aggregated distribution generator 218 aggregates the individual redistributed audience matrices into an aggregated redistributed audience matrix. For example, the household distribution generator 216 may redistribute persons in a recognized demographic group i identifiable by the database proprietor 104a within a household. Thus, the household distribution generator 216 also redistributes the impressions associated with those persons to actual viewer demographic groups j based on the survey calibration data.

In another example of a redistributed audience matrix, Table 4 below shows example device sharing probabilities by media category for a household having two females of the same recognized demographic group i (e.g., recognized by the database proprietor 104a as the viewers of media corresponding to impressions) shown as 18-24 year old females (F18-24). In the illustrated example, the two females in the F18-24 demographic group are identifiable registered users of the database proprietor 104a belonging to the F18-24 demographic group.

TABLE 4

EXAMPLE DEVICE SHARING PROBABILITIES BY MEDIA CATEGORY FOR A SECOND EXAMPLE HOUSEHOLD

| Content Type | M45-54 | F35-44 | F18-24 | F18-24 |
|---|---|---|---|---|
| All | 0.33 | 0.33 | 0 | 0.33 |
| Political | 1 | 0 | 0 | 0 |
| Drama | 0 | 0.5 | 0 | 0.5 |
| Comedy | 0 | 0.5 | 0 | 0.5 |
| Reality | 0 | 1 | 0 | 0 |

The cells of Table 4 above include probability density functions (PDFs) indicative of probabilities that a media device is shared between people belonging to the specified recognized demographic groups i (e.g., one person in the M45-54 demographic group, one person in the F35-44 demographic group, and 2 people in the F18-24 demographic group) for the specified media categories (e.g., all, political, drama, comedy, reality). For example, the PDF that media in the "All" media category is viewed is 0.33 for each of the person in the M45-54 recognized demographic group i, the person in the F35-44 recognized demographic group i, and one of the people in the F18-24 recognized demographic group i. In the illustrated example, the PDF is 0 for the other person in the F18-24 recognized demographic group i. The data in Table 4 is based on a survey calibration data source (e.g., a survey of persons and/or households selected at random) that provides information about the media viewing by persons in the household.

In the illustrated example, the two females in the F18-24 recognized demographic group i of the example household represented by Table 4 above are registered users of the database proprietor 104a (e.g., a social network service). Based on the data of Table 4 above, the household distribution generator 216 redistributes the audience (and, thus, the associated impressions) of each registered database proprietor user (e.g., the viewers in the F18-24 demographic group) across the actual viewer demographic groups j M45-54, F35-44, and F18-24 in the household who view media in the category of interest, based on the device sharing patterns and viewing patterns collected from the household in the example survey calibration data source. Example redistributed audience for the "All" media category and the second example household of Table 4 is shown below in Table 5.

TABLE 5

EXAMPLE REDISTRIBUTED AUDIENCE MATRIX FOR "ALL" CATEGORY

| | i | | | |
|---|---|---|---|---|
| j | M45-54 | F35-44 | F18-24 | F18-24 |
| M45-54 | 0 | 0 | 0.33 | 0.33 |
| F35-44 | 0 | 0 | 0.33 | 0.33 |
| F18-24 | 0 | 0 | 0 | 0 |
| F18-24 | 0 | 0 | 0.33 | 0.33 |
| Total | 0 | 0 | 1 | 1 |

In Table 5 above, the household distribution generator 216 applies the same PDF (e.g., 0.33) to every registered database proprietor user in the same recognized demographic group i (e.g., the two household members of demographic group F18-24). In the illustrated example of Table 5, the cell values indicate the respective probabilities that when a person in the household is recognized by the database proprietor as a person in the recognized demographic group i (i.e., the person and/or demographic group indicated in the column), the actual or true viewer is a person in the true or actual viewer demographic group j (i.e., the person and/or demographic group indicated in the row). For example, the probability that the true viewer of media in the "All" category is the person in the M45-54 actual viewer demographic group j when the database proprietor recognizes the first person in the F18-24 recognized demographic group i is 0.33. In this example, the probability is the same (e.g., 0.33) that the true or actual viewer of media in the "All" category is the person in the M45-54 actual viewer demographic group j when the database proprietor recognizes the second person in the F18-24 recognized demographic group i.

In the illustrated example, it does not matter if the female viewers in the F18-24 recognized demographic group i indicate that they view a particular media category on a particular device represented by the example redistributed audience matrix of Table 5. As long as the database proprietor 104a captures impressions and/or duration units related to that particular device, the household distribution generator 216 can redistribute the impressions and/or duration units equally across all of the actual viewer demographic groups j M45-54, F35-44, and F18-24 of that household. Thus, both columns labeled F18-24 (e.g., corresponding to the two daughters of the household) are populated with equal redistributions of 0.33 (for the M45-54 actual viewer demographic group j), 0.33 (for the F35-44 actual viewer demographic group j), and 0.33 (for the F18-24 actual viewer demographic group j). The probability values in the same row for the F18-24 actual viewer demographic groups j are then summed across the F18-24 columns because the values correspond to the same recognized demographic groups i F18-24. The cells in the "Total" row indicate the number of audience members within a corresponding recognized demographic group i (M45-54, F35-44, F18-24) that are registered users of the database proprietor 104a.

Table 6 below shows an example redistributed audience matrix across "All" genres in which the summed values for the F18-24 recognized demographic group i are shown.

TABLE 6

EXAMPLE REDISTRIBUTED AUDIENCE MATRIX FOR "ALL" MEDIA CATEGORY FOR HOUSEHOLD WITH TWO PERSONS IN F18-24 DEMOGRAPHIC GROUP

| | i | | |
|---|---|---|---|
| j | M45-54 | F35-44 | F18-24 |
| M45-54 | 0 | 0 | 0.66 |
| F35-44 | 0 | 0 | 0.66 |
| M12-17 | 0 | 0 | 0 |
| F18-24 | 0 | 0 | 0.66 |
| Total | 0 | 0 | 2 |

In example Table 6 above, each column (the recognized demographic groups i M45-54, F35-44, and F18-24) corresponds to the total number of registered users of the database proprietor 104a in recognized demographic group i in the household. The cells in the "Total" row indicate the number of audience members within a corresponding recognized demographic group i (e.g., M54-54, F35-44, F18-24) that are registered users of the database proprietor 104a. In some examples, the actual viewer demographic groups j (e.g., the rows) of the redistributed audience matrix of Table 6 are expanded to include all recognized demographic groups i used by the audience measurement entity 108 and/or the database proprietor 104a to enable aggregation of the matrices. Thus, although the household represented by Table 6 above does not have any household members in the actual viewer demographic group M12-17, the example Table 6 above includes a M12-17 row to enable aggregating the PDFs of Table 6 with the PDFs of Table 7 below.

After the device sharing probabilities shown in Table 4 are used to generate a redistributed audience matrix for the second household as described above in connection with Tables 5 and 6, the redistributed audience matrices of Tables 6 and 7 are aggregated (e.g., summed) across households to combine registered users of the database proprietor 104a in recognized demographic group i and to sum the redistributed audience for the actual viewer demographic groups j. For example, the redistributed audience of Table 6 above and Table 7 below are aggregated to generate the cross-household aggregated redistributed audience shown in Table 8 below. In the illustrated example, Tables 6 and 7 correspond to two different households.

TABLE 7

EXAMPLE REDISTRIBUTED AUDIENCE MATRIX FOR "ALL" MEDIA CATEGORY FOR HOUSEHOLD WITH ONE M12-17 PERSON AND ONE F18-24 PERSON

| | i | | | |
|---|---|---|---|---|
| j | M45-54 | F35-44 | M12-17 | F18-24 |
| M45-54 | 0 | 0 | 0.33 | 0.33 |
| F35-44 | 0 | 0 | 0.33 | 0.33 |
| M12-17 | 0 | 0 | 0 | 0 |

TABLE 7-continued

EXAMPLE REDISTRIBUTED AUDIENCE MATRIX
FOR "ALL" MEDIA CATEGORY FOR HOUSEHOLD
WITH ONE M12-17 PERSON AND ONE F18-24 PERSON

| | i | | | |
|---|---|---|---|---|
| j | M45-54 | F35-44 | M12-17 | F18-24 |
| F18-24 | 0 | 0 | 0.33 | 0.33 |
| Total | 0 | 0 | 1 | 1 |

TABLE 8

EXAMPLE AGGREGATED REDISTRIBUTED AUDIENCE
MATRIX FOR "ALL" MEDIA CATEGORY FOR
MULTIPLE HOUSEHOLDS

| | i | | | |
|---|---|---|---|---|
| j | M45-54 | F35-44 | M12-17 | F18-24 |
| M45-54 | 0 | 0 | 0.33 | 1 |
| F35-44 | 0 | 0 | 0.33 | 1 |
| M12-17 | 0 | 0 | 0 | 0 |
| F18-24 | 0 | 0 | 0.33 | 1 |
| Total | 0 | 0 | 1 | 3 |

The probabilities in Table 8 above reflect the redistributed audience for registered users of the database proprietor 104a across the two households represented in corresponding ones of Tables 6 and 7. The sums of the M12-17 and F18-24 recognized demographic group i columns reflect the total number of registered users of the database proprietor 104 in recognized demographic group i. The cells in the "Total" row indicate the number of audience members within a corresponding recognized demographic group i (M45-54, F35-44, M12-17, F18-24) that are registered users of the database proprietor 104a.

In some examples, matrix corrector 220 generates a Nielsen national people meter (NPM) index to account for probabilities of demographic pairs i, j (e.g., one person from the recognized demographic group i and one person from the actual viewer demographic group j) living together in the same household. For example, $P(L)_{ij}$ is the probability that a first person in recognized demographic group i lives in the same household as a person in actual viewer demographic group j. In the illustrated example, the NPM index is another source of calibration data. In examples disclosed herein, NPM data is collected from households in which a meter installed by the AME 108 (FIG. 1) collects identifications of household members when those household members view/listen to media via a media device associated with the household. Because NPM data is collected at households using locally-installed meters that prompt household members to identify themselves (or otherwise accurately collect identifications of household members viewing/listening to media), NPM data has a high degree of accuracy related to identifying which household members are actually viewing (e.g., are true viewers of) media presented by a media device.

The NPM index described below may be used to account for the $P(L)_{ij}$ probability. In such examples, the matrix corrector 220 applies an NPM index to a corresponding i,j cell in a table of redistributed database proprietor registered users (e.g., the example redistributed audience matrix for the "All" category shown at Table 5 above). Table 9 below shows estimated quantities of demographic group i,j pairs of people living together based on collected survey responses from households (which, in these examples, is also used as the survey calibration data source from which the redistributed audience tables are determined). Table 10 below shows estimated quantities of demographic group i,j pairs of people living together based on collected NPM data. Table 11 below shows NPM indices generated by the matrix corrector 220 based on the estimated quantities of Tables 9 and 10.

TABLE 9

EXAMPLE ESTIMATED QUANTITIES OF DEMOGRAPHIC
GROUP I, J PAIRS OF PEOPLE LIVING TOGETHER BASED
ON SURVEY RESPONSES

| | i | | | |
|---|---|---|---|---|
| j | M45-54 | F35-44 | M12-17 | F18-24 |
| M45-54 | 100 | 60 | 10 | 55 |
| F35-44 | 30 | 100 | 10 | 80 |
| M12-17 | 20 | 50 | 80 | 15 |
| F18-24 | 50 | 20 | 20 | 90 |

TABLE 10

EXAMPLE ESTIMATED QUANTITIES OF DEMOGRAPHIC
GROUP I, J PAIRS OF PEOPLE LIVING TOGETHER BASED
ON NPM DATA

| | i | | | |
|---|---|---|---|---|
| j | M45-54 | F35-44 | M12-17 | F18-24 |
| M45-54 | 105 | 50 | 15 | 48 |
| F35-44 | 35 | 102 | 12 | 80 |
| M12-17 | 25 | 40 | 70 | 20 |
| F18-24 | 40 | 15 | 18 | 98 |

TABLE 11

EXAMPLE NPM INDICES

| | i | | | |
|---|---|---|---|---|
| j | M45-54 | F35-44 | M12-17 | F18-24 |
| M45-54 | 1.05 | 0.83 | 1.50 | 0.87 |
| F35-44 | 1.17 | 1.02 | 1.20 | 1.00 |
| M12-17 | 1.25 | 0.80 | 0.88 | 1.33 |
| F18-24 | 0.80 | 0.75 | 0.90 | 1.09 |

The example NPM indices of Table 11 above are calculated by dividing the values of Table 10 (estimate quantities of demographic group i,j pairs of people living together based on panel member data) by corresponding values of Table 9 (estimate quantities of demographic group i,j pairs of people living together based on survey responses). In the illustrated example, Table 11 is used to account for oversampling/undersampling of any viewers from different demographic groups i,j living together in the same household. For example, Table 9 estimates, based on survey responses, that 100 people across demographic groups i,j of M45-54 live together. Based on more accurate NPM data, Table 10 estimates that 105 people across the same demographic groups i, j of M45-54 live together in the same household. Therefore, the example NPM index of Table 11 for that demographic group M45-54 is 1.05, which is greater than one to compensate for Table 9 undersampling (e.g., 100) the number of people from demographic groups i, j of M45-54 living together relative to the corresponding value of 105 of Table 10. For instances in which the estimated quantity in Table 9 oversamples relative to a corresponding quantity in Table 10, the corresponding NPM index in Table 11 would be less than one (e.g., NPM index=0.75 in Table 11 for actual viewer demographic group j of F18-24 and recognized demographic group i of F35-44).

In some examples, estimates from Table 9 of some demographic group pairs i,j living together that are (e.g., determined based on the survey responses) are aligned with estimates from Table 10 based on the NPM data because the NPM data is a higher quality data source than demographic data from the database proprietor 104a. Tables 12 and 13 show example data in which estimates of demographic group i,j pairs of people living together are aligned closer to the NPM data. In Table 12, the matrix corrector 220 adjusts the redistributed audience values of Table 8 above for the probability $P(L)_{ij}$ that a first person in recognized demographic group i lives in the same household as a person in actual viewer demographic group j. In the illustrated example, the matrix corrector 220 determines each i,j cell value in Table 12 by multiplying redistributed audience values in the i,j cells of Table 8 above with corresponding NPM indices in the i,j cell values of Table 11 above. In this manner, the sharing matrix corrector 220 applies an NPM index to redistributed impressions collected by the database proprietor 104a across different households to account for the probability $P(L)_{ij}$ that a first person in recognized demographic group i lives in the same household as a person in actual viewer demographic group j.

TABLE 12

EXAMPLE DATABASE PROPRIETOR REDISTRIBUTED AUDIENCE ADJUSTED FOR $P(L)_{ij}$

| | i | | | |
|---|---|---|---|---|
| j | M45-54 | F35-44 | M12-17 | F18-24 |
| M45-54 | 0 | 0 | 0.495 | 0.873 |
| F35-44 | 0 | 0 | 0.396 | 1.000 |
| M12-17 | 0 | 0 | 0 | 0 |
| F18-24 | 0 | 0 | 0.297 | 1.089 |
| Total | 0 | 0 | 1.188 | 2.962 |

TABLE 13

EXAMPLE NORMALIZED REDISTRIBUTED AUDIENCE

| | i | | | |
|---|---|---|---|---|
| j | M45-54 | F35-44 | M12-17 | F18-24 |
| M45-54 | 0 | 0 | 0.417 | 0.295 |
| F35-44 | 0 | 0 | 0.333 | 0.338 |
| M12-17 | 0 | 0 | 0 | 0 |
| F18-24 | 0 | 0 | 0.250 | 0.368 |
| Total | 0 | 0 | 1 | 1 |

In Table 13 above, the matrix normalizer 222 normalizes the adjusted impression redistributions from Table 12 above so that the columns of the recognized demographic groups i (e.g., the M12-17 and F18-24 recognized demographic groups i) sum to one. In this manner, each column (e.g., recognized demographic groups i M12-17 and F18-24) represents a probability distribution function (PDF) of what the AME 108 determines to be the actual viewer demographic group j of the true viewer of media when the database proprietor 104a detects a particular recognized demographic group i. In the illustrated example, the normalized redistributed audience of Table 13 are misattribution correction factors, or probabilities $\gamma_{ij}$ for each pair of demographic groups i,j that when a person in recognized demographic group i is identified by the database proprietor 104a as a viewer of media, a person in the actual viewer demographic group j is the actual viewer (e.g., $\gamma_{ij}$=0.417, 0.295, 0.333, 0.338, 0.250, and 0.368).

In some examples, the probabilities $\gamma_{ij}$ for each pair of recognized demographic group i detected by a database proprietor and actual viewer demographic group j assigned as a true or actual viewer may be weighted and/or averaged across all of the individual household matrices to determine an aggregated probability. In the illustrated example, a true viewer or actual viewer indicates a person in a particular demographic group that is deemed to be the actual audience member that is exposed to (e.g., viewing, listening, consuming, etc.) media on a device. For example, the actual viewer may be the viewer determined by the AME 108 as being the person that is actually viewing or exposed to the monitored media. The determination of a person being an actual viewer may be based on statistical probabilities indicating the likelihood of the actual viewer based on responses to a survey of persons and/or households selected at random discussed above. Determinations of actual viewers as perceived by the AME 108 may also be based on observations or other collected data (e.g., NPM data) indicative of actual viewers in a household. In any case, the actual viewer is a strong inference by the AME 108 of who the actual viewer is but the actual viewer, as used herein, is not necessarily an absolute certainty of the identity of the actual viewer. However, the strength of the inference of the actual viewer as used in connection with the examples disclosed herein is sufficiently accurate to use in connection with examples disclosed herein to provide corrected impressions and/or duration units having a high degree of accuracy. In some examples, the sharing matrix generator 204 generates device sharing matrices based on additional and/or alternative distinctions, such as different geographic markets, different stations, and/or different day parts.

As an alternative to the example approach for calculating $\gamma_{ij}$ using the redistributed audiences as described above, in some examples the aggregated distribution generator 218 calculates the aggregated redistributed audience matrix by calculating compound probabilities as shown in Equation 1:

$$\gamma_{ij}=P(L)_{ij} \times P(D|L)_{ij} \times P(S_x|D)_{ij} \qquad \text{(Equation 1)}$$

In Equation 1 above, $P(L)_{ij}$ is the probability that a first person in recognized demographic group i lives in the same household as a person in actual viewer demographic group j, $P(D|L)_{ij}$ is the probability that, given a first person in recognized demographic group i lives in the same household as a person in actual viewer demographic group j, both persons have access to a mobile device (of any type) in that household, and $P(S_x|D)_{ij}$ is the probability that, given a first person in recognized demographic group i has access to a same mobile device of the selected type as a person in actual viewer demographic group j, both persons share the mobile device for media of the selected category. As used herein, "selected category" means a category of interest being subjected to analysis. Thus, "selected" refers to "selected for analysis" as used in this context. The same meaning applies to "selected device type," "selected demographic group," and "selected pair of demographic groups."

In some examples, the aggregated distribution generator 218 determines one or more of the probabilities using data from one or more calibration data sources (e.g., survey calibration data). For example, in some examples the sharing matrix calculator determines the probabilities $P(L)_{ij}$ and $P(D|L)_{ij}$ from a survey of an established panel, such as the panel used to determine the NPM index data discussed above, and determines $P(S_x|D)_{ij}$ from another survey of random households.

Referring to the above example described with reference to Tables 1-13, the example aggregated distribution generator 218 calculates, for each pair of demographic groups i,j, the probability $\gamma_{ij}$ that: (1) a person in recognized demographic group i is identified by the database proprietor 104a as the viewer of media, and (2) a person in actual viewer demographic group j is the actual viewer using the redistributed aggregate audience matrices. The example aggregated distribution generator 218 generates a misattribution correction matrix that includes each of the calculated probabilities $\gamma_{ij}$. The example aggregated distribution generator 218 may use the example Equation (1) above and/or may use the NPM index method described above to calculate the probabilities $\gamma_{ij}$ of the misattribution correction matrix. An example aggregated redistributed audience matrix for a selected tablet computer device type and a selected comedy media category is shown below in Table 14 as an example misattribution correction matrix. Subsequent sections of the example Table 14 extend to the right such that the table has equal numbers of rows and columns.

TABLE 14

EXAMPLE MISATTRIBUTION CORRECTION MATRIX

| | i | | | | | |
|---|---|---|---|---|---|---|
| j | F02-12 | F13-17 | F18-20 | F21-24 | F25-29 | F30-34 |
| F02-12 | 60.0% | 1.5% | 1.0% | 0.5% | 2.0% | 4.0% |
| F13-17 | 1.0% | 65.0% | 1.0% | 0.5% | 0.5% | 1.0% |
| F18-20 | 1.0% | 1.0% | 60.0% | 0.5% | 0.4% | 0.5% |
| F21-24 | 0.5% | 0.5% | 0.5% | 64.0% | 0.7% | 0.1% |
| F25-29 | 0.5% | 0.5% | 0.5% | 0.5% | 74.0% | 0.2% |
| F30-34 | 15.0% | 7.0% | 5.0% | 5.0% | 0.5% | 59.0% |
| F35-39 | 1.0% | 8.0% | 6.0% | 3.0% | 0.3% | 0.3% |
| F40-44 | 0.5% | 1.0% | 5.0% | 5.0% | 0.7% | 0.7% |
| F45-49 | 0.2% | 0.2% | 1.0% | 1.0% | 0.9% | 0.9% |
| F50-54 | 0.1% | 0.1% | 0.1% | 0.1% | 0.3% | 0.3% |
| F55-64 | 0.1% | 0.1% | 0.1% | 0.1% | 0.5% | 0.5% |
| F65+ | 0.3% | 0.3% | 0.3% | 0.3% | 0.3% | 0.3% |
| M02-12 | 1.0% | 1.0% | 1.0% | 1.0% | 3.0% | 4.0% |
| M13-17 | 1.0% | 1.0% | 1.0% | 1.0% | 0.5% | 0.5% |
| M18-20 | 0.4% | 0.4% | 5.0% | 5.0% | 1.0% | 1.0% |
| M21-24 | 0.5% | 0.5% | 1.0% | 1.0% | 0.5% | 0.5% |
| M25-29 | 0.5% | 0.5% | 0.5% | 0.5% | 6.0% | 2.0% |
| M30-34 | 8.0% | 5.0% | 4.5% | 4.5% | 5.0% | 10.0% |
| M35-39 | 7.0% | 4.0% | 3.5% | 3.5% | 0.9% | 11.0% |
| M40-44 | 1.0% | 2.0% | 2.0% | 2.0% | 1.0% | 1.0% |
| M45-49 | 0.1% | 0.1% | 0.1% | 0.1% | 0.1% | 0.5% |
| M50-54 | 0.1% | 0.1% | 0.1% | 0.1% | 0.1% | 0.6% |
| M55-64 | 0.1% | 0.1% | 0.1% | 0.1% | 0.1% | 0.4% |
| M65+ | 0.1% | 0.1% | 0.7% | 0.7% | 0.7% | 0.7% |
| | 100.0% | 100.0% | 100.0% | 100.0% | 100.0% | 100.0% |

TABLE 14-continued

EXAMPLE MISATTRIBUTION CORRECTION MATRIX

| | i | | | | | |
|---|---|---|---|---|---|---|
| j | F35-39 | F40-44 | F45-49 | F50-54 | F55-64 | F65+ |
| F02-12 | 5.0% | 5.0% | 3.0% | 1.0% | 2.0% | 1.0% |
| F13-17 | 2.0% | 2.0% | 2.0% | 2.2% | 2.0% | 1.0% |
| F18-20 | 1.0% | 1.0% | 0.2% | 2.0% | 0.5% | 0.5% |
| F21-24 | 1.0% | 0.2% | 0.1% | 2.0% | 0.1% | 0.1% |
| F25-29 | 0.6% | 0.1% | 0.2% | 0.1% | 3.0% | 3.0% |
| F30-34 | 0.2% | 0.2% | 0.1% | 0.1% | 0.1% | 0.1% |
| F35-39 | 55.0% | 0.1% | 0.2% | 0.1% | 0.1% | 0.1% |
| F40-44 | 0.7% | 62.0% | 0.2% | 0.1% | 0.4% | 0.4% |
| F45-49 | 0.9% | 0.2% | 60.0% | 0.1% | 0.1% | 0.1% |
| F50-54 | 0.6% | 0.3% | 0.1% | 63.0% | 2.0% | 0.1% |
| F55-64 | 0.5% | 0.2% | 0.3% | 0.1% | 60.0% | 3.0% |
| F65+ | 0.8% | 0.1% | 0.2% | 0.2% | 2.0% | 74.0% |
| M02-12 | 4.0% | 4.0% | 4.0% | 0.2% | 3.0% | 0.1% |
| M13-17 | 1.0% | 2.0% | 4.0% | 2.0% | 2.0% | 0.1% |
| M18-20 | 1.0% | 0.2% | 2.0% | 1.9% | 1.2% | 0.2% |
| M21-24 | 0.5% | 0.5% | 0.2% | 1.2% | 0.3% | 0.2% |
| M25-29 | 2.0% | 2.0% | 0.5% | 0.2% | 0.1% | 0.1% |
| M30-34 | 3.0% | 3.0% | 1.0% | 0.5% | 0.5% | 0.3% |
| M35-39 | 10.0% | 1.0% | 2.0% | 1.0% | 0.5% | 1.3% |
| M40-44 | 8.0% | 11.0% | 3.0% | 2.0% | 1.0% | 1.0% |
| M45-49 | 0.5% | 4.0% | 10.0% | 2.0% | 0.1% | 0.2% |
| M50-54 | 0.6% | 0.1% | 6.5% | 7.0% | 2.0% | 0.1% |
| M55-64 | 0.4% | 0.1% | 0.1% | 8.0% | 10.0% | 3.0% |
| M65+ | 0.7% | 0.7% | 0.1% | 3.0% | 7.0% | 10.0% |
| | 100.0% | 100.0% | 100.0% | 100.0% | 100.0% | 100.0% |

| | i | | | | | |
|---|---|---|---|---|---|---|
| j | M02-12 | M13-17 | M18-20 | M21-24 | M25-29 | M30-34 |
| F02-12 | 1.0% | 1.0% | 1.0% | 1.0% | 3.0% | 4.0% |
| F13-17 | 1.0% | 1.0% | 1.0% | 1.0% | 0.5% | 0.5% |
| F18-20 | 0.4% | 0.4% | 5.0% | 5.0% | 1.0% | 1.0% |
| F21-24 | 0.5% | 0.5% | 1.0% | 1.0% | 0.5% | 0.5% |
| F25-29 | 0.5% | 0.5% | 0.5% | 0.5% | 6.0% | 2.0% |
| F30-34 | 8.0% | 5.0% | 4.5% | 4.5% | 5.0% | 10.0% |
| F35-39 | 7.0% | 4.0% | 3.5% | 3.5% | 0.9% | 11.0% |
| F40-44 | 1.0% | 2.0% | 2.0% | 2.0% | 1.0% | 1.0% |
| F45-49 | 0.1% | 0.1% | 0.1% | 0.1% | 0.1% | 0.5% |
| F50-54 | 0.1% | 0.1% | 0.1% | 0.1% | 0.1% | 0.6% |
| F55-64 | 0.1% | 0.1% | 0.1% | 0.1% | 0.1% | 0.4% |
| F65+ | 0.1% | 0.1% | 0.7% | 0.7% | 0.7% | 0.7% |
| M02-12 | 60.0% | 1.5% | 1.0% | 0.5% | 2.0% | 4.0% |
| M13-17 | 1.0% | 65.0% | 1.0% | 0.5% | 0.5% | 1.0% |
| M18-20 | 1.0% | 1.0% | 60.0% | 0.5% | 0.4% | 0.5% |
| M21-24 | 0.5% | 0.5% | 0.5% | 64.0% | 0.7% | 0.1% |
| M25-29 | 0.5% | 0.5% | 0.5% | 0.5% | 74.0% | 0.2% |
| M30-34 | 15.0% | 7.0% | 5.0% | 5.0% | 0.5% | 59.0% |
| M35-39 | 1.0% | 8.0% | 6.0% | 3.0% | 0.3% | 0.3% |
| M40-44 | 0.5% | 1.0% | 5.0% | 5.0% | 0.7% | 0.7% |
| M45-49 | 0.2% | 0.2% | 1.0% | 1.0% | 0.9% | 0.9% |
| M50-54 | 0.1% | 0.1% | 0.1% | 0.1% | 0.3% | 0.3% |
| M55-64 | 0.1% | 0.1% | 0.1% | 0.1% | 0.5% | 0.5% |
| M65+ | 0.3% | 0.3% | 0.3% | 0.3% | 0.3% | 0.3% |
| | 100.0% | 100.0% | 100.0% | 100.0% | 100.0% | 100.0% |

| | i | | | | | |
|---|---|---|---|---|---|---|
| j | M35-39 | M40-44 | M45-49 | M50-54 | M55-64 | M65+ |
| F02-12 | 4.0% | 4.0% | 4.0% | 0.2% | 3.0% | 0.1% |
| F13-17 | 1.0% | 2.0% | 4.0% | 2.0% | 2.0% | 0.1% |
| F18-20 | 1.0% | 0.2% | 2.0% | 1.9% | 1.2% | 0.2% |
| F21-24 | 0.5% | 0.5% | 0.2% | 1.2% | 0.3% | 0.2% |
| F25-29 | 2.0% | 2.0% | 0.5% | 0.2% | 0.1% | 0.1% |
| F30-34 | 3.0% | 3.0% | 1.0% | 0.5% | 0.5% | 0.3% |
| F35-39 | 10.0% | 1.0% | 2.0% | 1.0% | 0.5% | 1.3% |
| F40-44 | 8.0% | 11.0% | 3.0% | 2.0% | 1.0% | 1.0% |
| F45-49 | 0.5% | 4.0% | 10.0% | 2.0% | 0.1% | 0.2% |
| F50-54 | 0.6% | 0.1% | 6.5% | 7.0% | 2.0% | 0.1% |
| F55-64 | 0.4% | 0.1% | 0.1% | 8.0% | 10.0% | 3.0% |
| F65+ | 0.7% | 0.7% | 0.1% | 3.0% | 7.0% | 10.0% |
| M02-12 | 5.0% | 5.0% | 3.0% | 1.0% | 2.0% | 1.0% |
| M13-17 | 2.0% | 2.0% | 2.0% | 2.2% | 2.0% | 1.0% |
| M18-20 | 1.0% | 1.0% | 0.2% | 2.0% | 0.5% | 0.5% |
| M21-24 | 1.0% | 0.2% | 0.1% | 2.0% | 0.1% | 0.1% |
| M25-29 | 0.6% | 0.1% | 0.2% | 0.1% | 3.0% | 3.0% |
| M30-34 | 0.2% | 0.2% | 0.1% | 0.1% | 0.1% | 0.1% |
| M35-39 | 55.0% | 0.1% | 0.2% | 0.1% | 0.1% | 0.1% |
| M40-44 | 0.7% | 62.0% | 0.2% | 0.1% | 0.4% | 0.4% |
| M45-49 | 0.9% | 0.2% | 60.0% | 0.1% | 0.1% | 0.1% |

TABLE 14-continued

EXAMPLE MISATTRIBUTION CORRECTION MATRIX

| M50-54 | 0.6% | 0.3% | 0.1% | 63.0% | 2.0% | 0.1% |
| M55-64 | 0.5% | 0.2% | 0.3% | 0.1% | 60.0% | 3.0% |
| M65+ | 0.8% | 0.1% | 0.2% | 0.2% | 2.0% | 74.0% |
| | 100.0% | 100.0% | 100.0% | 100.0% | 100.0% | 100.0% |

As shown in the example misattribution correction matrix of Table 14 above, the values of each of the columns sum to 100%. Therefore, all of the impressions, duration units, and/or audience attributed to recognized demographic group i are accounted for when the impressions, duration units, and/or audience are re-distributed based on the example misattribution correction matrix of Table 14 above. As described in more detail below, the misattribution corrector 206 of FIG. 2 applies the example misattribution correction matrix of Table 14 above to compensate the impression information for misattribution error.

Co-Viewing Matrix

In some examples, the sharing matrix generator 204 further includes a co-viewing matrix generator 224 that generates a co-viewing matrix in addition to the example misattribution correction matrix of Table 14 above (e.g., for each combination of media category and device type). The co-viewing matrix is a matrix that provides PDFs of probabilities of simultaneous viewing between two demographic groups. For example, the co-viewing probability $\kappa_{ij}$ is the probability that, when a database proprietor recognizes a person in recognized demographic group i in association with a media impression, a person in actual viewer demographic group j is also watching (e.g., co-viewing) the media with the recognized person. Thus, probabilities $\kappa_{ij}$ in the co-viewing matrix can be used to compensate the impression information for situations in which an impression can correctly be associated with multiple persons.

Like the example misattribution correction matrix of Table 14 above, the co-viewing matrix that may also be generated by the co-viewing matrix generator 224 has an equal number of rows and columns. However, unlike the example misattribution correction matrix of Table 14 above, the columns of the co-viewing matrix do not necessarily sum to any particular number (e.g., 100%). In the illustrated example, the example co-viewing matrix generator 224 calculates the co-viewing probability $\kappa_{ij}$ using the probabilities $P(L)_{ij}$ and $P(D|L)_{ij}$ discussed above, and further using a probability $P(C_x|D)_{ij}$ that describes the probability that a person in recognized demographic group i and a person in actual viewer demographic group j who live in the same household and have access to a mobile device of the selected device type simultaneously view media of the selected media category using the same mobile device of device type x. In some examples, the co-viewing matrix generator 224 replaces the $P(S_x|D)_{ij}$ term in Equation 1 above with $P(C_x|D)_{ij}$ to calculate the co-viewing probabilities $\kappa_{ij}$.

In some examples, the misattribution corrector 206 applies the co-viewing matrix to the impressions and/or duration units that have been adjusted for device sharing misattribution. In some other examples, because co-viewing can be considered to represent additional impressions and/or duration units that are not accounted for in the data collection, the misattribution corrector 206 applies the probabilities $\kappa_{ij}$ in co-viewing matrix to the impressions and/or duration units that have been adjusted for device sharing misattribution and adjusted for non-coverage by the database proprietor 104a, thereby determining co-viewing based on compensated (e.g., corrected) impressions and/or duration units.

Misattribution Correction Example 1

After generating the misattribution correction matrix of Table 14 above, the example misattribution corrector 206 applies the misattribution correction matrix to a set of impressions obtained from the impression information collector 208 of FIG. 2. In a first example of misattribution correction, the misattribution correction matrix is applied to correct the attribution of impressions to demographic groups, and does not affect an audience count. Such examples may be applied, for example, to correct impressions of Internet-based streaming media (e.g., streaming video and/or streaming audio). For example, the corrected impression information for Internet-based streaming media may be combined with impression information for another type of device on which the media may additionally or alternatively be accessed. For example, television episodes may be accessed via computing devices for delayed or time-shifted streaming playback by audience members after the episodes are presented (e.g., broadcast) on television. The impressions of the streaming media accessed via the computing devices may be added to the Live+7 television ratings metric, which measures the sum of the viewing impressions (or corresponding audience size) of the initial presentation and the impressions (or corresponding audience size) occurring on the day of the initial scheduled broadcast presentation and during the 7 days following the initial scheduled broadcast presentation.

The example impression information collector 208 of FIG. 2 collects the impression information from the database proprietor 104a and collects impression volume information obtained from client devices (e.g., the example client device 106 of FIG. 1). Example impression information obtained from the database proprietor 104a includes aggregate numbers of impressions associated with the demographic groups by the database proprietor 104a from each of the demographic groups.

The example database proprietor 104a may provide the impression information (e.g., numbers of impressions identified by the database proprietor 104a as associated with a recognized person) for each media item of interest (e.g., media items being monitored by the audience measurement entity 108). Additionally or alternatively, the example database proprietor 104a provides to the impression information collector 208 impression information for each type of device. Table 15 below illustrates example impression information for tablet computer devices obtained by the impression information collector 208 from the example database proprietor 104a. The example impression information collector 208 may collect similar data for other types of mobile devices (e.g., smartphones, portable media players, etc.).

TABLE 15

EXAMPLE IMPRESSION INFORMATION FOR TABLET COMPUTER DEVICES

| Demographic Group | Impressions |
|---|---|
| F02-12 | 12,557 |
| F13-17 | 33,134 |
| F18-20 | 45,036 |
| F21-24 | 124,837 |
| F25-29 | 197,059 |
| F30-34 | 177,895 |

TABLE 15-continued

EXAMPLE IMPRESSION INFORMATION
FOR TABLET COMPUTER DEVICES

| Demographic Group | Impressions |
|---|---|
| F35-39 | 142,681 |
| F40-44 | 138,408 |
| F45-49 | 138,877 |
| F50-54 | 136,891 |
| F55-64 | 200,416 |
| F65+ | 97,782 |
| M02-12 | 18,388 |
| M13-17 | 64,952 |
| M18-20 | 61,603 |
| M21-24 | 145,405 |
| M25-29 | 240,695 |
| M30-34 | 223,608 |
| M35-39 | 177,280 |
| M40-44 | 182,658 |
| M45-49 | 154,428 |
| M50-54 | 123,119 |
| M55-64 | 135,635 |
| M65+ | 61,234 |
| Total | 3,034,578 |

In some examples, the impressions are processed through a decision tree prior to providing the impressions to the impression information collector 208. In some examples, a decision tree is used to determine the delineations between the recognized demographic groups i and/or the actual viewer demographic groups j. Examples of processing the impressions are disclosed in U.S. patent application Ser. No. 13/209,292, filed Aug. 12, 2011, and in U.S. Provisional Patent Application No. 61/923,959, filed Jan. 6, 2014. The entireties of U.S. patent application Ser. No. 13/209,292 and U.S. Provisional Patent Application No. 61/923,959 are incorporated herein by reference.

Figure 3A:
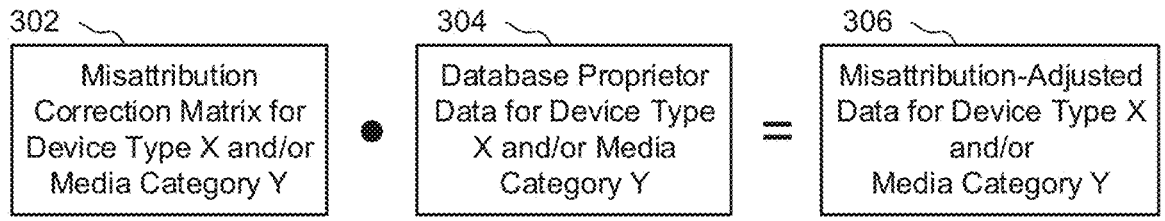
FIGS. 3A-3C collectively illustrate an example data flow that may be performed by the example impression data compensator of FIG. 2 to compensate impression data for inaccuracies related to misattribution and non-coverage arising from impression collection techniques of a database proprietor.

The example misattribution corrector 206 of FIG. 2 adjusts or compensates the impression information obtained from the database proprietor 104a for misattribution errors. FIG. 3A illustrates an example calculation performed by the misattribution corrector 206 to adjust impression information. In the examples of FIGS. 2 and 3A, the misattribution corrector 206 adjusts the demographic information provided by the database proprietor 104a (e.g., impression counts per demographic group per device type and/or media category, etc.) using the device sharing matrices generated by the example sharing matrix generator 204.

Using the database proprietor data (e.g., impression information 102a, 102b of FIG. 1) obtained by the impression information collector 208, the misattribution corrector 206 of FIG. 2 calculates the dot product of the n×n misattribution correction matrix 302 for the device type and/or media category and the n×1 database proprietor data 304 (e.g., an impression counts matrix) for the device type and/or media category. The result of the dot product is an n×1 misattribution-adjusted data matrix 306 having adjusted numbers of impressions for the device type and/or media category.

Table 16 below illustrates example misattribution-adjusted impressions calculated by the misattribution corrector 206 using the example misattribution correction matrix of Table 14 and the impression information of Table 15. Table 16 includes the adjusted impressions calculated based on the dot product discussed above with reference to FIG. 3A. The unadjusted impressions from Table 15 above are also shown in Table 16 for ease of comparison.

TABLE 16

MISATTRIBUTION ADJUSTED IMPRESSIONS
AND UNADJUSTED IMPRESSIONS

| demo | Misattribution-adjusted impressions | Unadjusted impressions |
|---|---|---|
| F02-12 | 88,758 | 12,557 |
| F13-17 | 63,963 | 33,134 |
| F18-20 | 61,710 | 45,036 |
| F21-24 | 95,709 | 124,837 |
| F25-29 | 186,392 | 197,059 |
| F30-34 | 182,026 | 177,895 |
| F35-39 | 152,916 | 142,681 |
| F40-44 | 153,586 | 138,408 |
| F45-49 | 118,492 | 138,877 |
| F50-54 | 117,647 | 136,891 |
| F55-64 | 154,539 | 200,416 |
| F65+ | 106,738 | 97,782 |
| M02-12 | 92,660 | 18,388 |
| M13-17 | 84,131 | 64,952 |
| M18-20 | 70,018 | 61,603 |
| M21-24 | 108,569 | 145,405 |
| M25-29 | 210,945 | 240,695 |
| M30-34 | 201,731 | 223,608 |
| M35-39 | 164,711 | 177,280 |
| M40-44 | 174,513 | 182,658 |
| M45-49 | 125,926 | 154,428 |
| M50-54 | 108,978 | 123,119 |
| M55-64 | 123,567 | 135,635 |
| M65+ | 86,326 | 61,234 |
| Totals | 3,034,551 | 3,034,578 |

Thus, as shown in Table 16 above, the adjusted impressions are compensated for misattribution error in the impression information 102a, 102b received from the example database proprietor 104a.

Misattribution Correction Example 2

In a second example of misattribution correction, the misattribution correction matrix of Table 14 above is applied to correct the misattribution of impressions and audience to demographic groups. As explained above, a misattribution of an impression to an incorrect demographic group can occur when the database proprietor 104a attributes an impression to a person in a first demographic group when, in fact, the impression is correctly attributable to a second person in a second demographic group (e.g., due to the person in the first demographic group being logged into the database proprietor on a device during the time the second person in the second demographic group views media giving rise to the impression). Example misattribution corrections of impressions and audience may be used when, for example, media is accessible from different types of computing devices and the audiences logged or measured for those computing devices can be de-duplicated. For example, a duplication of a logged audience member occurs when the audience member accesses the same media multiple times from the same device and/or different devices. The multiple accesses of the same media by the same audience member results in audience duplication because the same audience member is counted twice or more times in an audience size count based on the multiple impressions logged for the multiple accesses of the same media by that audience member. Such audience duplication can lead to inflated representations of a true audience size that was exposed to or accessed particular media. Accordingly, de-duplication can be used to more accurately count an audience size to which impressions of media are attributable.

The example impression information collector 208 of FIG. 2 collects the impression information from the database proprietor 104a and collects volume information for impressions occurring at client devices 106. Example impression information obtained from the database proprietor 104a includes aggregate numbers of impressions by demographic group generated by the database proprietor 104a and/or audience sizes from each of the demographic groups.

The example database proprietor 104a may provide the impression information (e.g., impression counts, impression counts by demographic group, etc.) and/or audience information (e.g., audience sizes, audience sizes by demographic group, etc.) for each media item of interest (e.g., media items being monitored by the audience measurement entity 108). Additionally or alternatively, the example database proprietor 104a provides to the impression information collector 208 impression and/or audience information for each type of device. In some examples, the impression information collector 208 further collects impression and/or audience information for media impressions occurring on computer platforms (e.g., non-mobile device platforms such as desktop computers and/or laptops). Table 17 below illustrates example impression and audience information (e.g., uncorrected impression counts and audience sizes) for tablet computer devices obtained by the impression information collector 208 from the example database proprietor 104a. The example impression information collector 208 may collect similar data for other types of mobile devices (e.g., smartphones, portable media players, etc.) and/or computer platforms. The example Table 17 below is similar to the example Table 15 above, except that Table 17 below also includes audience size and frequency information (e.g., from the database proprietor 104a).

TABLE 17

EXAMPLE IMPRESSION AND AUDIENCE INFORMATION FOR TABLET COMPUTER DEVICES OBTAINED FROM THE EXAMPLE DATABASE PROPRIETOR

| Demo | Impressions | Audience Size | Frequency |
|---|---|---|---|
| F02-12 | 12,557 | 1,512 | 8.3 |
| F13-17 | 33,134 | 4,492 | 7.4 |
| F18-20 | 45,036 | 4,689 | 9.6 |
| F21-24 | 124,837 | 10,193 | 12.2 |
| F25-29 | 197,059 | 15,983 | 12.3 |
| F30-34 | 177,895 | 15,850 | 11.2 |
| F35-39 | 142,681 | 13,998 | 10.2 |
| F40-44 | 138,408 | 14,944 | 9.3 |
| F45-49 | 138,877 | 14,376 | 9.7 |
| F50-54 | 136,891 | 14,173 | 9.7 |
| F55-64 | 200,416 | 22,403 | 8.9 |
| F65+ | 97,782 | 11,680 | 8.4 |
| M02-12 | 18,388 | 2,226 | 8.3 |
| M13-17 | 64,952 | 7,840 | 8.3 |
| M18-20 | 61,603 | 6,512 | 9.5 |
| M21-24 | 145,405 | 11,911 | 12.2 |
| M25-29 | 240,695 | 18,925 | 12.7 |
| M30-34 | 223,608 | 19,000 | 11.8 |
| M35-39 | 177,280 | 16,581 | 10.7 |
| M40-44 | 182,658 | 17,522 | 10.4 |
| M45-49 | 154,428 | 15,251 | 10.1 |
| M50-54 | 123,119 | 12,484 | 9.9 |
| M55-64 | 135,635 | 15,463 | 8.8 |
| M65+ | 61,234 | 7,966 | 7.7 |
| Totals | 3,034,578 | 295,973 | |

In some examples, the database proprietor total impressions and audience sizes are processed through a decision tree prior to providing the database proprietor total impressions and audience sizes to the impression information collector 208. Examples of processing the impressions and the unique audience are disclosed in U.S. Nonprovisional patent application Ser. No. 13/209,292, filed Aug. 12, 2011, and in U.S. Provisional Patent Application No. 61/923,959, filed Jan. 6, 2014. The entireties of U.S. Nonprovisional patent application Ser. No. 13/209,292 and U.S. Provisional Patent Application No. 61/923,959 are incorporated by reference herein.

The example misattribution corrector 206 of FIG. 2 adjusts or compensates the impression information obtained from the database proprietor 104a for misattribution error. FIG. 3A, discussed above, also illustrates an example calculation performed by the misattribution corrector 206 to adjust impression and/or audience information. In this example, the misattribution corrector 206 adjusts the demographic information provided by the database proprietor 104a (e.g., impression counts per demographic group per device type and/or media category, audience size per demographic group per device type and/or media category, etc.) using the device sharing matrices generated by the example sharing matrix generator 204.

Using the database proprietor data (e.g., impression counts and/or audience size information) obtained by the impression information collector 208, the misattribution corrector 206 of FIG. 2 calculates the dot product of the n×n misattribution correction matrix 302 for the device type and/or media category and the n×1 database proprietor data 304 (e.g., an impression counts matrix, an audience size matrix). The result of the dot product is an n×1 misattribution-adjusted data matrix 306 having adjusted impression counts or an adjusted audience size.

Table 18 below illustrates an example misattribution-adjusted data matrix calculated by the misattribution corrector 206 using the misattribution correction matrix of Table 14 above and the example impression count and/or audience size data of Table 17 above. Table 18 below includes the audience calculated based on the dot product discussed above, and impression count information calculated by the misattribution corrector 206 using the adjusted audience size. In this example, the misattribution corrector 206 determines the misattribution-adjusted impressions (e.g., 118,492 for the F45-49 demographic group) by dividing the misattribution-adjusted audience size (e.g., 12,216 for the F45-49 demographic group) by the frequency of Table 17 above (e.g., 9.7 for the F45-49 demographic group) that corresponds to that demographic group. The unadjusted audience size and unadjusted impression count are also shown in Table 18 below for ease of comparison.

TABLE 18

MISATTRIBUTION-ADJUSTED IMPRESSION COUNTS AND AUDIENCE SIZES, WITH UNADJUSTED IMPRESSION COUNTS AND AUDIENCE SIZES FOR COMPARISON

| Demographic Group | Misattribution-adjusted impression counts | Misattribution-adjusted audience sizes | Unadjusted impression counts | Unadjusted audience sizes |
|---|---|---|---|---|
| F02-12 | 88,758 | 10,694 | 12,557 | 1,512 |
| F13-17 | 63,963 | 8,644 | 33,134 | 4,492 |
| F18-20 | 61,710 | 6,428 | 45,036 | 4,689 |
| F21-24 | 95,709 | 7,845 | 124,837 | 10,193 |
| F25-29 | 186,392 | 15,154 | 197,059 | 15,983 |
| F30-34 | 182,026 | 16,252 | 177,895 | 15,850 |
| F35-39 | 152,916 | 14,992 | 142,681 | 13,998 |
| F40-44 | 153,586 | 16,515 | 138,408 | 14,944 |
| F45-49 | 118,492 | 12,216 | 138,877 | 14,376 |
| F50-54 | 117,647 | 12,129 | 136,891 | 14,173 |
| F55-64 | 154,539 | 17,364 | 200,416 | 22,403 |
| F65+ | 106,738 | 12,707 | 97,782 | 11,680 |

TABLE 18-continued

MISATTRIBUTION-ADJUSTED IMPRESSION COUNTS AND
AUDIENCE SIZES, WITH UNADJUSTED IMPRESSION COUNTS
AND AUDIENCE SIZES FOR COMPARISON

| Demographic Group | Misattribution-adjusted impression counts | Misattribution-adjusted audience sizes | Unadjusted impression counts | Unadjusted audience sizes |
|---|---|---|---|---|
| M02-12 | 92,660 | 11,164 | 18,388 | 2,226 |
| M13-17 | 84,131 | 10,136 | 64,952 | 7,840 |
| M18-20 | 70,018 | 7,370 | 61,603 | 6,512 |
| M21-24 | 108,569 | 8,899 | 145,405 | 11,911 |
| M25-29 | 210,945 | 16,610 | 240,695 | 18,925 |
| M30-34 | 201,731 | 17,096 | 223,608 | 19,000 |
| M35-39 | 164,711 | 15,394 | 177,280 | 16,581 |
| M40-44 | 174,513 | 16,780 | 182,658 | 17,522 |
| M45-49 | 125,926 | 12,468 | 154,428 | 15,251 |
| M50-54 | 108,978 | 11,008 | 123,119 | 12,484 |
| M55-64 | 123,567 | 14,042 | 135,635 | 15,463 |
| M65+ | 86,326 | 11,211 | 61,234 | 7,966 |
| Totals | 3,034,551 | 303,116 | 3,034,578 | 295,973 |

Thus, as shown in Table 18 above, the misattribution-adjusted impression counts and the misattribution-adjusted audience sizes are compensated for misattribution error in the impression count and audience size information received from the example database proprietor 104a. The total misattribution-adjusted audience size is substantially equal (e.g., equal except for rounding error) to the total unadjusted audience size reported by the database proprietor 104a. The example misattribution-adjusted audience sizes and/or the misattribution-adjusted impression counts of this example are corrected for non-coverage error as described in the examples below.

Alpha Factor for Non-Coverage

In some examples, such as compensating for errors in impression count information corresponding to media associated with television ratings (e.g., television program episodes available for streaming), the non-coverage calculator 210 of FIG. 2 calculates the non-coverage factors for the audience using an "alpha factor." As used herein, the term "alpha factor" refers to a ratio of B/A, where B is defined to be the probability that a person (e.g., a person in a demographic group of interest) accesses a media item of interest (e.g., an episode of a television program via streaming video) using a device type of interest (e.g., on a mobile device and/or on a specific type of mobile device such as a tablet computer, a smartphone, or a portable media player) that is not covered by the database proprietor. For example, the database proprietor may not cover a device type of interest if the database proprietor does not have access to any identifiers or information (e.g., the device/user identifier(s) 124 of FIG. 1) on the device type that the database proprietor can use to associate with registered user information (e.g., demographics). As used herein, in the alpha factor ratio B/A, A is defined to be the probability that the person accesses the media item of interest on a type of device other than a mobile device, such as a standard device for accessing the media item of interest (e.g., in the case of a television program, a television set). For example, for an episode of a television program in a particular media category, the designated type may be a television and the first device type may be a computing device on which the episode of the television program may be accessed via streaming video (e.g., mobile devices and/or mobile devices of a more specific type such as smartphones, tablet computers, and/or portable media players). Such television programs are often made available via streaming video after an initial or premiere presentation on television. Thus, a person can access the episode of the television program on television and/or via streaming media on a computing device.

The example non-coverage calculator 210 of FIG. 2 may generate different alpha factors for different demographic groups, different media categories, different mobile device types, mobile and non-mobile devices, different geographic regions, different stations, different day parts, and/or any other factor identified based on the survey calibration data source.

In the example of FIG. 2, the example non-coverage calculator 210 calculates the probability B (e.g., the probability that a person watches a media item of interest using a device type of interest) as a proportion of the selected demographic group that accesses the media item of interest on the selected device type (e.g., based on responses from a survey or another calibration data source) of a total number of people in the selected demographic group (e.g., based on the responses from the survey or other calibration data source). For example, if 40 people in the M18-24 demographic group responded to a survey that they access media in the 'comedy' media category on a tablet computer out of 100 people in the M18-24 demographic group represented in the survey, the probability B is 40% or 0.40. Similarly, the example non-coverage calculator 210 calculates the probability A (e.g., the probability that the person watches the media item of interest using the selected other device type) as a proportion of the selected demographic group that accesses the media item of interest on the other device type (e.g., based on responses from a survey or another calibration data source) of a total number of people in the selected demographic group (e.g., based on the survey or other calibration data source). For example, if 20 people in the M18-24 demographic group responded to a survey that they access media in the 'comedy' media category on television out of the 100 people in the M18-24 demographic group represented in the survey, the probability A is 20% or 0.20. Equations 2 and 3 below illustrate example models for calculating the probabilities A and B, respectively. The resulting alpha factor for the M18-24 demographic group, the 'comedy' media category, on tablet computers, is 0.40/0.20=2.

$A$=(Number of people in Age and Gender group $X$ that watch Media Category $Y$ on $TV$)/(Total number of people in Age and Gender group $X$)   Equation 2

$B$=(Number of People in Age and Gender group $X$ that watch Media Category $Y$ on device type of interest)/(Total number of people in Age and Gender group $X$)   Equation 3

In examples in which the non-coverage calculator 210 determines an alpha factor for determining the non-coverage by the database proprietor 104a, the example non-coverage corrector 212 corrects the impression information by multiplying the alpha factor for a demographic group by the distribution percentage of the demographic group for a media item of interest. For example, if the 35-39 year old female group (e.g., F 35-39 in Table 19 below) represents 2.9% of the impressions for a particular episode of a television program, and the alpha factor for the 35-39 year old female group is 3.80 for the media category in which the television program is classified, the new calculated percentage is approximately 11.2%. However, the resulting percentage (i.e., 11.2%) is normalized such that the percentages for all of the demographic groups sums to 100% for the episode of the television program. The example non-coverage corrector 212 multiplies the normalized percentage by the number of impressions that are not associated with a user by the database proprietor 104a to determine the number of impressions attributable to the 35-39 year old female group (F35-39). In some examples, the number of impressions that are not associated with a user by the database proprietor 104a is determined from a difference between 1) the number of impressions identified by the AME 108 and 2) the number of impressions that were associated with a user by the database proprietor 104a. Additionally or alternatively, the database proprietor 104a monitors and reports a number of impressions that the database proprietor 104a is unable to associate with a user while also monitoring the numbers of impressions corresponding to the demographic groups (e.g., the impressions that the database proprietor is able to associate with a user).

Table 19 below illustrates example data generated by the non-coverage corrector 212 to correct impression information using alpha factors. In the example of Table 19, the AME 108 counts 2,000 media impressions that the database proprietor 104a is unable to associate with demographic groups (e.g., "Demos" noted in the first column of Table 19 below).

TABLE 19

NON-COVERED IMPRESSIONS

| Demos | Meas % | A | B | α = B/A | Adj % | Norm % | Non-Covered Impressions |
|---|---|---|---|---|---|---|---|
| F2-5 | 5.5% | 0.06 | 0.06 | 1.00 | 5.5% | 3.4% | 69 |
| F6-8 | 5.0% | 0.40 | 0.42 | 1.05 | 5.2% | 3.2% | 65 |
| F9-11 | 5.2% | 0.23 | 0.50 | 2.16 | 11.2% | 7.0% | 139 |
| F12-17 | 1.9% | 0.37 | 0.76 | 2.02 | 3.9% | 2.4% | 48 |
| F18-20 | 5.4% | 0.47 | 0.46 | 0.98 | 5.3% | 3.3% | 66 |
| F21-24 | 0.8% | 0.26 | 0.04 | 0.16 | 0.1% | 0.1% | 2 |
| F25-29 | 0.9% | 0.80 | 0.52 | 0.66 | 0.6% | 0.4% | 7 |
| F30-34 | 0.5% | 0.23 | 0.94 | 4.18 | 2.3% | 1.4% | 28 |
| F35-39 | 2.9% | 0.23 | 0.87 | 3.80 | 11.2% | 6.9% | 139 |
| F40-44 | 5.3% | 0.82 | 0.67 | 0.82 | 4.4% | 2.7% | 54 |
| F45-49 | 2.7% | 0.55 | 0.96 | 1.76 | 4.7% | 2.9% | 59 |
| F50-54 | 5.4% | 0.43 | 0.97 | 2.26 | 12.2% | 7.6% | 151 |
| F55-64 | 1.9% | 0.18 | 0.94 | 5.25 | 9.7% | 6.1% | 121 |
| F65+ | 4.8% | 0.38 | 0.29 | 0.75 | 3.6% | 2.3% | 45 |
| M2-5 | 4.2% | 0.44 | 0.29 | 0.67 | 2.8% | 1.7% | 35 |
| M6-8 | 5.4% | 0.53 | 0.95 | 1.79 | 9.7% | 6.0% | 120 |
| M9-11 | 4.5% | 0.33 | 0.04 | 0.13 | 0.6% | 0.4% | 7 |
| M12-17 | 2.6% | 0.03 | 0.30 | 9.46 | 24.7% | 15.4% | 308 |
| M18-20 | 1.2% | 0.20 | 0.23 | 1.15 | 1.4% | 0.9% | 18 |
| M21-24 | 5.7% | 0.36 | 0.61 | 1.72 | 9.8% | 6.1% | 122 |
| M25-29 | 5.8% | 0.52 | 0.88 | 1.68 | 9.8% | 6.1% | 122 |
| M30-34 | 5.2% | 0.92 | 0.65 | 0.71 | 3.7% | 2.3% | 46 |
| M35-39 | 3.8% | 0.91 | 0.75 | 0.83 | 3.2% | 2.0% | 39 |
| M40-44 | 1.8% | 0.65 | 0.67 | 1.03 | 1.8% | 1.1% | 23 |
| M45-49 | 1.6% | 0.71 | 0.24 | 0.33 | 0.5% | 0.3% | 6 |
| M50-54 | 2.1% | 0.40 | 0.82 | 2.05 | 4.4% | 2.7% | 54 |
| M55-64 | 4.5% | 0.60 | 0.85 | 1.42 | 6.4% | 4.0% | 79 |
| M65+ | 3.3% | 0.97 | 0.65 | 0.67 | 2.2% | 1.4% | 28 |
| Total | 100.0% | | | | 160.9% | 100.0% | 2000 |

As illustrated in the example of Table 19 above, the non-coverage corrector 212 calculates the adjusted percentage (Adj %) as the product of the alpha factor ($\alpha$=B/A) and the measured percentage for each demographic group (Demos). The non-coverage corrector 212 normalizes the adjusted percentages (Adj %) to a sum of 100% (e.g., divides the adjusted percentage (Adj %) by the total adjusted percentage (e.g., 160.9%) to obtain the normalized percentage (Norm %). The non-coverage corrector 212 multiplies the normalized percentages (Norm %) by the number of impressions not associated with a demographic group (Demos) by the database proprietor 104a to obtain the number of non-covered impressions (Non-covered impressions) attributable to each demographic group (Demos). The example impressions determined by the non-coverage corrector 212 (Non-covered impressions) may be added to the misattribution adjusted impressions to determine the misattribution and non-coverage adjusted impressions.

Non-Coverage Factors for Non-Coverage Correction

As an alternative to compensating the impression information for non-coverage error using the example alpha factor ($\alpha$=B/A) disclosed above, the example non-coverage calculator 210 of FIG. 2 may calculate non-coverage factors for each of the example demographic groups. The non-coverage factors reflect the portion of impressions that are not attributable to persons by the database proprietor 104a.

To calculate the non-coverage factor for a demographic group and a particular device type, the example non-coverage calculator 210 determines, from the survey calibration data source, a number or portion of persons (e.g., respondents to a survey) in the demographic group that indicate they would not be recognized by the database proprietor 104a when using the particular device type, as a proportion of the persons in the demographic group that own and have access to that particular device type. For example, the non-coverage calculator 210 may determine that a respondent would not be recognized by the database proprietor 104a when using the particular device type if the respondent indicates that nobody in the respondent's home accesses the database proprietor 104a using the particular type of device, that he is not registered to the database proprietor 104a, and/or takes any other action or inaction that would prevent the database proprietor 104a from recognizing the person when he accesses media on the particular device type.

The example non-coverage calculator 210 of FIG. 2 creates tables of non-coverage factors for each of the demographic groups and device types, where the non-coverage factor is calculated as: non-coverage factor=(Non-covered portion of respondents in demographic group for device type)/(Total number of respondents in demographic group with access to a device of the device type). An example non-coverage factor table for tablet computers is shown below in Table 20. In some examples, the example non-coverage calculator 210 makes similar tables for other device types. As shown in Table 20, 20% of the 21-24 year old female demographic group is not covered (e.g., not recognizable) by the database proprietor 104a on a tablet device. In other words, 10% of 21-24 year old females who have access to a tablet computer would not be recognized by the database proprietor 104a. Similarly, 10% of the 18-20 year old male demographic group is not covered by the database proprietor 104a on a tablet device.

TABLE 20

EXAMPLE NON-COVERAGE FACTORS FOR TABLET COMPUTERS

| Age/Gender | Non-coverage |
|---|---|
| F02-12 | 20.0% |
| F13-17 | 10.0% |
| F18-20 | 10.0% |
| F21-24 | 20.0% |
| F25-29 | 10.0% |
| F30-34 | 10.0% |
| F35-39 | 20.0% |
| F40-44 | 30.0% |
| F45-49 | 40.0% |

TABLE 20-continued

EXAMPLE NON-COVERAGE FACTORS
FOR TABLET COMPUTERS

| Age/Gender | Non-coverage |
|---|---|
| F50-54 | 50.0% |
| F55-64 | 40.0% |
| F65+ | 50.0% |
| M02-12 | 20.0% |
| M13-17 | 10.0% |
| M18-20 | 10.0% |
| M21-24 | 20.0% |
| M25-29 | 10.0% |
| M30-34 | 10.0% |
| M35-39 | 20.0% |
| M40-44 | 30.0% |
| M45-49 | 40.0% |
| M50-54 | 50.0% |
| M55-64 | 40.0% |
| M65+ | 50.0% |

The non-coverage factors of Table 20 above may be used as an alternative to the alpha factor ($\alpha=B/A$) for performing non-coverage adjustment for the impression information. For example, a frequency (e.g., average impressions per audience member during a time period) observed by the database proprietor 104a may be used to calculate an audience corresponding to the impressions observed by the database proprietor 104a. The example non-coverage calculator 210 then adjusts the audience by the non-coverage factor (e.g., adjusted audience=audience/(1-non-coverage factor)), and converts the adjusted audience into non-coverage adjusted impression using the frequency.

While the above example describes non-coverage factors for one database proprietor, the example non-coverage calculator 210 may additionally or alternatively calculate non-coverage factors for multiple database proprietors. For example, if two database proprietors are used, the example survey calibration data source may include data designed to determine whether respondents access either of the database proprietors 104a-b via one or more device type(s). The example non-coverage calculator 210 of FIG. 2 then determines that non-coverage error is limited to those persons and/or impressions which neither of the database proprietors 104a-b can recognize. In the example of FIG. 2, if at least one of the database proprietors 104a-b can recognize a person on a mobile device, the example person is considered covered.

Non-Coverage Error Compensation and Scaling Example 1

A first example of compensating for non-coverage error includes multiplying the alpha factor ($\alpha=B/A$) for a demographic group by the misattribution-adjusted impression count corresponding to the same demographic group. For example, the alpha factor may be used to calculate the non-covered impression counts based on the misattribution-adjusted impression counts of the first misattribution compensation example described above with reference to Tables 16 and/or 18.

Figure 3B:
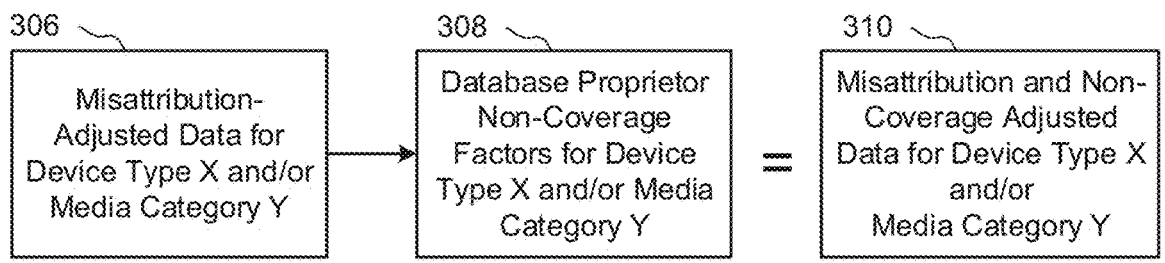

FIG. 3B illustrates an example calculation that may be performed by the non-coverage corrector 212 of FIG. 2 to compensate for non-coverage error. In the example of FIG. 3B, the non-coverage corrector 212 obtains the misattribution-adjusted data 306 calculated by the misattribution corrector 206 in the example of FIG. 3A. The non-coverage corrector 212 applies non-coverage factors 308 (e.g., a set of alpha factors, a set of scalars) corresponding to the same device type (and/or media category) to the misattribution-adjusted data 306 for the device type (and/or media category) to determine misattribution and non-coverage adjusted data 310 for the device type (and/or media category).

For example, Table 21 below illustrates an example calculation to determine quantities of non-covered impressions per demographic group using total numbers of corresponding misattribution-adjusted impression counts of Table 18 above. The non-coverage corrector 212 adjusts misattribution-adjusted impression counts (e.g., 210,945 for the M25-29 demographic group of Table 18 above) using the alpha factor ($\alpha=B/A$) for the M25-29 demographic group (e.g., 1.68 from Table 19 above). Table 21 below illustrates an example of the misattribution and non-coverage adjusted data 310 (e.g., misattribution and non-coverage adjusted impression counts). In the following example, the AME 108 has identified 1,126,462 total impressions that the database proprietor 104 does not associate with demographic groups.

TABLE 21

EXAMPLE MISATTRIBUTION AND NON-COVERAGE ADJUSTED IMPRESSION DATA

| Demo | Misatt. adjusted Imps. Count | Meas % | Alpha $\alpha = $ B/A | Adj % | Norm % | Non-Covered Imp. Count | Misatt. and Non-Cov.-Adj. Imp. Count |
|---|---|---|---|---|---|---|---|
| F02-12 | 88,758 | 2.92% | 5.43 | 15.88% | 3.37% | 37,995 | 126,753 |
| F13-17 | 63,963 | 2.11% | 8.68 | 18.30% | 3.89% | 43,799 | 107,762 |
| F18-20 | 61,710 | 2.03% | 6.23 | 12.66% | 2.69% | 30,296 | 92,006 |
| F21-24 | 95,709 | 3.15% | 7.22 | 22.76% | 4.84% | 54,471 | 150,180 |
| F25-29 | 186,392 | 6.14% | 8.60 | 52.84% | 11.23% | 126,449 | 312,841 |
| F30-34 | 182,026 | 6.00% | 3.02 | 18.13% | 3.85% | 43,388 | 225,414 |
| F35-39 | 152,916 | 5.04% | 7.31 | 36.83% | 7.82% | 88,136 | 241,052 |
| F40-44 | 153,586 | 5.06% | 3.02 | 15.28% | 3.25% | 36,556 | 190,142 |
| F45-49 | 118,492 | 3.90% | 0.08 | 0.32% | 0.07% | 760 | 119,252 |
| F50-54 | 117,647 | 3.88% | 3.45 | 13.39% | 2.84% | 32,038 | 149,685 |
| F55-64 | 154,539 | 5.09% | 1.27 | 6.47% | 1.37% | 15,480 | 170,019 |
| F65+ | 106,738 | 3.52% | 9.55 | 33.58% | 7.13% | 80,357 | 187,095 |
| M02-12 | 92,660 | 3.05% | 2.77 | 8.47% | 1.80% | 20,270 | 112,930 |
| M13-17 | 84,131 | 2.77% | 2.02 | 5.61% | 1.19% | 13,434 | 97,565 |
| M18-20 | 70,018 | 2.31% | 2.13 | 4.91% | 1.04% | 11,743 | 81,761 |
| M21-24 | 108,569 | 3.58% | 1.77 | 6.34% | 1.35% | 15,181 | 123,750 |
| M25-29 | 210,945 | 6.95% | 5.76 | 40.07% | 8.51% | 95,894 | 306,839 |
| M30-34 | 201,731 | 6.65% | 8.72 | 58.00% | 12.32% | 138,778 | 340,509 |

TABLE 21-continued

EXAMPLE MISATTRIBUTION AND NON-COVERAGE ADJUSTED IMPRESSION DATA

| Demo | Misatt. adjusted Imps. Count | Meas % | Alpha α = B/A | Adj % | Norm % | Non-Covered Imp. Count | Misatt. and Non-Cov.-Adj. Imp. Count |
|---|---|---|---|---|---|---|---|
| M35-39 | 164,711 | 5.43% | 0.69 | 3.74% | 0.79% | 8,940 | 173,651 |
| M40-44 | 174,513 | 5.75% | 4.97 | 28.57% | 6.07% | 68,363 | 242,876 |
| M45-49 | 125,926 | 4.15% | 8.09 | 33.56% | 7.13% | 80,312 | 206,238 |
| M50-54 | 108,978 | 3.59% | 0.12 | 0.45% | 0.09% | 1,067 | 110,045 |
| M55-64 | 123,567 | 4.07% | 1.69 | 6.87% | 1.46% | 16,430 | 139,997 |
| M65+ | 86,326 | 2.84% | 9.74 | 27.72% | 5.89% | 66,327 | 152,653 |
| Total | 3,034,551 | 100% | | 470.8% | 100% | 1,126,462 | 4,161,015 |

In Table 21 above, the example misattribution-adjusted impressions (Misatt.-adjusted Imp. Count) are obtained from the misattribution correction example described above with reference to Table 18. The example measured percentage (Meas %) of Table 21 is determined for each of the demographic groups based on the misattribution-adjusted impression count (Misatt.-adjusted Imp. Count) by determining a percentage of the misattribution-adjusted impression count (e.g., 182,026 for the F30-34 demographic group) relative to the total misattribution-adjusted impression count (e.g., 3,034,551).

Table 21 includes a set of example alpha factors (α=B/A) for each of the example demographic groups, which may be calculated as described above with reference to the example Table 19. The alpha factors are determined via, for example, the results of a calibration survey (e.g., the survey discussed above) and Equations 2 and 3 disclosed above. Using the alpha factors, the example non-coverage corrector 212 calculates the adjusted percentage (Adj. %) by multiplying the measured percentage (Meas. %) by the corresponding alpha factor for each example demographic group of Table 21. The example non-coverage corrector 212 further normalizes the adjusted percentages (Adj. %) to obtain a normalized percentage (Norm. %) for each of the example demographic groups of Table 21.

The example non-coverage corrector 212 determines the non-covered impression counts (Non-Covered Imp. Count) by multiplying the normalized percentage (Norm. %) for each of the example demographic groups of Table 21 by the total non-covered impression count (e.g., 1,126,426). For example, the non-covered impression counts (Non-covered Imp. Count) for the F30-34 demographic group is calculated as 3.85%*1,126,426=43,388. The example non-coverage corrector 212 may then add the non-covered impression count (Non-Covered Imp. Count) to the misattribution-adjusted impression count (Misatt.-adjusted Imp. Count) for each of the example demographic groups of Table 21 to determine misattribution and non-coverage-adjusted impression count (Misatt. and Non-Cov.-Adj. Imp. Count).

Non-Coverage Error Compensation and Scaling Example 2

A second example of compensating for non-coverage error includes using the non-coverage factor of Table 20 above. The example non-coverage approach disclosed above in connection with the non-coverage factors may be used instead of the alpha factors of the non-coverage error compensation example disclosed above in connection with the alpha factors when, for example, the alpha factors are not available for a particular type of media and/or for a particular device type (e.g., probabilities of viewing the media and/or probabilities of viewing on the device types are not available).

In this example, the non-coverage corrector 212 of FIG. 2 corrects the impression information obtained from the database proprietor 104a using the non-coverage factors. For example, the non-coverage corrector 212 may determine the adjusted number of impressions to be: (reported impression count)/(1-(non-coverage factor for demographic group)).

Using the example of FIG. 3B, the non-coverage corrector 212 obtains the misattribution-adjusted data 306 calculated by the misattribution corrector 206 in the example of FIG. 3A. The non-coverage corrector 212 applies the non-coverage factors 308 (e.g., a set of scalars instead of the alpha factors) corresponding to the same device type to the misattribution-adjusted data 306 for the device type to determine misattribution and non-coverage adjusted data 310 for the device type. For example, the non-coverage corrector 212 adjusts a misattribution-adjusted impression count (e.g., 210,945 for the M25-29 demographic group of Table 18 above) using the 10.0% non-coverage factor for the M25-29 demographic group of Table 20 to determine the misattribution and non-coverage adjusted impression count to be 19,046. The example non-coverage corrector 212 further determines the misattribution and non-coverage adjusted audience size to be the quotient of the misattribution and non-coverage adjusted impression count divided by the frequency calculated or obtained from the database proprietor data (e.g., Frequency from Table 17 above). Table 22 illustrates examples of the misattribution and non-coverage adjusted data 310 (e.g., misattribution and non-coverage adjusted impressions and audience) for tablet computer device types.

TABLE 22

EXAMPLE MISATTRIBUTION AND NON-COVERAGE ADJUSTED IMPRESSION COUNTS AND AUDIENCE SIZES FOR TABLET COMPUTER DEVICE TYPES

| Demo | misattribution and non-coverage adjusted tablet imp. count | Frequency | misattribution and non-coverage adjusted tablet audience size |
|---|---|---|---|
| F02-12 | 126,753 | 8.3 | 15,271 |
| F13-17 | 107,762 | 7.4 | 14,562 |
| F18-20 | 92,006 | 9.6 | 9,584 |
| F21-24 | 150,180 | 12.2 | 12,310 |
| F25-29 | 312,841 | 12.3 | 25,434 |
| F30-34 | 225,414 | 11.2 | 20,126 |

TABLE 22-continued

EXAMPLE MISATTRIBUTION AND NON-COVERAGE
ADJUSTED IMPRESSION COUNTS AND AUDIENCE
SIZES FOR TABLET COMPUTER DEVICE TYPES

| Demo | misattribution and non-coverage adjusted tablet imp. count | Frequency | misattribution and non-coverage adjusted tablet audience size |
|---|---|---|---|
| F35-39 | 241,052 | 10.2 | 23,633 |
| F40-44 | 190,142 | 9.3 | 20,445 |
| F45-49 | 119,252 | 9.7 | 12,294 |
| F50-54 | 149,685 | 9.7 | 15,431 |
| F55-64 | 170,019 | 8.9 | 19,103 |
| F65+ | 187,095 | 8.4 | 22,273 |
| M02-12 | 112,930 | 8.3 | 13,606 |
| M13-17 | 97,565 | 8.3 | 11,755 |
| M18-20 | 81,761 | 9.5 | 8,606 |
| M21-24 | 123,750 | 12.2 | 10,143 |
| M25-29 | 306,839 | 12.7 | 24,161 |
| M30-34 | 340,509 | 11.8 | 28,857 |
| M35-39 | 173,651 | 10.7 | 16,229 |
| M40-44 | 242,876 | 10.4 | 23,353 |
| M45-49 | 206,238 | 10.1 | 20,420 |
| M50-54 | 110,045 | 9.9 | 11,116 |
| M55-64 | 139,997 | 8.8 | 15,909 |
| M65+ | 152,653 | 7.7 | 19,825 |
| Totals | 4,161,015 | | 414,447 |

In the example of Table 22 above, the example non-coverage corrector 212 determines the misattribution and non-coverage adjusted audience size for each demographic group by dividing the corresponding misattribution and non-coverage adjusted impression count by the corresponding frequency of Table 17 (e.g., from the database proprietor 104a).

Figure 3C:
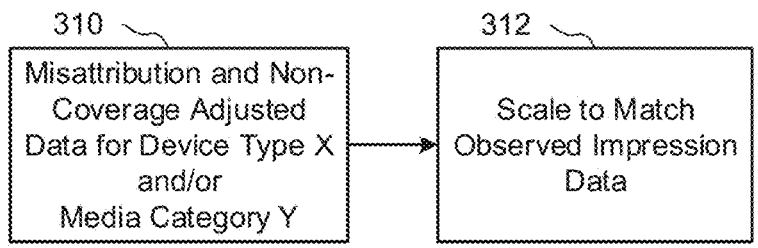

The example impression information adjuster 214 of FIG. 2 adjusts the compensated impression count and audience size to align with the numbers of impressions observed by the audience measurement entity 108. FIG. 3C illustrates an example process to adjust the compensated (e.g., misattribution and non-coverage adjusted) impression count and/or audience size 310 based on observed census data (e.g., impression volume counts).

While the examples of compensating for misattribution and/or non-coverage described above with reference to Tables 15-22 describe compensating impressions and unique audience size, the example misattribution corrector 206 and/or the example non-coverage corrector 212 of FIG. 2 may additionally or alternatively compensate duration units misattribution and/or non-coverage using the same techniques. Table 23 below shows an example of applying the misattribution matrix of Table 14 above to duration units associated with the impressions and unique audience sizes of the example of Table 18 above.

TABLE 23

EXAMPLE MISATTRIBUTION AND NON-COVERAGE ADJUSTED IMPRESSION
COUNTS, DURATION UNITS, AND UNIQUE AUDIENCE SIZES AND
UNADJUSTED IMPRESSION COUNTS, DURATION UNITS, AND UNIQUE
AUDIENCE SIZES FOR TABLET COMPUTER DEVICE TYPES

| Demo. Group | Unadjusted impression counts | Unadjusted audience sizes | Unadjusted Duration Units | Misattribution-adjusted impression counts | Misattribution-adjusted audience sizes | Misattribution-adjusted Duration Units |
|---|---|---|---|---|---|---|
| F02-12 | 12,557 | 1,512 | 21,149 | 88,758 | 10,694 | 138,686 |
| F13-17 | 33,134 | 4,492 | 53,483 | 63,963 | 8,644 | 98,107 |
| F18-20 | 45,036 | 4,689 | 70,733 | 61,710 | 6,428 | 92,720 |
| F21-24 | 124,837 | 10,193 | 214,059 | 95,709 | 7,845 | 160,987 |
| F25-29 | 197,059 | 15,983 | 232,430 | 186,392 | 15,154 | 236,018 |
| F30-34 | 177,895 | 15,850 | 332,967 | 182,026 | 16,252 | 323,291 |
| F35-39 | 142,681 | 13,998 | 189,930 | 152,916 | 14,992 | 228,454 |
| F40-44 | 138,408 | 14,944 | 146,703 | 153,586 | 16,515 | 202,878 |
| F45-49 | 138,877 | 14,376 | 252,550 | 118,492 | 12,216 | 202,955 |
| F50-54 | 136,891 | 14,173 | 263,252 | 117,647 | 12,129 | 206,828 |
| F55-64 | 200,416 | 22,403 | 342,626 | 154,539 | 17,364 | 247,014 |
| F65+ | 97,782 | 11,680 | 98,598 | 106,738 | 12,707 | 121,184 |
| M02-12 | 18,388 | 2,226 | 32,814 | 92,660 | 11,164 | 148,865 |
| M13-17 | 64,952 | 7,840 | 76,540 | 84,131 | 10,136 | 115,211 |
| M18-20 | 61,603 | 6,512 | 61,788 | 70,018 | 7,370 | 90,310 |
| M21-24 | 145,405 | 11,911 | 223,252 | 108,569 | 8,899 | 165,960 |
| M25-29 | 240,695 | 18,925 | 353,366 | 210,945 | 16,610 | 305,676 |
| M30-34 | 223,608 | 19,000 | 426,960 | 201,731 | 17,096 | 358,129 |
| M35-39 | 177,280 | 16,581 | 297,233 | 164,711 | 15,394 | 267,232 |
| M40-44 | 182,658 | 17,522 | 357,618 | 174,513 | 16,780 | 307,153 |
| M45-49 | 154,428 | 15,251 | 190,495 | 125,926 | 12,468 | 168,287 |
| M50-54 | 123,119 | 12,484 | 128,982 | 108,978 | 11,008 | 135,990 |
| M55-64 | 135,635 | 15,463 | 159,662 | 123,567 | 14,042 | 166,911 |
| M65+ | 61,234 | 7,966 | 85,093 | 86,326 | 11,211 | 123,437 |
| Totals | 3,034,578 | 295,973 | 4,612,283 | 3,034,551 | 303,116 | 4,612,283 |

As shown in Table 23 above, applying the misattribution correction matrix of Table 14 to the unadjusted duration units (Unadj. Duration Units) of Table 23 results in redistributing the duration units among the demographic groups (Demo. Group). The adjustment of the misattribution and the unique audience sizes is the same as in the example described above with reference to Table 18. The example non-coverage corrector 212 may then correct the misattribution-adjusted duration units using the non-coverage correction techniques described above with reference to the impressions in Tables 19-21.

Impression Scaling, Duration Unit Scaling, and/or Audience Scaling Example

The example impression information adjuster 214 of FIG. 2 adjusts the compensated impressions to align with the numbers of impressions observed by the audience measurement entity 108. FIG. 3C illustrates an example process to adjust the compensated (e.g., misattribution and non-coverage adjusted) impressions based on observed census data (e.g., impression volume counts).

Using the example misattribution and non-coverage adjusted impression counts of the example of Table 21 above, the impression information adjuster 214 scales 312 the misattribution and non-coverage adjusted impression counts 310 to match (e.g., be equal to) the observed number of impressions from tablet computers (e.g., as observed by the AME 108 of FIG. 1), which in this example is 6,385,686 impressions. The example impression information adjuster 214 may scale the impression counts for a host web site (e.g., a web site on which an advertisement or other media is hosted) and/or may scale the impressions for media (e.g., an advertisement or other media) placed on a host site.

To scale 312 the example compensated impression information for a demographic group, the example impression information adjuster 214 multiplies the total observed number of impressions (e.g., recognized and non-recognized) from the database proprietor (e.g., 6,385,686 in this example) and compensated impression counts attributed to the M21-24 demographic group (e.g., 158,067 in Table 21 above) as a fraction (or percentage) of the total compensated impressions (e.g., 4,161,011 in Table 21 above). For example, the impression information adjuster 214 determines the scaled compensated impressions for the 21-24 year old male demographic group to be (6,385,686)*(123,750/4,161,011)=189,913. Table 24 below illustrates example scaled compensated impression counts for tablet computers.

TABLE 24

EXAMPLE SCALED COMPENSATED IMPRESSION COUNTS FOR TABLET COMPUTERS

| Demographic Group | Scaled compensated impression count |
|---|---|
| F02-12 | 194,521 |
| F13-17 | 165,377 |
| F18-20 | 141,197 |
| F21-24 | 230,473 |
| F25-29 | 480,101 |
| F30-34 | 345,931 |
| F35-39 | 369,930 |
| F40-44 | 291,801 |
| F45-49 | 183,010 |
| F50-54 | 229,714 |
| F55-64 | 260,919 |
| F65+ | 287,125 |

TABLE 24-continued

EXAMPLE SCALED COMPENSATED IMPRESSION COUNTS FOR TABLET COMPUTERS

| Demographic Group | Scaled compensated impression count |
|---|---|
| M02-12 | 173,308 |
| M13-17 | 149,728 |
| M18-20 | 125,474 |
| M21-24 | 189,913 |
| M25-29 | 470,890 |
| M30-34 | 522,561 |
| M35-39 | 266,493 |
| M40-44 | 372,729 |
| M45-49 | 316,503 |
| M50-54 | 168,880 |
| M55-64 | 214,846 |
| M65+ | 234,269 |
| Total | 6,385,692 |

In some other examples, the impression information adjuster 214 scales impressions based on a PDF of a site hosting the media for which impression information is being calculated. For example, to scale the impressions for media placed on a host web site, the example impression information adjuster 214 determines, for a demographic group of interest and a device of interest (or all devices), a difference between: a) a number of impressions identified for the host site for the device type by the audience measurement entity 108 (e.g., a census count of impressions) and b) the misattribution and non-coverage adjusted impressions for the device type. This difference is the number of impressions that are to be accounted for by scaling. The example impression information adjuster 214 determines the product of the difference and the portion of the impressions attributable to the demographic group of interest for the device type of interest. In other words, the impression information adjuster 214 applies the probability distribution function of the demographic groups for the host site to the number of impressions required to be added to scale the misattribution and non-coverage adjusted impressions. The product (e.g., the portion of the impressions for the demographic group) is added to the misattribution and non-coverage adjusted impressions for the demographic group. Thus, in this example the impression information adjuster 214 determines the scaled impressions as: scaled impressions=(misattribution and non-coverage adjusted impressions for selected demographic group and selected device type)+(census impressions for media on hosting site for selected device type−total misattribution and non-coverage adjusted media impressions for all demographic groups for selected device type)*(scaled impressions for hosting site for selected demographic group and selected device type/total scaled impressions for hosting site for all demographic groups and selected device type).

Table 25 below illustrates an example scaling using the probability distribution function method described above, and using the example misattribution and non-coverage adjusted impressions of Table 19 above as the adjusted impressions for the media impressions being scaled (instead of the impressions of the hosting site). Table 25 is based on 6,385,687 total census impressions for tablet computers on the hosting site for the example media.

TABLE 25

EXAMPLE SCALING

| Demographic Group | Misattribution and Non-Coverage Adjusted Tablet Impressions | Scaled Hosting Site Impressions | Scaled tablet impressions for media |
|---|---|---|---|
| F02-12 | 126,753 | 832,740 | 175,668 |
| F13-17 | 107,762 | 2,812,768 | 272,985 |
| F18-20 | 92,006 | 2,230,693 | 223,037 |
| F21-24 | 150,180 | 2,404,922 | 291,446 |
| F25-29 | 312,841 | 3,093,408 | 494,548 |
| F30-34 | 225,414 | 2,506,275 | 372,633 |
| F35-39 | 241,052 | 2,434,335 | 384,045 |
| F40-44 | 190,142 | 2,200,531 | 319,402 |
| F45-49 | 119,252 | 1,874,367 | 229,353 |
| F50-54 | 149,685 | 1,406,009 | 232,274 |
| F55-64 | 170,019 | 1,869,496 | 279,834 |
| F65+ | 187,095 | 961,444 | 243,570 |
| M02-12 | 112,930 | 653,452 | 151,314 |
| M13-17 | 97,565 | 1,293,978 | 173,574 |
| M18-20 | 81,761 | 1,113,567 | 147,172 |
| M21-24 | 123,750 | 1,132,301 | 190,262 |
| M25-29 | 306,839 | 1,494,061 | 394,600 |
| M30-34 | 340,509 | 1,195,810 | 410,751 |
| M35-39 | 173,651 | 1,050,432 | 235,354 |
| M40-44 | 242,876 | 1,226,347 | 314,912 |
| M45-49 | 206,238 | 1,144,853 | 273,487 |
| M50-54 | 110,045 | 1,040,128 | 171,142 |
| M55-64 | 139,997 | 1,289,482 | 215,741 |
| M65+ | 152,653 | 611,675 | 188,583 |
| Totals | 4,161,015 | 37,873,074 | 6,385,688 |

In the example of Table 25 above, the example impression information adjuster 214 scales the impressions for the F21-24 demographic group and the tablet computer device type as scaled impressions=(Misattribution and Non-Coverage Adjusted Impression Count for Device Type and Demographic Group)+(Total Observed Tablet impression Count for all Demographic Groups−Total Misattribution and Non-Coverage Adjusted Tablet Impression Count for all Demographic Groups)*(Scaled Hosting Site Impression Count for Demographic Group/Total Scaled Hosting Site Impression Count for all Demographic Groups)=123,750+(6,385,686−4,161,015)*(1,132,301/37,873,074)=190,262.

The example scaling of the above example may be performed to scale impressions for different demographic groups to other census impression counts, such as impression counts of the hosting site (e.g., if the hosting site exclusively presents the media of interest).

While examples disclosed herein are described with reference to viewing and video media and/or combination audio/video media, the examples disclosed herein may also be used to measuring listeners to audio-only media. For example, the media categories, the survey calibration data, and/or the second device type used for calculating the alpha factor may be tailored for audio media. For example, the second device type used for calculating the "A" term (e.g., Equation 2 above) may be modified to refer to the (Number of people in Age and Gender group X that listen to Media Category Y on the radio)/(Total number of people in Age and Gender group X).

The examples scaling techniques described above with reference to Tables 24 and 25 may be used to scale the misattribution and/or non-coverage adjusted duration units to duration unit counts observed for the hosting site (e.g., census duration counts).

While the examples above disclose performing both misattribution correction and non-coverage correction, misattribution correction may be performed on impression counts and/or audience sizes without performing non-coverage correction. Alternatively, non-coverage correction may be performed on impression counts and/or audience sizes without performing misattribution correction.

While an example manner of implementing the example impression data compensator 200 has been illustrated in FIG. 2, one or more of the elements, processes and/or devices illustrated in FIG. 2 may be combined, divided, re-arranged, omitted, eliminated and/or implemented in any other way. Further, the example calibration data collector 202, the example sharing matrix generator 204, the example misattribution corrector 206, the example impression information collector 208, the example non-coverage calculator 210, the example non-coverage corrector 212, the example impression information adjuster 214, the example household distribution generator 216, the example aggregated distribution generator 218, the example matrix corrector 220, the example matrix normalizer 222, the example co-viewing matrix generator 224 and/or, more generally, the example impression data compensator 200 may be implemented using hardware, software, firmware and/or any combination of hardware, software and/or firmware. Thus, for example, any of the example calibration data collector 202, the example sharing matrix generator 204, the example misattribution corrector 206, the example impression information collector 208, the example non-coverage calculator 210, the example non-coverage corrector 212, the example impression information adjuster 214, the example household distribution generator 216, the example aggregated distribution generator 218, the example matrix corrector 220, the example matrix normalizer 222, the example co-viewing matrix generator 224 and/or, more generally, the example impression data compensator 200 could be implemented using one or more analog or digital circuit(s), logical circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example calibration data collector 202, the example sharing matrix generator 204, the example misattribution corrector 206, the example impression information collector 208, the example non-coverage calculator 210, the example non-coverage corrector 212, the example impression information adjuster 214 the example household distribution generator 216, the example aggregated distribution generator 218, the example matrix corrector 220, the example matrix normalizer 222, and/or the example co-viewing matrix generator 224 is/are hereby expressly defined to include a tangible computer readable storage device or storage disk such as a memory, a digital versatile disk (DVD), a compact disk (CD), a Blu-ray disk, etc. storing the software and/or firmware. Further still, the example impression data compensator 200 of FIG. 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the impression data compensator 200 of FIG. 2 are shown in FIGS. 4-13. In this example, the machine readable instructions comprise programs for execution by a processor such as the processor 1412 shown in the example processor platform 1400 discussed below in connection with FIG. 14. The programs may be embodied in software stored on a tangible computer readable storage medium such as a CD-ROM, a floppy disk, a hard drive, a digital versatile disk (DVD), a Blu-ray disk, or a memory associated with the processor 1412, but the entire programs and/or parts thereof could alternatively be executed by a device other than the processor 1412 and/or embodied in firmware or dedicated hardware. Further, although the example programs are described with reference to the flowcharts illustrated in FIGS. 4-13, many other methods of implementing the example impression data compensator 200 may alternatively be used. For example, the order of execution of the blocks may be changed, and/or some of the blocks described may be changed, eliminated, or combined.

As mentioned above, the example processes of FIGS. 4-13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4-13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 4:
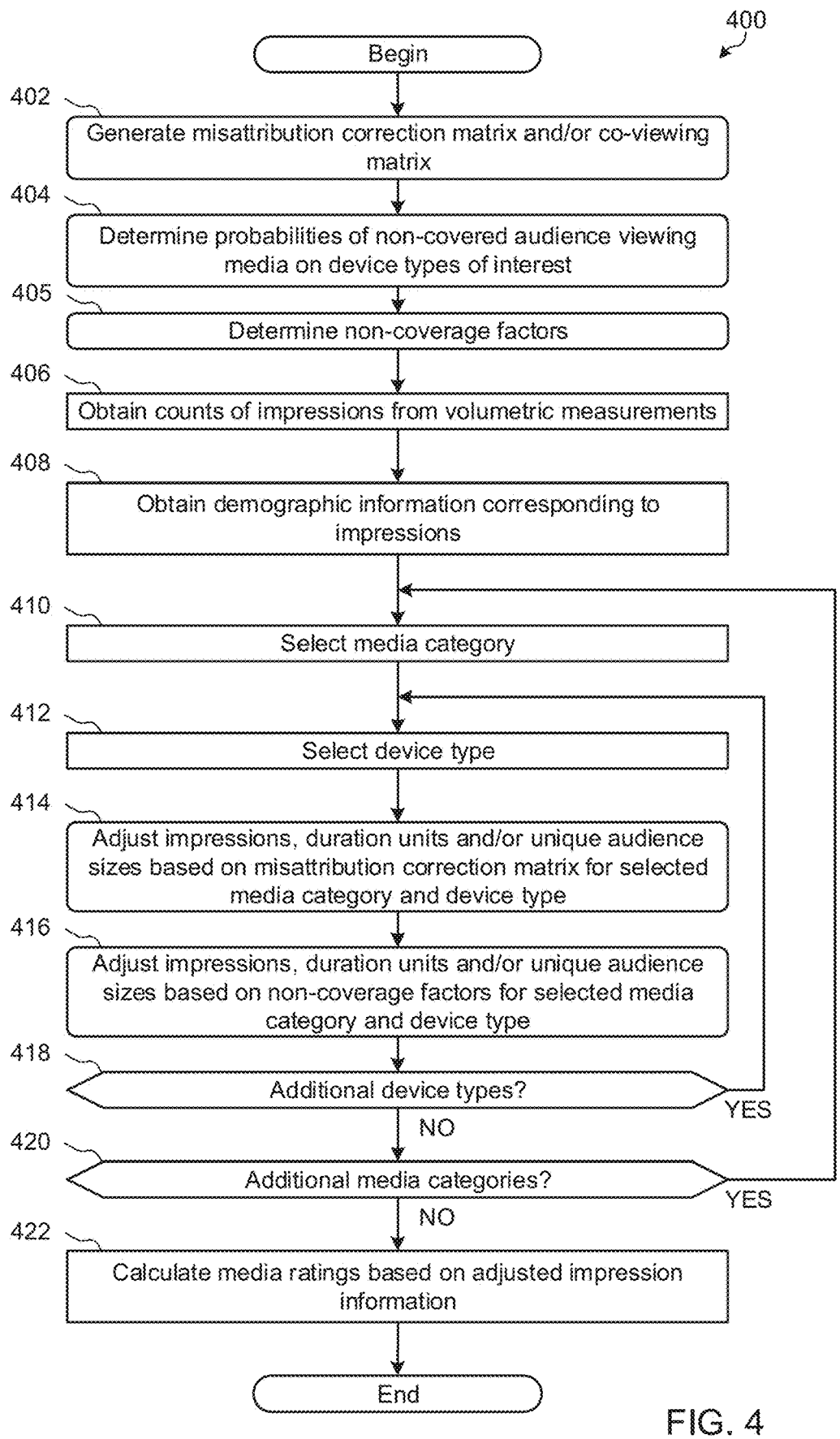
FIG. 4 is a flow diagram representative of example machine readable instructions which may be executed to implement the example impression data compensator of FIG. 2 to compensate impression data for inaccuracies related to misattribution and non-coverage arising from impression collection techniques of a database proprietor.

FIG. 4 is a flow diagram representative of example machine readable instructions 400 which may be executed to implement the example impression data compensator 200 of FIG. 2 to compensate impression data.

The example sharing matrix generator 204 of FIG. 2 generates a misattribution correction matrix and/or a co-viewing matrix (block 402). For example, the sharing matrix generator 204 calculates device sharing matrices for each device type represented in impression information (e.g., impressions) obtained by the calibration data collector 202 (FIG. 2) from the database proprietor 104a (FIG. 1). The example sharing matrix generator 204 may calculate the misattribution correction matrix for a device type by calculating the probability described above in Equation 1 and/or by calculating and aggregating household sharing matrices. Additionally or alternatively, the example sharing matrix generator 204 may calculate a co-viewing matrix containing co-viewing probabilities $\kappa_{ij}$ for each device type and/or media category. The co-viewing probabilities $\kappa_{ij}$ may also be calculated using the example survey calibration data source (e.g., a survey of persons and/or households selected at random) to determine, for example, the incidence of co-viewing in representative households. Example instructions that may be used to implement block 402 are described below with reference to FIG. 5.

The example non-coverage calculator 210 of FIG. 2 determines probabilities of non-covered audience accessing media on device types of interest (block 404). The example non-coverage calculator 210 also determines non-coverage factors (block 405). For example, the non-coverage calculator 210 may determine alpha factors (e.g., the example alpha factors $\alpha$=B/A described above with reference to Table 17) for calculating the demographic distribution for impressions not associated with demographic information by the database proprietor 104a. Example instructions that may be executed to implement blocks 404 and 405 are described below with reference to FIG. 9.

The example impression information collector 208 of FIG. 2 obtains counts of impressions from volumetric (e.g., census) measurements of impressions (block 406). For example the impression information collector 208 determines numbers of impressions identified at the audience measurement entity 108 (FIG. 1) for each media item of interest (e.g., media being monitored) and/or for each device type. Example volumetric data is shown in Table 16 above. The example impression information collector 208 also obtains demographic information corresponding to the impressions (and/or a subset of the impressions) (block 408). For example, the impression information collector 208 receives counts of impressions associated with each demographic group by the database proprietor 104a for each device type and/or for all device types.

The example misattribution corrector 206 of FIG. 2 selects a media category (e.g., comedy, drama, feature films, etc.) (block 410). The example misattribution corrector 206 also selects a device type (e.g., smartphones, tablet computers, portable media players, etc.) (block 412). The example misattribution corrector 206 adjusts the impressions, duration units, and/or unique audience sizes (obtained from the database proprietor 104a) based on the misattribution correction matrix for the selected media category and the selected device type (block 414). For example, the misattribution corrector 206 may determine the dot product of the misattribution correction matrix 302 and the database proprietor impression data 304 as illustrated in FIG. 3A. In some examples, the misattribution corrector 206 calculates a misattribution-corrected unique audience size based on the misattribution-corrected impressions and a frequency determined by the database proprietor 104a. Example instructions that may be executed to implement block 414 are described below with reference to FIG. 7.

The example non-coverage corrector 212 of FIG. 2 further adjusts the impressions, duration units, and/or unique audience sizes based on the non-coverage factors for the selected media category and the selected device type (block 416). For example, the non-coverage corrector 212 may divide the misattribution-adjusted impressions 306 of FIG. 3B by the covered percentage (e.g., one minus the non-covered percentage) to obtain the misattribution and non-coverage adjusted impression information 310. In some examples, the misattribution corrector 206 calculates a misattribution and non-coverage corrected audience based on the misattribution and non-coverage corrected impressions and a frequency determined by the database proprietor 104a. Example instructions that may be executed to implement block 416 are described below with reference to FIG. 8.

The example misattribution corrector 206 determines whether there are additional device types for which impression information is to be compensated (block 418). If there are additional device types for which impression information is to be compensated (block 418), control returns to block 412 to select another device type. When there are no more device types for which impression information is to be compensated (block 418), the example misattribution corrector 206 determines whether there are additional media categories for which impression information is to be compensated (block 420). If there are additional media categories for which impression information is to be compensated (block 420), control returns to block 410 to select another media category.

When there are no more media categories for which impression information is to be compensated (block 420), the example impression information adjuster 214 of FIG. 2 calculates media ratings based on the adjusted impression information (block 422). For example, the impression information adjuster 214 may scale the misattribution and non-coverage adjusted impressions to match the impressions identified by the audience measurement entity 108. Additionally or alternatively, the example impression information adjuster 214 may combine device types to determine impression information for multiple or all mobile device types. The example instructions 400 of FIG. 4 then end.

Figure 5:
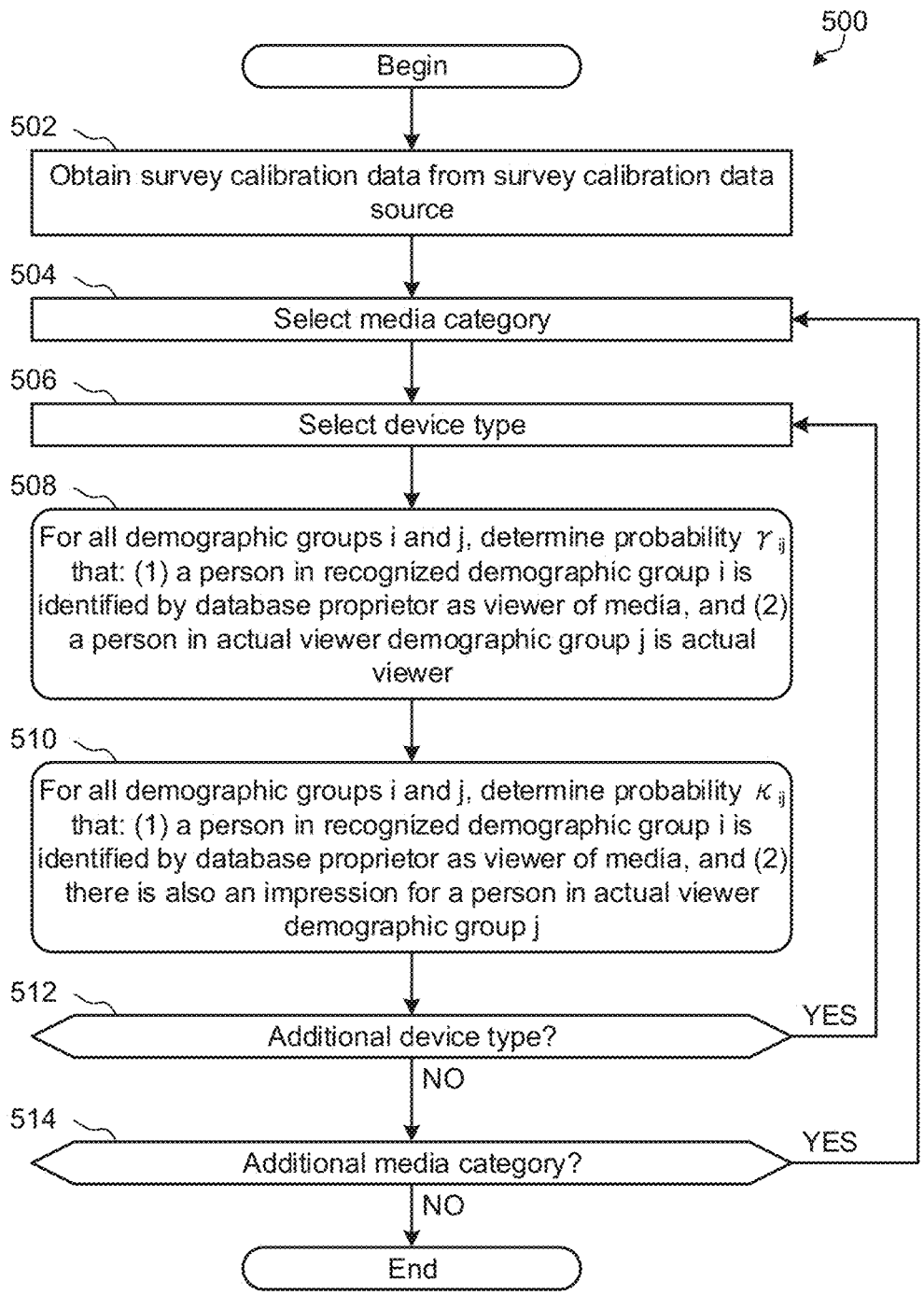
FIG. 5 is a flow diagram representative of example machine readable instructions which may be executed to implement the example impression data compensator of FIG. 2 to calculate a misattribution correction matrix and/or a co-viewing matrix.

FIG. 5 is a flow diagram representative of example machine readable instructions 500 which may be executed to implement the example impression data compensator 200 of FIG. 2 to calculate a misattribution correction matrix and/or a co-viewing matrix. The example instructions 500 may be executed by the example sharing matrix generator 204 of FIG. 2 to implement block 402 of FIG. 4.

The example sharing matrix generator 204 of FIG. 2 obtains survey calibration data from a survey calibration data source (e.g., from the calibration data collector 202 of FIG. 2) (block 502). For example, the sharing matrix generator 204 may obtain information indicating the devices accessible to persons in respondent households and/or media categories watched on different device types by respondents. The example aggregated distribution generator 218 selects a media category (block 504). The example aggregated distribution generator 218 selects a device type (block 506). In the example of FIG. 5, the media category and/or the device type are selected from media categories and/or devices types represented in the survey calibration data. For all demographic groups i and j, the example aggregated distribution generator 218 determines the probability $\gamma_{ij}$ that: (1) a person in recognized demographic group i is identified by a database proprietor (e.g., the database proprietor 104a of FIG. 1) as a viewer of media, and (2) a person in actual viewer demographic group j is an actual viewer (block 508). For example, the aggregated distribution generator 218 may use the example Tables 1-13 above to generate a misattribution correction matrix as shown in Table 14 above. Example instructions that may be executed to implement block 508 are described below with reference to FIG. 6.

The example aggregated distribution generator 218 determines, for all pairs of demographic groups i and j, a probability $\kappa_{ij}$ that: (1) a person in recognized demographic group i is identified by database proprietor as a viewer of media, and (2) there is also an impression for a person in actual viewer demographic group j (block 510). The collection of probabilities $\kappa_{ij}$ for the pairs of demographic groups i and j may be aggregated as a co-viewing matrix. Example instructions for implementing block 510 are described below with reference to FIG. 8.

The example aggregated distribution generator 218 determines whether there is any additional device type for which survey calibration data from the survey calibration data source should be processed (block 512). If there is an additional device type (block 512), control returns to block 506. If there is no additional device type (block 512), the example aggregated distribution generator 218 determines whether there is an additional media category for which survey calibration data from the survey calibration data source should be processed (block 514). If there is an additional media category, control returns to block 504. Otherwise, if there is no additional media category (block 514), the example instructions 500 end and, for example, control returns to block 404 of FIG. 4.

Figure 6:
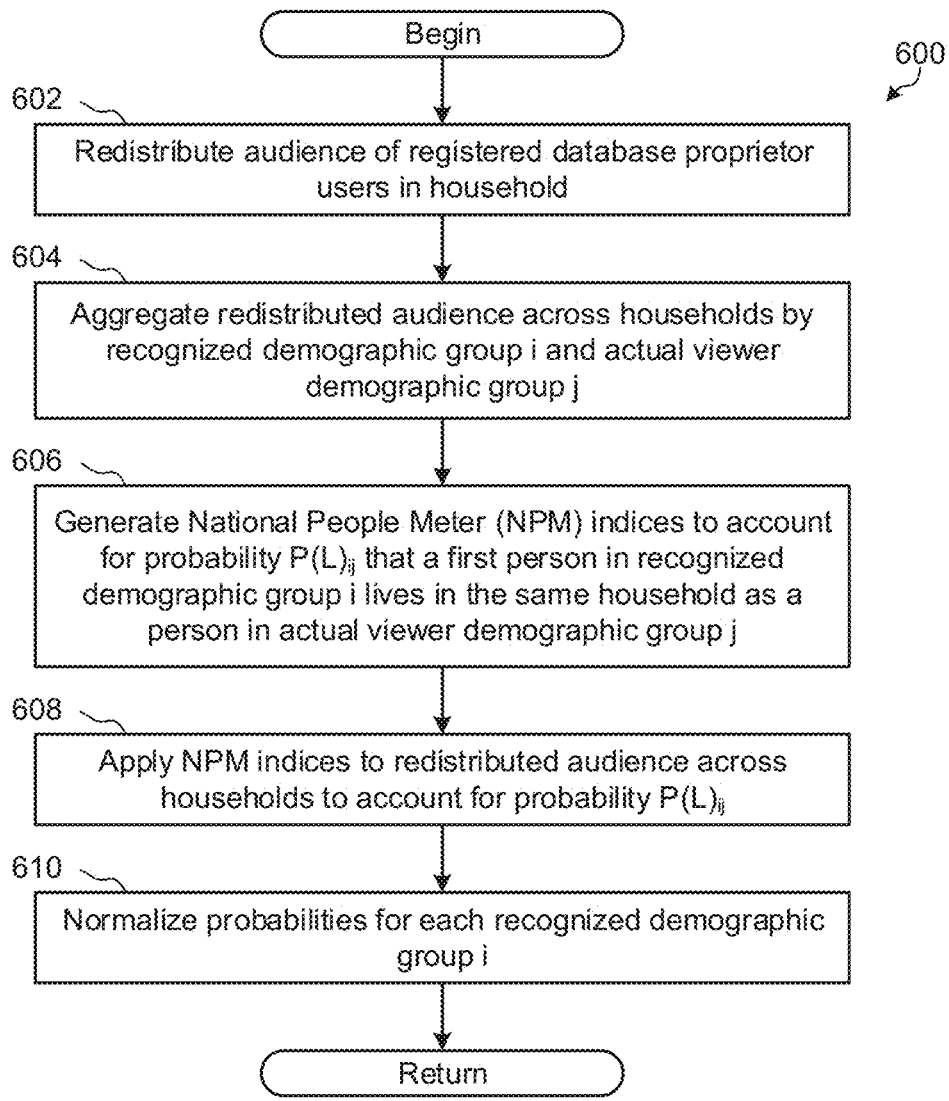
FIG. 6 is a flow diagram representative of example machine readable instructions which may be executed to implement the example impression data compensator of FIG. 2 to determine probabilities of misattribution for pairs of demographic groups.

FIG. 6 is a flow diagram representative of example machine readable instructions 600 which may be executed to determine a misattribution probability $\gamma_{ij}$. The example instructions 600 may be executed to implement block 508 of FIG. 5 to determine the probability $\gamma_{ij}$ that: (1) a person in recognized demographic group i is identified by a database proprietor (e.g., the database proprietor 104a of FIG. 1) as viewer of media, and (2) a person in actual viewer demographic group j is an actual viewer. Initially in the example instructions 600, the example household distribution generator 216 redistributes the audience of household members that are registered users of the database proprietor 104a (block 602). For example, the example household distribution generator 216 may generate an example redistributed audience matrix for a selected media category as described in connection with Table 5 and/or Table 6 above. The example aggregated distribution generator 218 aggregates the redistributed audience across households by recognized demographic group i and actual viewer demographic group j (block 604). For example, the aggregated distribution generator 218 can generate an example redistributed audience matrix for a selected media category for multiple households as described above in connection with Table 8.

The example matrix corrector 220 generates NPM indices to account for the probability $P(L)_{ij}$ that a first person in recognized demographic group i lives in the same household as a person in actual viewer demographic group j (block 606). For example, the example matrix corrector 220 may apply NPM data to survey response data to generate NPM indices as described above in connection with Tables 9-11. The example matrix corrector 220 applies NPM indices to redistributed database proprietor impressions across households to account for the probability $P(L)_{ij}$ that a first person in recognized demographic group i lives in the same household as a person in actual viewer demographic group j (block 608). For example, as described above in connection with Table 12, the matrix corrector 220 may determine each i,j cell value in Table 12 by multiplying redistributed audience values in the i,j cells of Table 8 above with corresponding NPM indices in the i,j cell values of Table 11 above. In this manner, the matrix corrector 220 applies an NPM index to redistributed impressions collected by the database proprietor 104a across different households to account for the probability $P(L)_{ij}$ that a first person in recognized demographic group i lives in the same household as a person in actual viewer demographic group j.

The example matrix normalizer 222 normalizes the probabilities for each of the recognized demographic groups i (block 610). For example, the matrix normalizer 222 normalizes each column (e.g., each demographic group recognized by the database proprietor 104a) in the misattribution matrix of Table 14 to cause the total of each column to equal the same number (e.g., 1.00, or 100%). Normalizing each of the columns causes the numbers of impressions after correction for misattribution to be equal to the total number of impressions detected by the database proprietor 104a and maintains the proportions of impressions that are associated with each recognized demographic group i by the database proprietor 104a. The example instructions 600 of FIG. 6 end, for example, control returns to block 510 of FIG. 5.

Figure 7:
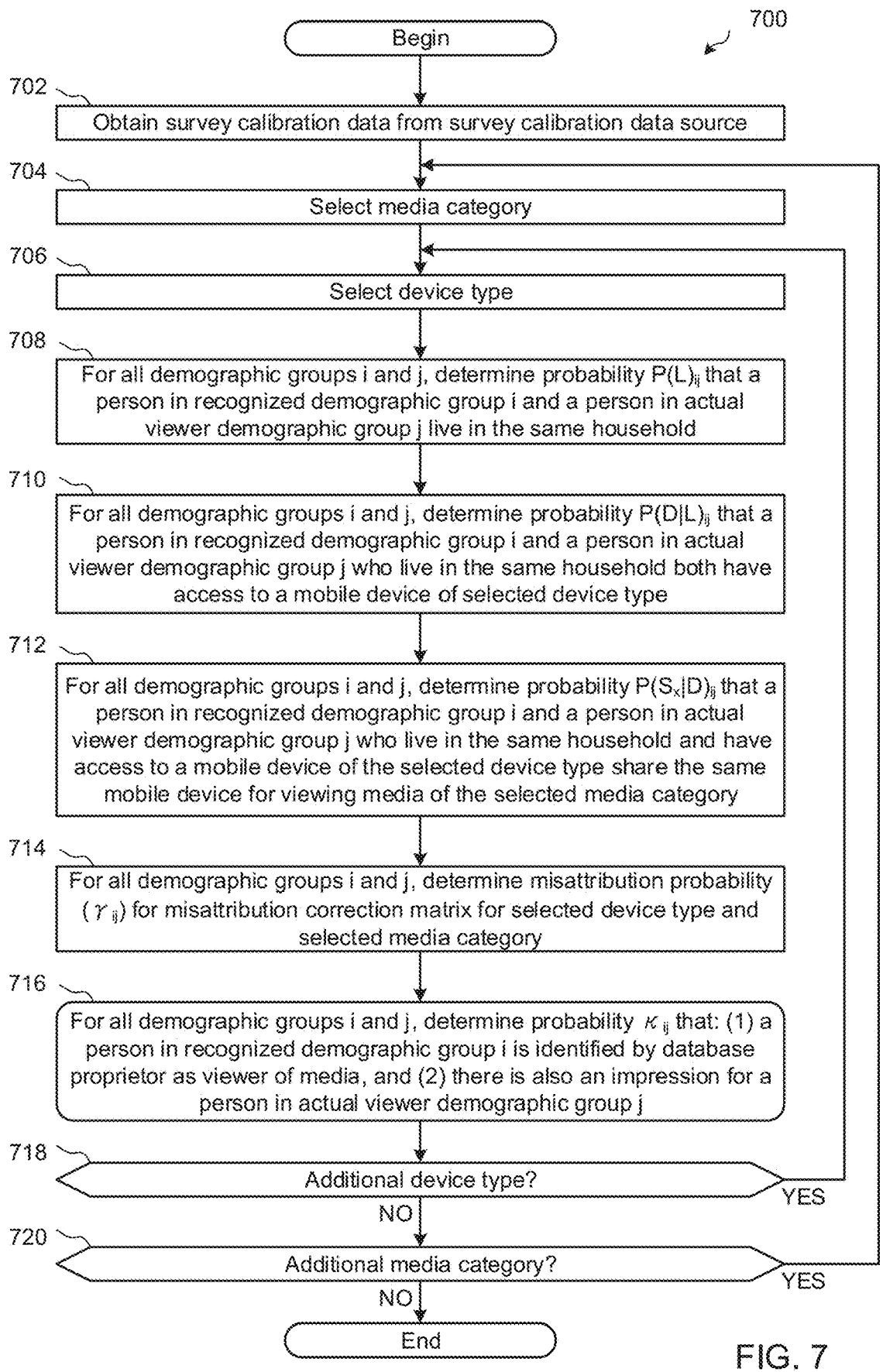
FIG. 7 is a flow diagram representative of example machine readable instructions which may be executed to implement the example impression data compensator of FIG. 2 to generate a misattribution correction matrix and/or a co-viewing matrix.

FIG. 7 is a flow diagram representative of example machine readable instructions 700 which may be executed to implement the example impression data compensator 200 of FIG. 2 to calculate a misattribution correction matrix and/or a co-viewing matrix. The example instructions 700 are an alternative example to the example instructions described above with reference to FIG. 5 to implement block 402 of FIG. 4.

The example sharing matrix generator 204 of FIG. 2 obtains survey calibration data from a survey calibration data source (e.g., from the calibration data collector 202 of FIG. 2) (block 702). For example, the sharing matrix generator 204 may obtain information indicating the devices accessible to persons in respondent households and/or media categories watched on different device types by respondents. The example aggregated distribution generator 218 selects a media category (block 704). The example aggregated distribution generator 218 selects a device type (block 706). In the example of FIG. 7, the media category and/or the device type are selected from media categories and/or devices types represented in the survey calibration data. For all pairs of demographic groups i and j, the example aggregated distribution generator 218 calculates a probability $P(L)_{ij}$ that a person in recognized demographic group i and a person in actual viewer demographic group j live in the same household (e.g., based on the survey calibration data source) (block 708). For example, the aggregated distribution generator 218 may determine the incidence of co-viewing by persons in demographic groups i and j living in the same household.

For all pairs of demographic groups i and j, the example aggregated distribution generator 218 determines a probability $P(D|L)_{ij}$ that a person in recognized demographic group i and a person in actual viewer demographic group j who live in the same household both have access to a mobile device of a selected device type (block 710).

For all pairs of demographic groups i and j, the example aggregated distribution generator 218 determines a probability $P(S_x|D)_{ij}$ that a person in recognized demographic group i (who is a database proprietor user) and a person in actual viewer demographic group j who live in the same household and have access to a mobile device of the selected device type share the same mobile device for viewing media of the selected media category (block 712). For example, the aggregated distribution generator 218 may determine an incidence in which persons in the demographic groups i and j both access media of the selected media category on the device type selected from the survey calibration data.

For all pairs of demographic groups i and j, the example aggregated distribution generator 218 determines the sharing probability $\gamma_{ij}$ for the selected pair of demographic groups i,j for a misattribution correction matrix associated with the selected device type and a selected media category (block 714). For example, the aggregated distribution generator 218 may use example Equation 1 described above to calculate the sharing probability $\gamma_{ij}$.

The example co-viewing matrix generator 224 determines, for all pairs of demographic groups i and j, a probability $\kappa_{ij}$ that: (1) a person in recognized demographic group i is identified by database proprietor as a viewer of media, and (2) there is also an impression for a person in actual viewer demographic group j (block 716). The collection of probabilities $\kappa_{ij}$ for the pairs of demographic groups i and j may be aggregated as a co-viewing matrix. Example instructions for implementing block 716 are described below with reference to FIG. 8.

The example aggregated distribution generator 218 determines whether there is any additional device type for which survey calibration data from the survey calibration data source should be processed (block 718). If there is an additional device type (block 718), control returns to block 706. If there is no additional device types (block 718), the example aggregated distribution generator 218 determines whether there is an additional media category for which survey calibration data from the survey calibration data source should be processed (block 720). If there is an additional media category, control returns to block 704. Otherwise, if there is no additional media category (block 720), the example instructions 700 end and, for example, control returns to block 404 of FIG. 4.

Figure 8:
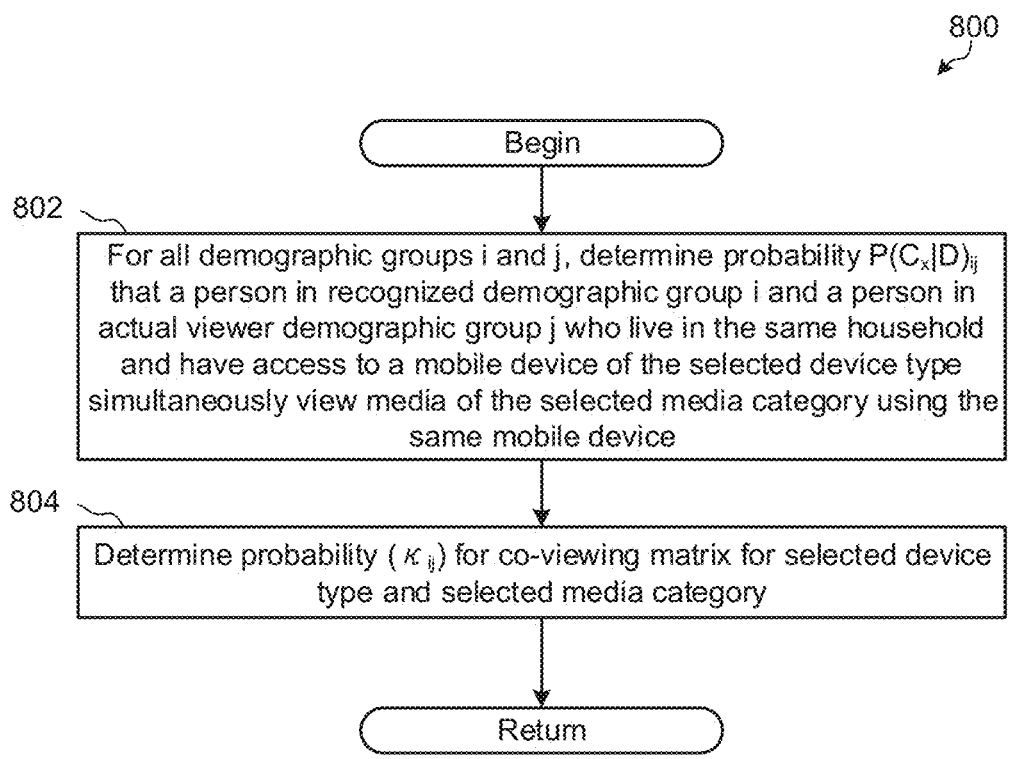
FIG. 8 is a flow diagram of example machine readable instructions which may be executed to implement the example impression data compensator of FIG. 2 to generate a co-viewing matrix.

FIG. 8 is a flow diagram of example machine readable instructions 800 which may be executed to calculate a co-viewing matrix. For example, the instructions 800 may be executed by the example co-viewing matrix generator 224 of FIG. 2 to implement block 510 of FIG. 5 and/or block 716 of FIG. 7.

For all pairs of demographic groups i and j, the example co-viewing matrix generator 224 determines a probability $P(C_x|D)_{ij}$ that a person in recognized demographic group i and a person in actual viewer demographic group j, who live in the same household and have access to a mobile device of a selected device type, simultaneously access (e.g., view) media of a selected media category using the same the mobile device (block 802). In other words, the example co-viewing matrix generator 224 determines the probability or incidence of co-viewing for the selected device type, media category, and demographic groups i and j, given the persons live in the same household and have access to the same mobile device. The example co-viewing matrix generator 224 determines the probability $\kappa_{ij}$ for the co-viewing matrix for the selected device type and the selected media category (block 804). For example, the example co-viewing matrix generator 224 may calculate the probability $\kappa_{ij}$ as: $\kappa_{ij}=P(L)_{ij} \times P(D|L)_{ij} \times P(C_x|D)_{ij}$. The example probability $\kappa_{ij}$ represents the probability of co-viewing for the selected pair of demographic groups i and j, the selected device type, and the selected media category.

The example instructions 800 end and, for example, control returns to block 512 of FIG. 5 and/or block 718 of FIG. 7.

Figure 9:
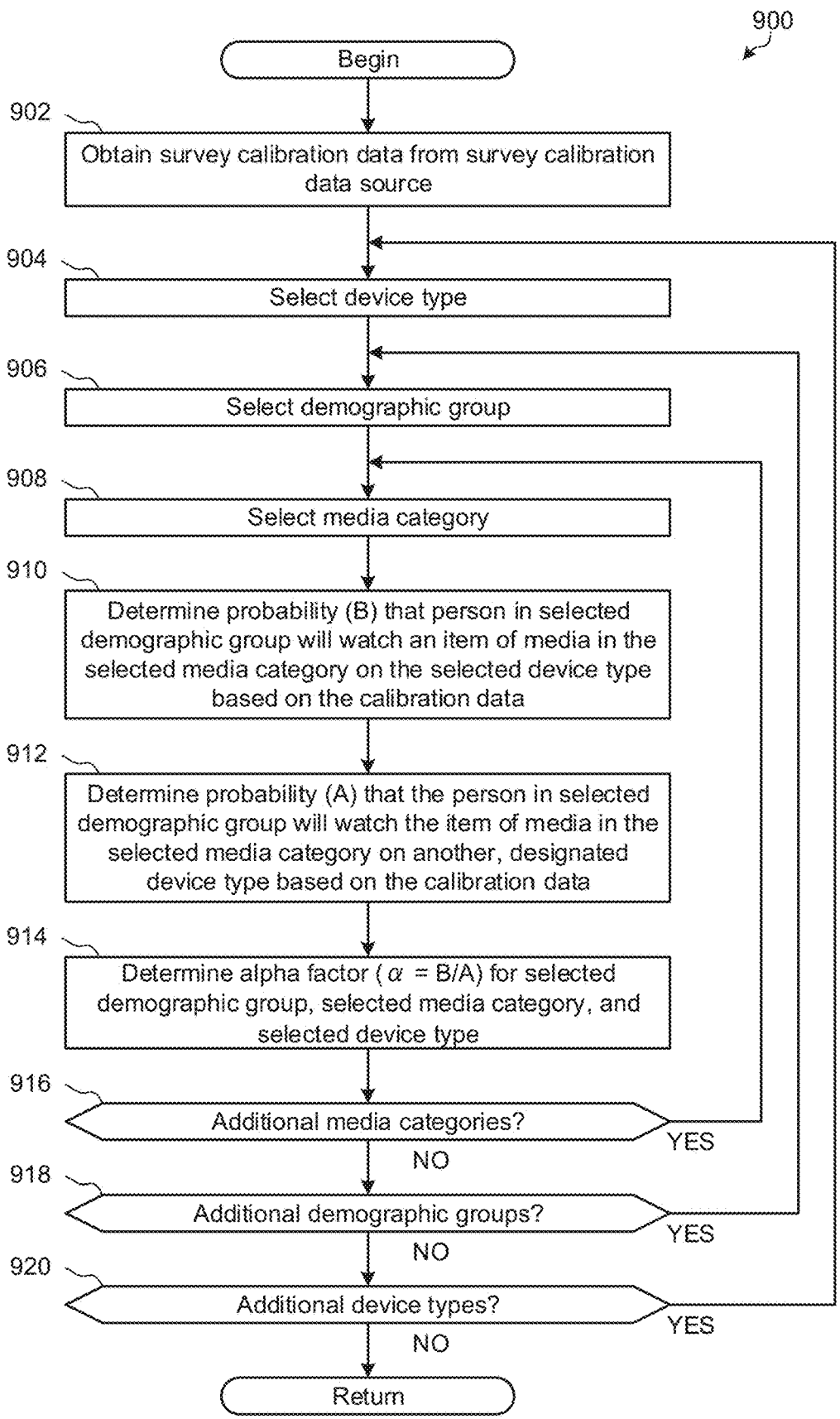
FIG. 9 is a flow diagram representative of example machine readable instructions which may be executed to implement the example impression data compensator of FIG. 2 to generate an alpha factor associated with a media audience not covered by a database proprietor.

FIG. 9 is a flow diagram representative of example machine readable instructions 900 which may be executed to implement the example impression data compensator 200 of FIG. 2 to calculate a demographic profile (or non-coverage factors) associated with a media audience not covered by a database proprietor. The example instructions 900 may be executed by the example non-coverage calculator 210 of FIG. 2 to implement blocks 404 and 405 of FIG. 4.

The example non-coverage calculator 210 of FIG. 2 obtains survey calibration data from the survey calibration data source (block 902). For example, the non-coverage calculator 210 may obtain survey calibration data (e.g., from the calibration data collector 202 of FIG. 2) indicating numbers of persons that are not registered with the database proprietor 104a and/or are registered with the database proprietor 104a but do not log in to the database proprietor 104a on specific types of devices.

The example non-coverage calculator 210 selects a device type (block 904). The example non-coverage calculator 210 selects a demographic group (block 906). The example non-coverage calculator 210 selects a media category (block 908). In the example of FIG. 9, the media category, the demographic group, and/or the device type are selected from media categories, demographic groups, and/or devices types represented in the survey calibration data. For example, the non-coverage calculator 210 may generate different alpha factors (e.g., the example alpha factors $\alpha=B/A$ of Table 17) for different combinations of demographic groups, media categories, and device types based on the survey calibration data obtained from the survey calibration data source.

The example non-coverage calculator 210 determines a probability B based on the survey calibration data (e.g., data from the survey calibration data source), where B is the probability that a person in the selected demographic group watches an item of media in the selected media category on the selected device type (block 910). In the example of FIG. 9, the non-coverage calculator 210 determines the probability B based on weights associated with the selected device type, the selected demographic group, and/or the selected media category determined from the survey calibration data.

The example non-coverage calculator 210 also determines a probability A based on the survey calibration data, where A is the probability that a person in the selected demographic group watches an item of media in the selected media category on another device type (e.g., a standard device type associated with the item of media) that is different than the selected device type (block 912). In the example of FIG. 9, the non-coverage calculator 210 determines the probability A based on weights associated with the other device type, the selected demographic group, and/or the selected media category determined from the survey calibration data. In the example of FIG. 9, the probabilities B and A are determined for media that is accessible via both the selected device type and the other device type.

For example, for an episode of a television program in a particular media category, the other device type may be a television and the selected device type may be a computing device on which the episode of the television program may be accessed via streaming video (e.g., mobile devices and/or mobile devices of a more specific type such as smartphones, tablet computers, and/or portable media players). Such television programs are often made available via streaming video after an initial or premiere presentation on television. Thus, a person can access the episode of the television program on television (e.g., the other device type) and/or via streaming media on a computing device (e.g., the selected device type).

The example non-coverage calculator 210 determines the alpha factor (e.g., $\alpha=B/A$ of Table 17 above) for the selected demographic group, the selected media category, and the selected device type (block 914). Thus, in the example of FIG. 9, each combination of demographic group, media category, and device type has a separate alpha factor. However, in other examples, alpha factors may be the same for every demographic group, every media category, and/or every device type. Additionally or alternatively, the example non-coverage calculator 210 determines alpha factors using combinations including factors such as geographic regions, stations, day parts, and/or other factors.

The example non-coverage calculator 210 determines whether there are additional media categories (block 916). If there are additional media categories (block 916), control returns to block 908 to select another media category. When there are no more media categories (block 916), the example non-coverage calculator 210 determines whether there are additional demographic groups (block 918). If there are additional demographic groups (block 918), control returns to block 906 to select another demographic group. When there are no more demographic groups for the selected device type (block 918), the example non-coverage calculator 210 determines whether there are additional device types (block 920). If there are additional device types (block 920), control returns to block 904 to select another device type. When there are no additional device types for the selected media category (block 920), the example instructions 900 of FIG. 9 end and, for example, control returns to block 406 of FIG. 4.

Figure 10:
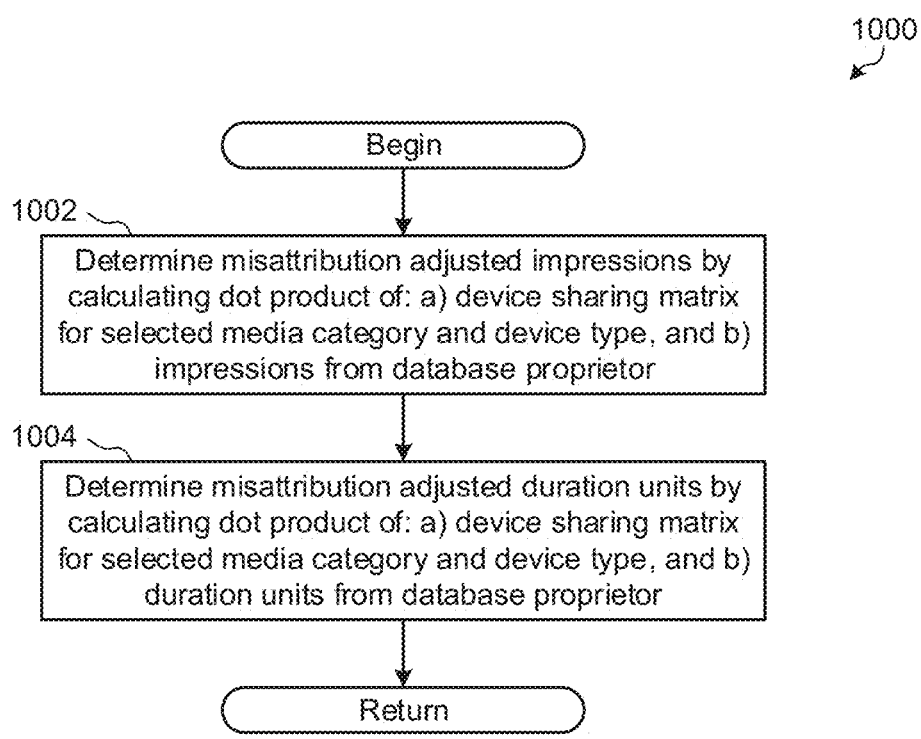
FIG. 10 is a flow diagram representative of example machine readable instructions which may be executed to implement the example impression data compensator of FIG. 2 to adjust impressions based on a misattribution correction matrix.

FIG. 10 is a flow diagram representative of example machine readable instructions 1000 which may be executed to implement the example impression data compensator 200 of FIG. 2 to adjust impressions and/or duration units based on a misattribution correction matrix. The example instructions 1000 may be executed by the example misattribution corrector 206 of FIG. 2 to implement block 414 of FIG. 4.

The example misattribution corrector 206 of FIG. 2 determines misattribution adjusted impressions by calculating a dot product of: a) the misattribution correction matrix that corresponds to the selected media category and the selected device type, and b) the impression counts recognized by the database proprietor for each recognized demographic group i (block 1002). The result of the dot product is the misattribution adjusted impressions for each of the demographic groups. For example, the misattribution corrector 206 may calculate the dot product of the misattribution correction matrix of Table 14 with the impression information of Table 15 to obtain misattribution adjusted impressions.

The example misattribution corrector 206 of FIG. 2 determines misattribution adjusted duration units by calculating a dot product of: a) the misattribution correction matrix that corresponds to the selected media category and the selected device type, and b) the duration units recognized by the database proprietor for each recognized demographic group i (block 1004). The example instructions 1000 end and, for example, control returns to block 416 of FIG. 4.

Figure 11:
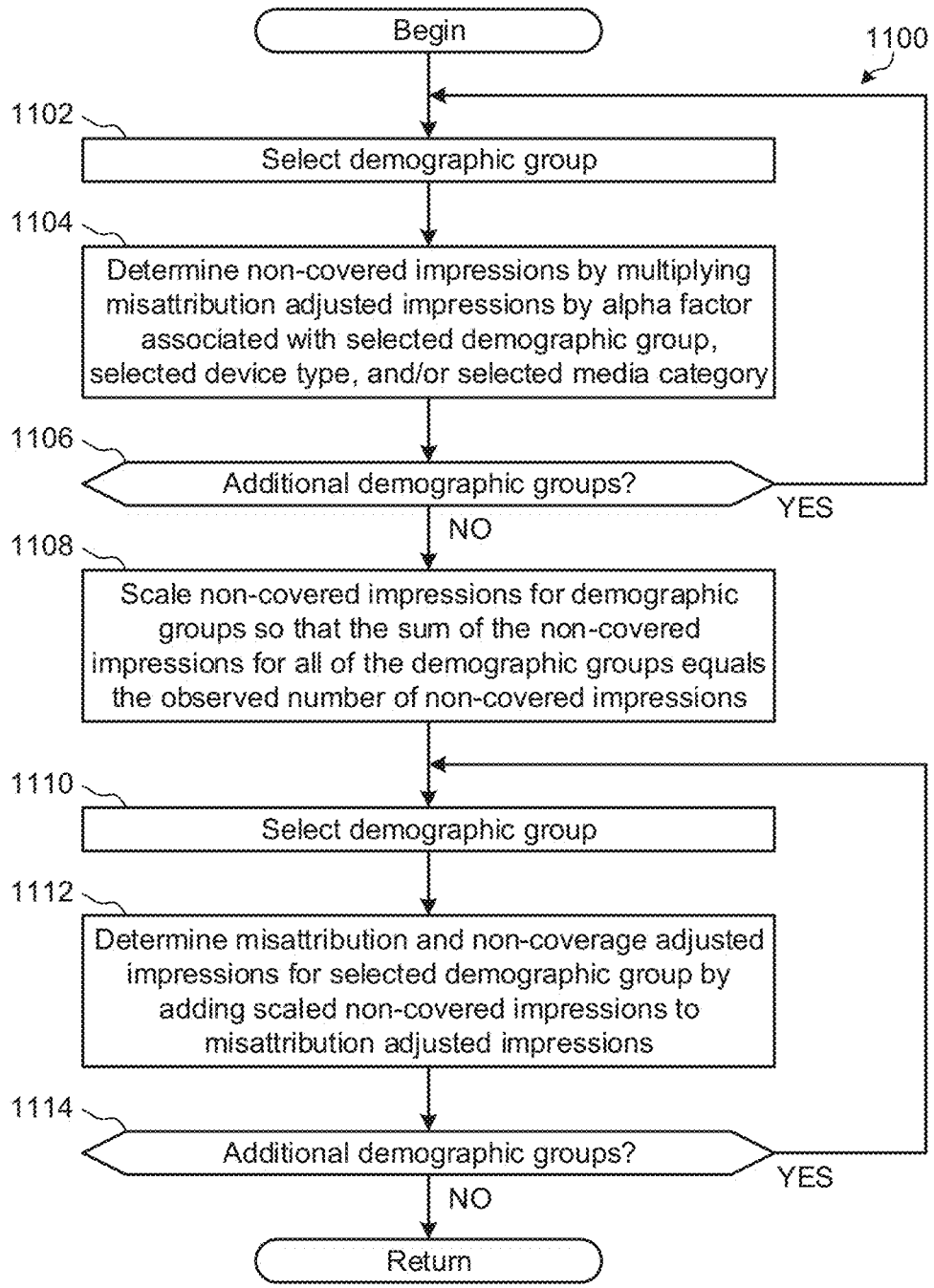
FIG. 11 is a flow diagram representative of example machine readable instructions which may be executed to implement the example impression data compensator of FIG. 2 to adjust impressions based on non-coverage factors corresponding to impression collection techniques of a database proprietor.

FIG. 11 is a flow diagram representative of example machine readable instructions 1100 which may be executed to implement the example impression data compensator 200 of FIG. 2 to adjust impressions based on non-coverage factors for a database proprietor. The example instructions 1100 may be executed by the example non-coverage corrector 212 of FIG. 2 to implement block 416 of FIG. 4.

The example non-coverage corrector 212 of FIG. 2 selects a demographic group (block 1102). The selected demographic group may be a recognized demographic group i and/or an actual viewer demographic group j discussed above with reference to Tables 1-14. The non-coverage corrector 212 determines non-covered impressions by multiplying misattribution adjusted impressions by an alpha factor (e.g., $\alpha=B/A$ of Table 17 above) associated with the selected demographic group, the selected device type, and/or the selected media category (block 1104). For example, the non-coverage corrector 212 may determine the applicable alpha factor (e.g., determined in block 404 of FIG. 4 and/or in the example instructions 900 of FIG. 6) for the selected demographic group (e.g., selected in block 1102), the selected device type (e.g., selected in block 412 of FIG. 4), and/or the selected media category (e.g., selected in block 410 of FIG. 4). The example non-coverage corrector 212 multiplies the determined alpha factor by the misattribution-adjusted impressions to determine the non-covered impressions at block 1104.

The example non-coverage corrector 212 determines whether there are additional demographic groups (block 1106). If there are additional demographic groups (block 1106), control returns to block 1102 to select another demographic group. When there are no more demographic groups to be adjusted (block 1106), the example non-coverage corrector 212 scales the non-covered impressions for the demographic groups (e.g., all of the demographic groups in the same set of calculations) so that the sum of the non-covered impressions for all of the demographic groups equals the observed number of non-covered impressions (block 1108). For example, as described above with reference to Table 17, the example non-coverage corrector 212 may 1) calculate the adjusted percentage (Adj % of Table 17) as the product of the alpha factor ($\alpha=B/A$) and the measured percentage (Meas % of Table 17) for each demographic group (Demos); 2) normalize the adjusted percentages (Adj % of Table 17) to a sum of 100%; and 3) multiply the normalized percentages (Norm % of Table 17) by the non-covered impressions (e.g., the number of impressions not associated with a demographic group (Demos of Table 17) by the database proprietor 104a) to obtain the scaled number of non-covered impressions (Non-covered impressions of Table 17) attributable to each demographic group (Demos of Table 17).

The example non-coverage corrector 212 of FIG. 2 selects a demographic group (block 1110). The demographic group selected in block 1110 is a demographic group previously selected in an iteration of block 1102. In the illustrated example, blocks 1110, 1112, and 1114 are executed to process the scaled non-covered impressions for all demographic groups determined at blocks 1102, 1104, 1106, and 1108. The non-coverage corrector 212 determines misattribution and non-coverage adjusted impressions for the selected demographic group by adding the scaled non-covered impressions (e.g., determined in block 1108) to the misattribution adjusted impressions for the demographic group (block 1112).

The example non-coverage corrector 212 determines whether there are additional demographic groups (block 1114). If there are additional demographic groups (block 1114), control returns to block 1110 to select another demographic group. When there are no more demographic groups to be adjusted (block 1114), the example instructions 1100 end and, for example, control returns to block 418 of FIG. 4.

While the examples above are described with reference to impressions, the examples may additionally or alternatively be applied to unique audience and/or duration units. For example, a redistributed audience matrix may be applied to an audience of media of interest, instead of being applied to impressions as described above. In some examples, only one impression is required to counted a person in the audience of media, and a person is not counted in an audience of the media when he or she has no impressions. Thus, for example, in the example of Table 3, the audience for 12-17 year old males would be reduced by one after redistribution of impressions, because the 12-17 year old male is reported as accessing media by the database proprietor 104a but, after redistribution, is determined to have no impressions for media of the comedy category on the tablet computer, thereby decreasing the audience of 12-17 year old males by one. Conversely, the audience for 35-44 year old females would be increased by one because the 35-44 year old female is not associated with any impressions by the database proprietor 104a and results in no audience, but after redistribution of the audience it may be determined that the 35-44 year old female does in fact access media of the category of interest on the tablet computer.

Figure 12:
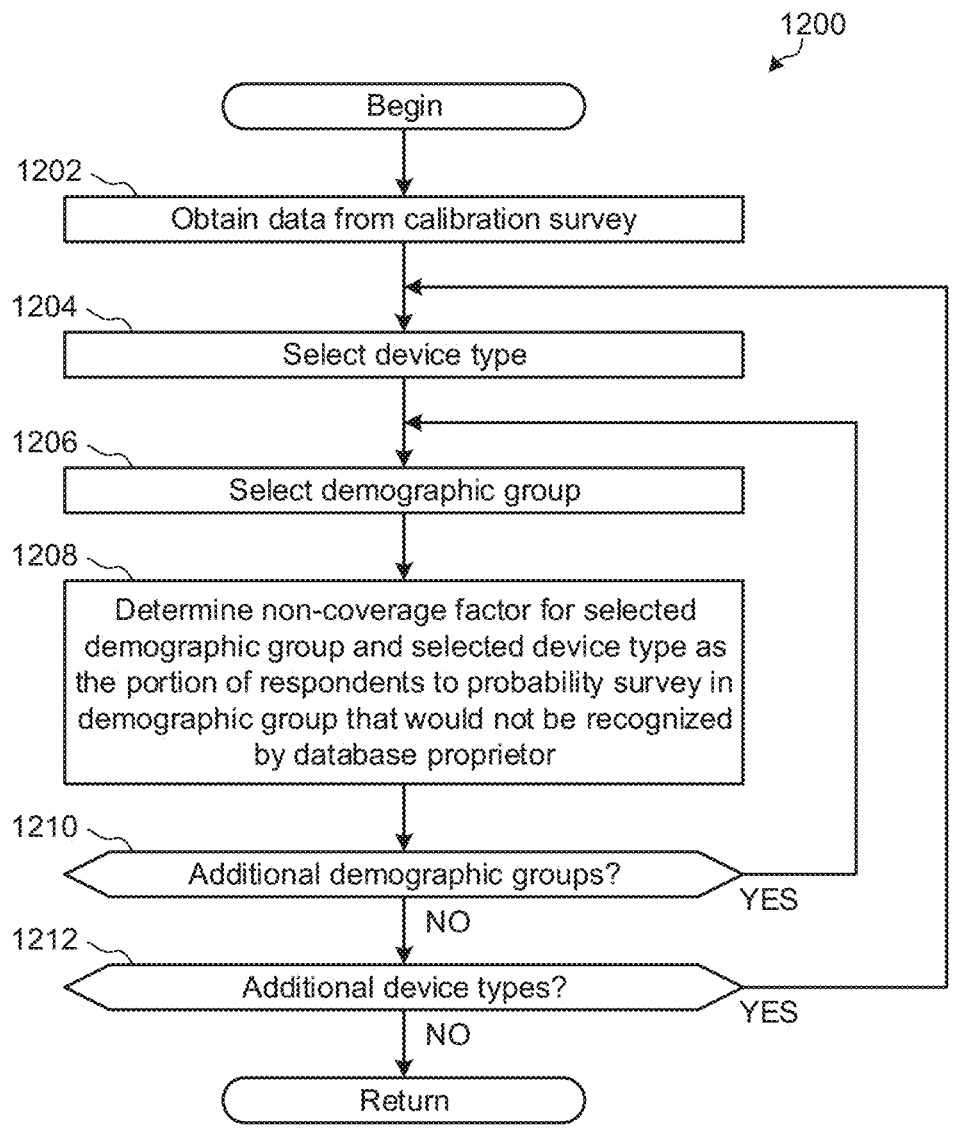
FIG. 12 is a flow diagram representative of example machine readable instructions which may be executed to implement the example impression data compensator of FIG. 2 to calculate a demographic profile (or non-coverage factors) associated with a media audience not covered by a database proprietor.

FIG. 12 is a flow diagram representative of example machine readable instructions 1200 which may be executed to implement the example impression data compensator 200 of FIG. 2 to calculate a demographic profile (or non-coverage factors) associated with a media audience not covered by a database proprietor. The example instructions 1200 may be executed by the example non-coverage calculator 210 of FIG. 2 to implement blocks 404 and 405 of FIG. 4.

The example non-coverage calculator 210 obtains data from the calibration survey (block 1202). For example, the non-coverage calculator 210 may obtain calibration survey data indicating numbers of respondents that are not registered with the database proprietor 104a and/or are registered with the database proprietor 104a but do not log in to the database proprietor 104a on specific types of devices.

The example non-coverage calculator 210 selects a device type (block 1204) and selects a demographic group (block 1206). The example non-coverage calculator 210 determines a non-coverage factor for the selected demographic group and the selected device type as the portion of respondents to the calibration survey in the selected demographic group who would not be recognized by the database proprietor 104a when viewing media on the selected device type (block 1208).

The example non-coverage calculator 210 determines whether there are additional demographic groups (block 1210). If there are additional demographic groups (block 1210), control returns to block 1206 to select another demographic group. When there are no more demographic groups for the selected device type (block 1210), the example non-coverage calculator 210 determines whether there are additional device types (block 1212). If there are additional device types (block 1212), control returns to block 1204 to select another device type. When there are no additional device types (block 1212), the example instructions 1200 of FIG. 12 end and, for example, control returns to a calling function or process such as the example instructions 400 of FIG. 4 to proceed with execution of block 406.

Figure 13:
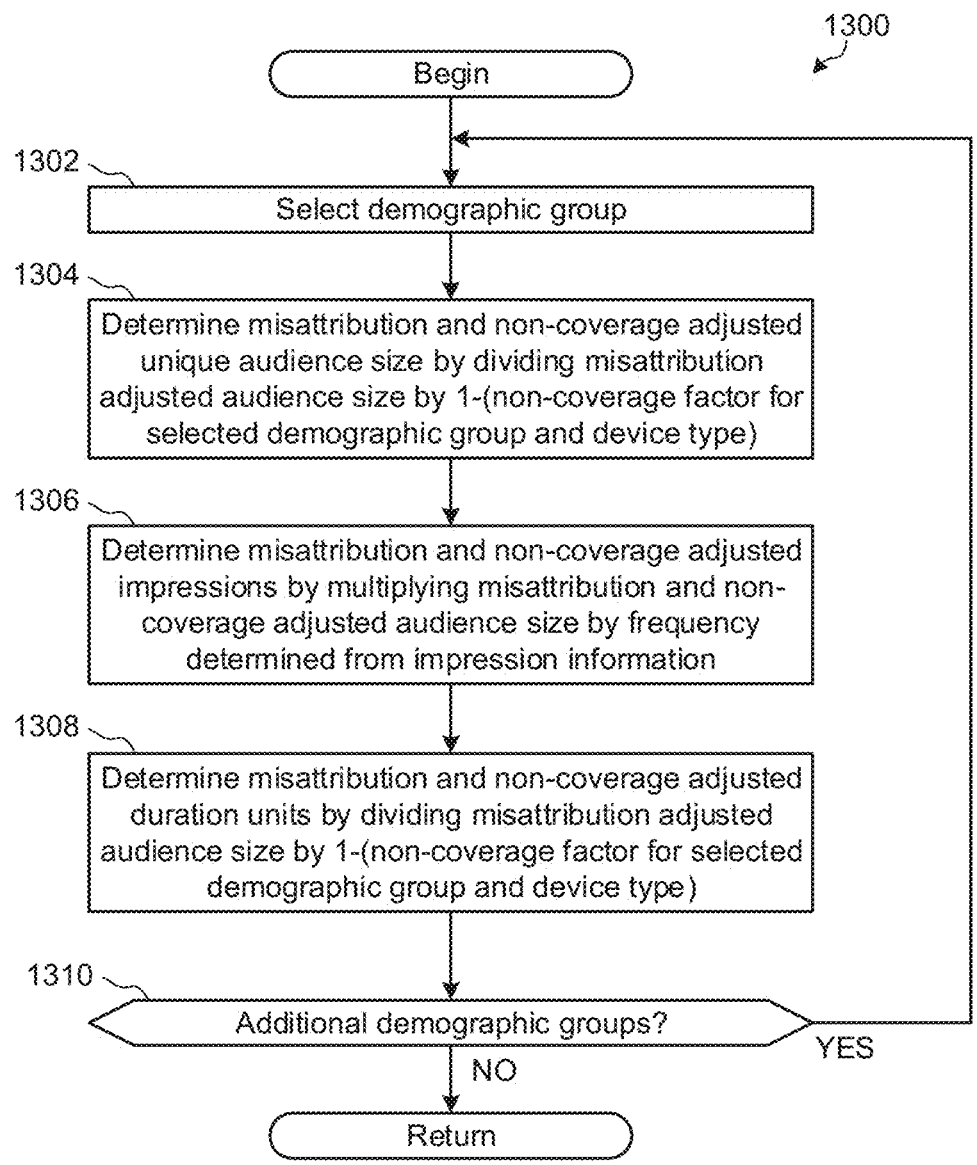
FIG. 13 is a flow diagram representative of example machine readable instructions which may be executed to implement the example impression data compensator of FIG. 2 to adjust impressions and/or unique audience based on non-coverage factors for a database proprietor.

FIG. 13 is a flow diagram representative of example machine readable instructions 1300 which may be executed to implement the example impression data compensator 200 of FIG. 2 to adjust impression counts and/or audience sizes based on non-coverage factors for a database proprietor. The example instructions 1300 may be executed by the example non-coverage corrector 212 of FIG. 2 to implement block 416 of FIG. 4.

The example non-coverage corrector 212 of FIG. 2 selects a demographic group (block 1302). The example non-coverage corrector 212 determines a misattribution and non-coverage error adjusted unique audience size by dividing the misattribution adjusted unique audience size (determined using the instructions of FIG. 10) by 1-(Non-Coverage Factor for the selected demographic group and selected device type) (block 1304).

The example non-coverage corrector 212 determines misattribution and non-coverage adjusted impression count by multiplying the misattribution and non-coverage adjusted unique audience size by a frequency for the selected demographic group and the selected device type determined from impression information (block 1306).

The example non-coverage corrector 212 determines a misattribution and non-coverage error adjusted duration units by dividing the misattribution adjusted duration units (determined using the instructions of FIG. 10) by 1-(Non- Coverage Factor for the selected demographic group and selected device type) (block 1308).

The example non-coverage corrector 212 determines whether there are additional demographic groups (block 1310). If there are additional demographic groups (block 1310), control returns to block 1302 to select another demographic group. When there are no more demographic groups to be adjusted (block 1308), the example instructions 1300 end and, for example, control returns to a calling function or process such as the example instructions 400 of FIG. 4 to proceed with execution of block 418.

In some instances, data selection may be performed based on genre. In some examples, genre may be provided by the media publisher 120 (e.g., television network provider, media provider, etc.). In other examples, genre may be unavailable from providers of the media. In such other examples when genre is not readily available, genre may be predicted using, for example, techniques disclosed below in connection with FIGS. 14-20.

In cross-platform audience measurement, an AME (e.g., the AME 108 of FIG. 1) monitors audiences of television (and/or radio) programs when they are broadcast via television (and/or radio) stations (e.g., local television stations, local radio stations) and when they are provided via delayed media services within a particular amount of time (e.g., seven days) after the broadcast. Example delayed media services may be accessed via on-demand services, streaming services application, apps, web pages, etc. on mobile devices or stationary computing devices. Example delayed media services may also be provided on digital video recorders (DVRs), cable boxes, internet-media delivery set-to-boxes, smart televisions, etc. In this manner, the AME performs cross-platform audience measurement by collecting impressions for both the television (and/or radio) audience and the delayed audience. In some examples, the impressions are analyzed to generate media ratings. In some examples, genre is used to determine adjustment factors for calibrating mobile census data. In such examples, the calibrated mobile census data is used to produce ratings. Genres are categories of media based on, for example, similarities in form, style, and/or subject matter, etc. Example genres include comedy, drama, sports, news, children's programming, etc.

In some examples, impressions are collected based on data encoded in the media. However, in some examples, the encoded data does not include genre information. For example, programming broadcast by local broadcasters does not have genre information and the encoded data for local broadcasts do not include a program name or identifier. In addition, the genre information or the program name is not provided by the broadcasters or media owners in time to produce overnight ratings. Overnight ratings are often used to quickly assess the success of a broadcast program based on impression counts and audience size. In some instances, the success of a broadcast program reflected in overnight ratings may be used by media networks (e.g., television networks) to sell advertisement space corresponding to delayed-viewing access of the same media available via, for example, an app or webpage of the media network (e.g., the ABC television broadcasting company) or a third party (e.g., Hulu.com) owning the rights to provide the media via delayed viewing services. Examples disclosed herein may be used to generate a model to predict the genre of local television (and/or radio) impressions. While the examples below are described with respect to television, the examples below may alternatively be implemented using radio or other media types.

Genre Prediction Modeling

The above examples of misattribution and/or non-coverage correction may include generating multiple misattribution correction tables (e.g., such as Table 14 above). In some examples, a misattribution correction matrix is generated for different device types and/or different genres of media. Examples described below may be used to predict the media genre of impressions for which genre information is not provided from the impression. By assigning genres to impressions, examples disclosed herein select an appropriate misattribution correction matrix and/or non-coverage factors (e.g., alpha factors of Tables 19 and/or 21 above) to compensate for misattribution error and/or non-coverage error in impression counts and/or audience sizes as disclosed above.

Examples disclosed below to generate genre prediction models use in-home media meters locally installed at client computers or televisions to collect information about accessed media or tuned-to media to facilitate generating the genre prediction models. However, examples disclosed above generate misattribution correction factors without relying on panelist meter software locally-installed at client computers to collect database proprietor registration status data and/or to collect data about media accessed by household members. The use of in-home media meters locally installed at client computers or televisions in genre prediction modeling and genre assignment is limited to collecting impressions and/or assigning genres to impressions. Such locally installed in-home meters are not used to generate misattribution correction matrices or non-coverage factors as disclosed herein. The genre prediction modeling and genre assignments disclosed below can be used to correct impressions for misattribution and/or non-coverage as disclosed above.

Figure 14:
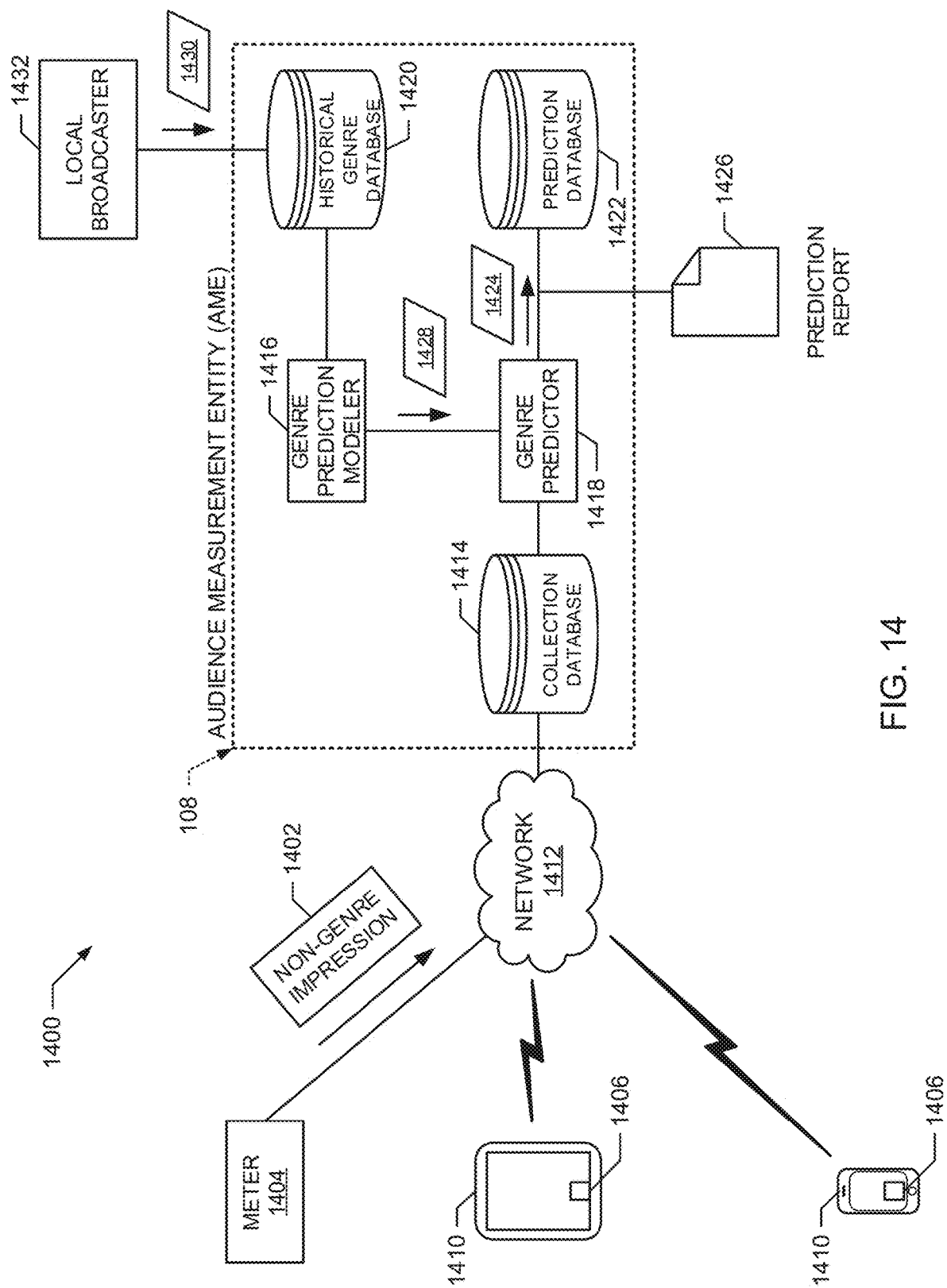
FIG. 14 illustrates an example system constructed in accordance with the teachings of this disclosure to determine genre for collected media impression data.

FIG. 14 illustrates an example system 1400 to generate genre prediction models, and predict and/or assign a genre to non-genre impression data 1402 (e.g., impression data that does not include genre information). In the illustrated example, in-home media meters 1404 (e.g., set top meters, personal people meters, etc.) send local television impression data 1402 to an audience measurement entity (AME) 108. The example AME 108 of FIG. 14 may be the AME 108 of FIG. 1.

In the illustrated example, the impression data 1402 generated from local broadcast television is not encoded with genre information because local television broadcasters have not yet encoded media at a time of its broadcasting. In the illustrated example, to monitor cross-platform audiences in addition to collecting local television impression data 1402 for a television audience, an example collector 1406 is provided in internet-enabled media devices 1410 to collect impressions of media accessed using streaming services via the internet-enabled media devices 1410. In the illustrated example, the collector 1406 is implemented using instructions incorporated into web pages, applications, or apps (e.g., on-demand applications, streaming applications, DVR access applications, etc.) that are executed by the internet-enabled media access devices 1410 (e.g., computers, televisions, tablets, smartphones, e-book readers, etc.).

Examples for collecting impressions using the example collector 1406 are disclosed in U.S. Pat. No. 8,370,489, issued Feb. 5, 2013, U.S. patent application Ser. No. 14/127,414, filed Dec. 18, 2013, U.S. patent application Ser. No. 14/329,779, filed Jul. 11, 2014, U.S. Provisional Application Ser. No. 61/952,726, filed Mar. 13, 2014, U.S. Provisional Application Ser. No. 62/014,659, filed Jun. 19, 2014, U.S. Provisional Application Ser. No. 62/023,675, filed Jul. 11, 2014, all of which are incorporated herein by reference in their entireties. The example media meters 1404 and/or the example collectors 1406 communicate with the example AME 108 through an example network 1412 (e.g., the Internet, a local area network, a wide area network, a cellular data network, etc.) via wired and/or wireless connections (e.g., a cable/DSL/satellite modem, a cell tower, etc.).

In the illustrated example of FIG. 14, the AME 108 processes the non-genre impression data 1402 to determine genres for impressions logged at the AME 108 based on the non-genre impression data 1402. In the illustrated example, the AME 108 includes a collection database 1414, a genre prediction modeler 1416, a genre predictor 1418, a historical genre database 1420, and a prediction database 1422. The example collection database 1414 is provided to store impressions logged based on the example non-genre impression data 1402 received and/or retrieved from the example media meters 1404 and/or the example collectors 1406.

The example genre prediction modeler 1416 generates genre prediction model(s) 1428 based on historical genre data stored in the example historical genre database 1420. In the illustrated example, historical genre data includes historical programming records 1430 that identify, for example, a genre of a program, a day part of the program, a day category of the program, a duration of the program. The example historical programming records 1430 are based on information (e.g., a program identifier, timestamp(s), a station identifier, an affiliate identifier, etc.) provided by local broadcasters 1432 after the program is broadcast. For example, the local broadcaster 1432 may provide the records 1430 for every quarter hour of local broadcast programming a week after the local broadcast.

The example genre predictor 1418 uses the genre prediction model(s) 1428 generated by the example genre prediction modeler 1416 to predict genre information and assign predicted genres to impressions logged in the collection database 1414 based on non-genre impression data 1402. In this manner, the example genre predictor 1418 generates predicted-genre impression records 1424 (e.g., the non-genre impressions logged in the collection database 1414 combined with the predicted genre information). In the illustrated example of FIG. 14, the predicted-genre impression records 1424 are stored in the prediction database 1422. In some examples, the predicted-genre impression records 1424 are used as non-corrected impressions, which may be compensated for misattribution and/or non-coverage to determine the demographic groups to which the predicted-genre impressions are attributable, as discussed above.

Figure 15:
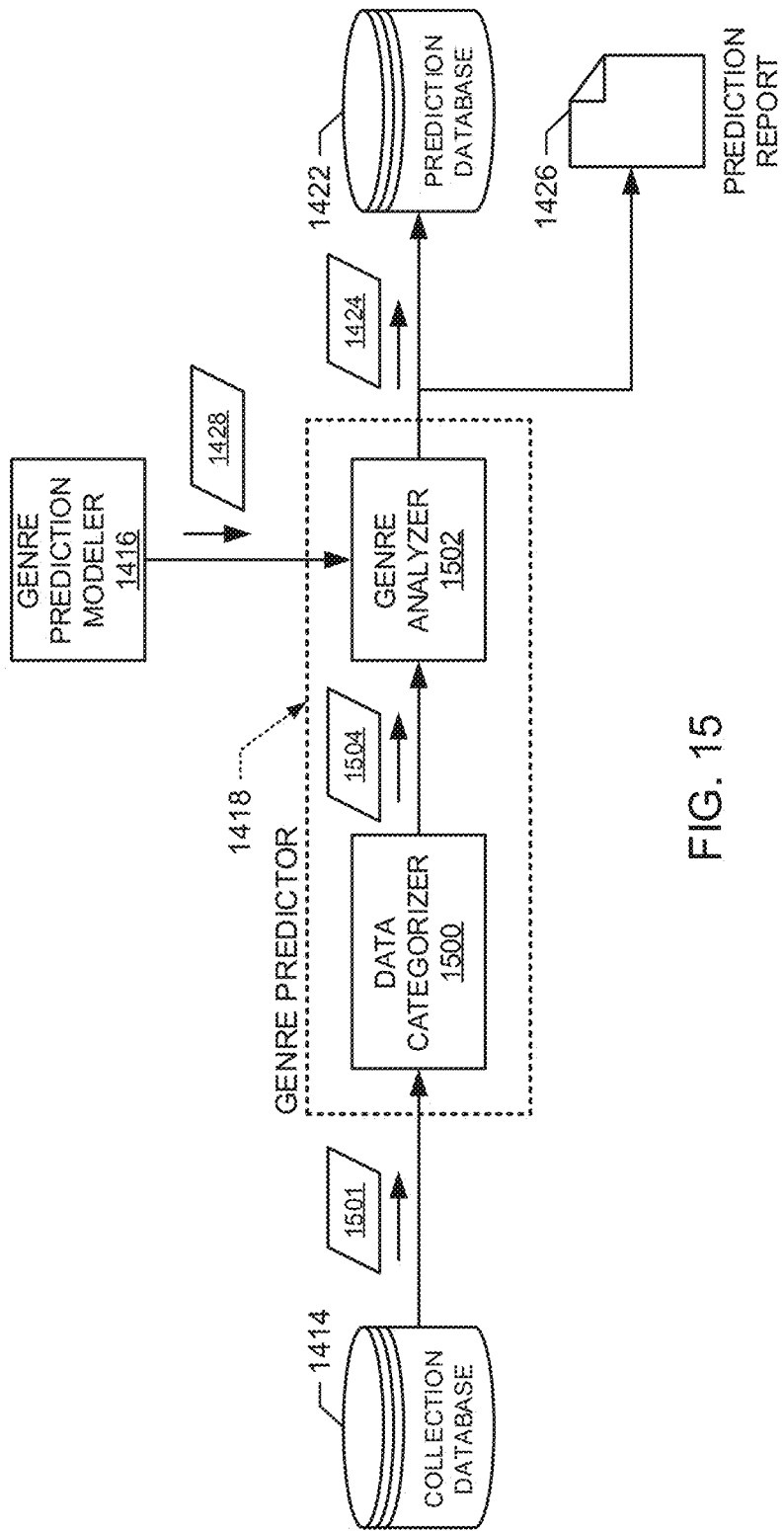
FIG. 15 illustrates an example of the genre predictor of FIG. 14 to determine the genre for the collected media impression data.

FIG. 15 illustrates an example implementation of the genre predictor 1418 of FIG. 14 to determine genre information for the non-genre impression records 1501 logged in the collection database 1414 based on the non-genre impression data 1402 of FIG. 14. In the illustrated example, the genre predictor 1418 receives and/or retrieves the non-genre impression records 1501 from the collection database 1414 and generates the predicted-genre impression records 1424 to be stored in the prediction database 1422 and/or reported on the prediction report 1426. In the illustrated example of FIG. 15, the genre predictor 1418 includes a data categorizer 1500 and a genre analyzer 1502. The example data categorizer 1500 is structured to transform the example non-genre impression records 1501 into categorized impression data 1504. Categorized impression data 1504 is described in more detail below with reference to FIG. 16.

The example genre analyzer 1502 is structured to apply genre prediction model(s) 1428 generated by the example genre prediction modeler 1416 to the example categorized impression data 1504. The example genre analyzer 1502 applies the genre prediction model(s) 1428 to the categorized impression data 1504. The example genre analyzer 1502 then assigns the predicted genre to the categorized impression data 1504 to generate the example predicted-genre impression records 1424. The example genre analyzer 1502 stores the example predicted-genre impression data 1424 in the example prediction database 1422, and/or includes the example predicted-genre impression data 1424 on the example prediction report 1426.

Figure 16:
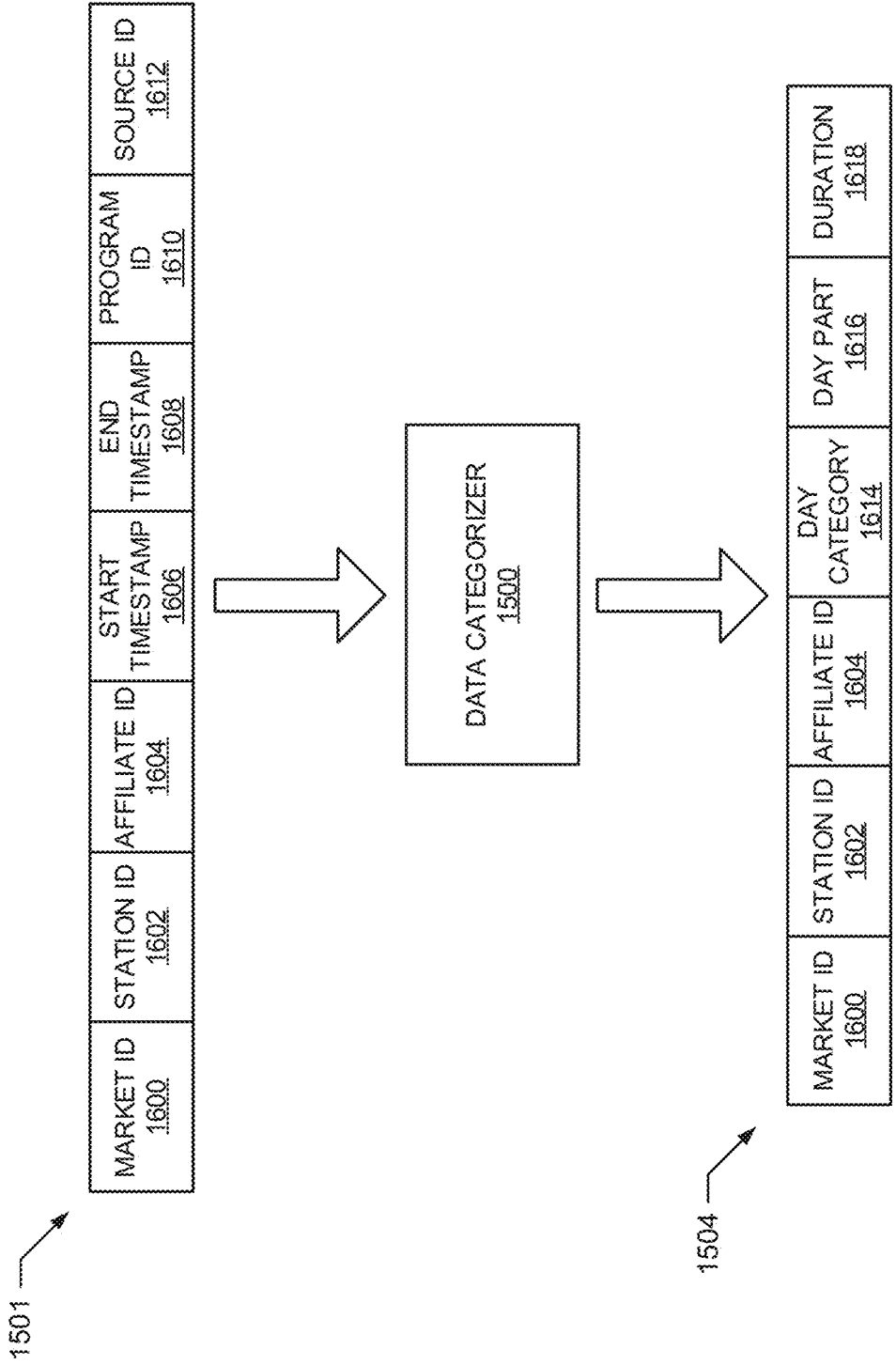
FIG. 16 illustrates an example of the data categorizer of FIG. 15 to categorize the collected media impression data to be used by the genre analyzer of FIG. 15 to predict genre.

FIG. 16 illustrates an example manner in which the data categorizer 1500 of FIG. 15 categorizes the non-genre impression data records 1501 to be used by the genre analyzer 1502 of FIG. 15 to predict genre. In the illustrated example, a non-genre impression data records 1501 includes an example market identifier (ID) 1600, an example station ID 1602, an example affiliate ID 1604, an example start timestamp 1606, an example end timestamp 1608, an example program ID 1610, and an example source ID 1612. Any one or more of these fields may be omitted and one or more additional fields may be present. For example, non-genre impression data records 1501 corresponding to national programming may include the program ID 1610 and the source ID 1612. Additionally, non-genre impression data records 1501 corresponding to local broadcast programming may omit the program ID 1610 and the source ID 1612. The example market ID 1600 identifies the market (e.g., a geographic location, a municipality, etc.) in which the corresponding television program aired. In some examples, the market ID 1600 is assigned by the AME 108 (FIG. 14) or any other appropriate entity. The station ID 1602 identifies the local station that broadcast the television program. In some examples, the station ID 1602 is an alphanumeric number assigned by the AME 108 (FIG. 14) or any other appropriate entity. In some examples, the station ID 1602 is the call sign (e.g., WXTV, KVEA, WSNS, etc.) used by a local television station to identify itself.

The example affiliate ID 1604 identifies the network affiliate (e.g., American Broadcasting Company, Telemundo, FOX Broadcasting Company, etc.) of the local television station. In some examples, the affiliate ID 1604 is a number assigned by the AME 108 to represent the network affiliate (e.g., 100 for ABC, 101 for NBC, etc.). In some examples, the affiliate ID 1604 may be an alphabetic representation of the name of the network affiliate (e.g., "ABC" for the American Broadcasting Company, "TMD" for Telemundo, etc.). The example start timestamp 1606 includes a starting date and a starting time of the program associated with the non-genre impression record 1501. The example end timestamp 1608 includes an ending date and an ending time of the program associated with the non-genre impression record 1501. If included in the non-genre impression record 1501, the example program ID 1610 identifies the television program (e.g., "Arrested Development," "News Radio," "Sabado Gigante," etc.) associated with the non-genre impression record 1501. In some examples, the program ID 1610 is a numeric or alphanumeric identifier that is uniquely associated in a reference database with a title and/or other information of a corresponding television program. The example source ID 1612 identifies the source (e.g., the production company, etc.) of the television program.

In the illustrated example of FIG. 16, the categorized impression data 1504 includes the example market identifier 1600, the example station ID 1602, the example affiliate ID 1604, an example day category 1614, an example day part 1616, and an example duration 1618. The example data categorizer 1500 uses the start timestamp 1606 and the end timestamp 1608 of the non-genre impression record 1501 to determine the example day category 1614, the example day part 1616 and the example duration 1618 of the categorized impression data 1504. In the illustrated example, the duration 1618 of the categorized impression data 1504 is calculated by the data categorizer 1500 as being the difference in time between the start time noted in the start timestamp 1606 and the end time noted in the end timestamp 1608.

In the illustrated example, the data categorizer 1500 determines the example day category 1614 by using the start date in the example start timestamp 1606 and the end date in the example end timestamp 1608. In some examples, the day category 1614 may have a value of a day of the week (e.g., Monday, Tuesday, Wednesday, etc.). In some examples, the day category 1614 may be a reduced set of the days of the week. For example, the reduced set may include values for "weekday," "Saturday," or "Sunday." In some examples, when the start date noted the example start timestamp 1606 and the end date noted in the example end timestamp 1608 are different, the data categorizer 1500 may assign a day to the day category 1614 based on the amount of time the program was broadcast on that day. For example, if the start timestamp 1606 is "7/25/2014 23:30" (e.g., 30 minutes on a Friday) and the end timestamp 1608 is "7/26/2014 1:00" (e.g., 60 minutes on a Saturday), "Saturday" would be assigned to the day category 1614. In such examples, the data categorizer 1500 assigns to the day category 1614 the day on which more of the program was broadcast.

The example data categorizer 1500 uses the start time noted in the example start timestamp 1606 and the end time noted in the example end timestamp 1608 to determine the example day part 1616 of the example categorized impression data 1504. As discussed further below in connection with FIG. 17, day parts are time segments or partitions of a day (e.g., late fringe, weekday morning, weekday daytime, early fringe, prime time, weekend daytime, etc.) during which different types of television programming are aired, advertisements are purchased, and/or audience ratings are measured. In some examples, the day part 1616 of FIG. 16 may be the day part that includes the start time noted in the start timestamp 1606 and the end time noted in the end timestamp 1608.

While an example manner of implementing the genre predictor 1418 of FIG. 14 is illustrated in FIG. 15, one or more of the elements, processes and/or devices illustrated in FIG. 15 may be combined, divided, re-arranged, omitted, eliminated and/or implemented in any other way. Further, the example data categorizer 1500, the example genre analyzer 1502 and/or, more generally, the example genre predictor 1418 of FIG. 14 may be implemented by hardware, software, firmware and/or any combination of hardware, software and/or firmware. Thus, for example, any of the example data categorizer 1500, the example genre analyzer 1502 and/or, more generally, the example genre predictor 1418 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data categorizer 1500, the example genre analyzer 1502, and/or the example genre predictor 1418 is/are hereby expressly defined to include a tangible computer readable storage device or storage disk such as a memory, a digital versatile disk (DVD), a compact disk (CD), a Blu-ray disk, etc. storing the software and/or firmware. Further still, the example genre predictor 1418 may include one or more elements, processes and/or devices in addition to, or instead of, those illustrated in FIG. 15, and/or may include more than one of any or all of the illustrated elements, processes and devices.

Figure 17:
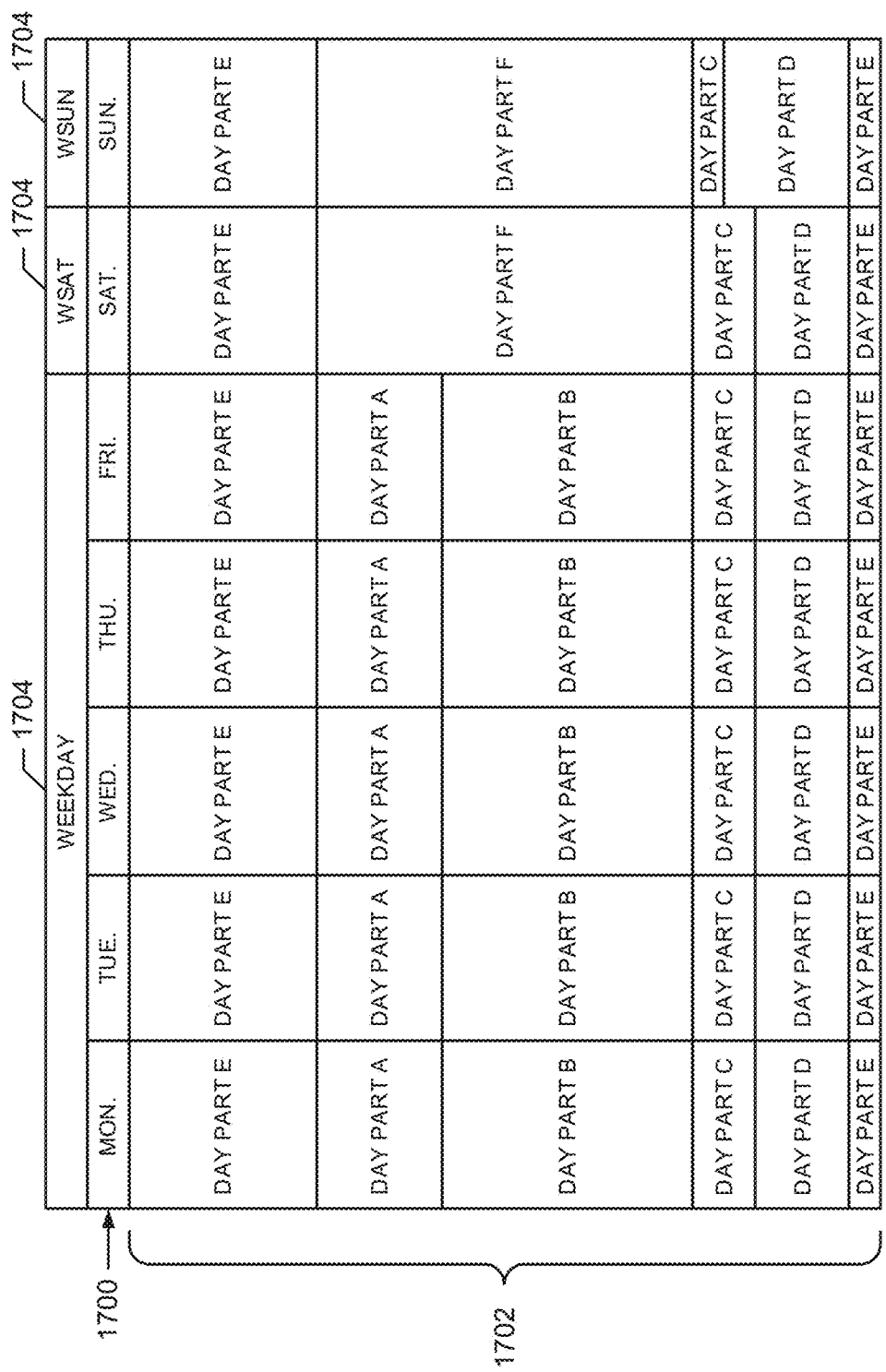
FIG. 17 illustrates an example chart depicting example day parts and example day categories used by the genre predictor of FIGS. 14 and 15.

FIG. 17 illustrates an example chart depicting day parts (e.g., day parts that may be indicated in the example day part 1616 of FIG. 16) and day categories (e.g., day categories that may be indicated in the example day category 1614 of FIG. 16) used by the genre predictor 1418 of FIGS. 14 and 15. In the illustrated example, each day of the week 1700 is divided into multiple day parts 1702. In the illustrated example, Monday through Friday are divided into the same day part segments or partitions (e.g., day parts having the same durations and bounded by the same day part start times and day part end times). Alternatively, each day of the week 1700, or any combination thereof, may be divided into different day parts. In the illustrated example, the day categories 1704 are divided into three categories, "weekday," "Saturday," and "Sunday." Alternatively, the day categories 1704 may include a separate category for each day of the week (e.g., a "Monday" category, a "Tuesday" category, etc.). In some examples, day categories may have different day groupings based on similar characteristics (e.g., temporal proximity, audience viewing habits, etc.) between the different days that are grouped together. For example, the day categories 1704 may include an "early week" category (e.g., including Monday and Tuesday), a "mid-week" category (e.g., including Wednesday and Thursday), a "late week" category (e.g., including Friday), and a "weekend" category (e.g., including Saturday and Sunday).

Figure 18:
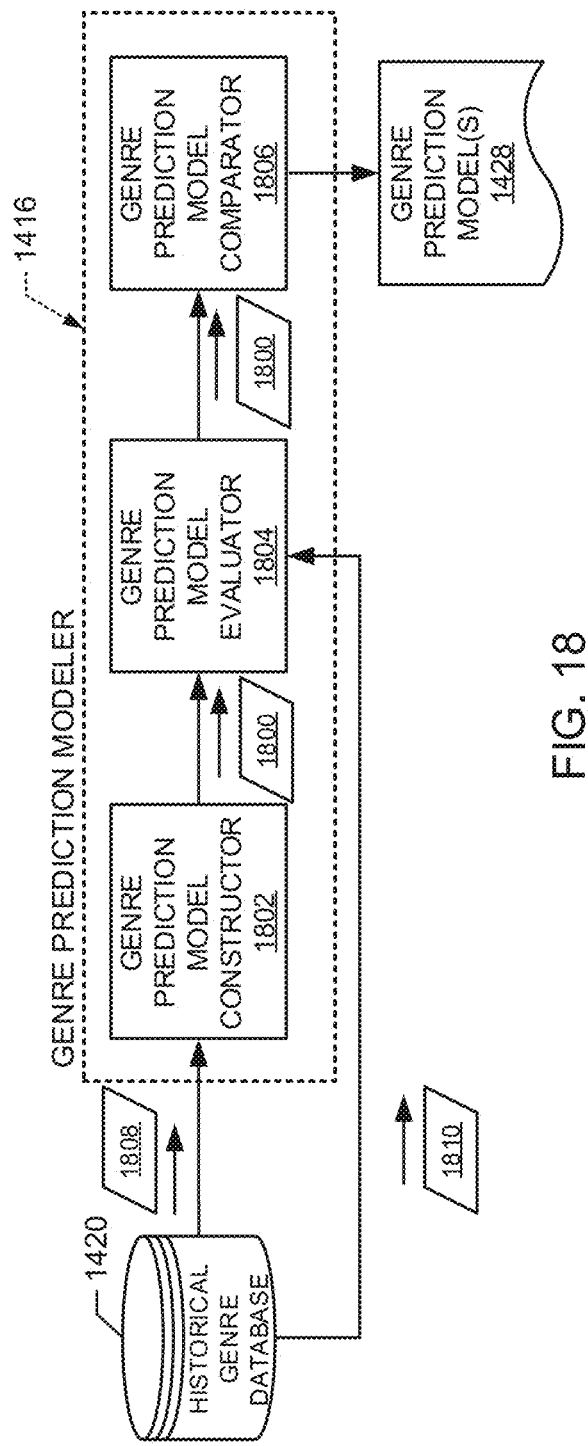
FIG. 18 illustrates an example of the genre modeler of FIG. 14 which may be used to construct a genre model.

FIG. 18 illustrates an example of the genre prediction modeler 1416 of FIG. 14 to construct genre prediction model(s) 1428 to be used by the genre predictor 1418 of FIG. 14. In the illustrated example, the genre prediction modeler 1416 includes an example genre prediction model constructor 1802, an example genre prediction model evaluator 1804, and an example genre prediction model comparator 1806. The example genre prediction model constructor 1802 uses data sets from the historical genre database 1420 to generate one or more candidate models using different modeling techniques. Example modeling techniques that may be used to implement the genre prediction modeler 1416 include logistic regression, linear discriminant analysis, quadratic discriminant analysis, k-nearest neighbor, etc. The example model constructor 1802 retrieves an example training dataset 1808 from the historical genre database 1420. In the illustrated example, the training dataset 1808 is used to build predictive relationships between inputs (e.g., the variables included in the categorized impression data 1504 of FIG. 15) to the genre prediction model(s) 1428 and the output of the genre prediction model(s) 1428 (e.g., the predicted genre). The example training dataset 1808 includes categorized impression data (e.g., the example market identifier 1600, the example station ID 1602, the example affiliate ID 1604, the example day category 1614, the example day part 1616, and the example duration 1618) and an assigned genre. Using the training data set 1808, the example genre prediction model constructor 1802 generates one or more candidate models 1800. A candidate model 1800 is a genre prediction model that is being evaluated for its suitableness (e.g., accuracy) to be used by the genre analyzer 1502 (FIG. 15) to assign genre to the non-genre impression records 1501 (FIG. 14). In some examples, the genre prediction model constructor 1802, after generating an example candidate model 1800, calculates a correct classification rate (CCR) using the training data set 1808. In some examples, the CCR is the percentage of impressions in the training data set 1808 correctly predicted by the candidate model.

In the example illustrated in FIG. 18, the genre prediction model evaluator 1804 receives and/or retrieves the candidate models 1800 generated by the genre prediction model constructor 1802. The genre prediction model evaluator 1804 also retrieves a test data set 1810 from the historical genre database 1420. The example genre prediction model evaluator 1804 validates the candidate models 1800 using the test data set 1810. In some examples, the genre prediction model evaluator 1804 calculates CCRs for the candidate models using the test data set 1810. In some such examples, the genre prediction model evaluator 1804 calculates CCRs for the genres of interest included in the test data set 1810.

In the example illustrated in FIG. 18, the genre prediction model comparator 1806 selects one or more of the candidate models 1800 to be the genre prediction model(s) 1428 using selection criteria defined by the AME 108 (FIG. 14). In some examples, the selection criteria includes highest CCR, shortest processing time, least resource requirements, etc. In some examples, the genre prediction model comparator 1806 selects the candidate model 1800 with the highest CCR.

While an example manner of implementing the genre prediction modeler 1416 of FIG. 14 is illustrated in FIG. 18, one or more of the elements, processes and/or devices illustrated in FIG. 18 may be combined, divided, re-arranged, omitted, eliminated and/or implemented in any other way. Further, the example genre prediction model constructor 1802, the example genre prediction model evaluator 1804, the example genre prediction model comparator 1806 and/or, more generally, the example genre prediction modeler 1416 of FIG. 14 may be implemented by hardware, software, firmware and/or any combination of hardware, software and/or firmware. Thus, for example, any of the example genre prediction model constructor 1802, the example genre prediction model evaluator 1804, the example genre prediction model comparator 1806 and/or, more generally, the example genre prediction modeler 1416 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example genre prediction model constructor 1802, the example genre prediction model evaluator 1804, the example genre prediction model comparator 1806, and/or the example genre prediction modeler 1416 is/are hereby expressly defined to include a tangible computer readable storage device or storage disk such as a memory, a digital versatile disk (DVD), a compact disk (CD), a Blu-ray disk, etc. storing the software and/or firmware. Further still, the example genre prediction modeler 1416 may include one or more elements, processes and/or devices in addition to, or instead of, those illustrated in FIG. 18, and/or may include more than one of any or all of the illustrated elements, processes and devices.

Figure 19:
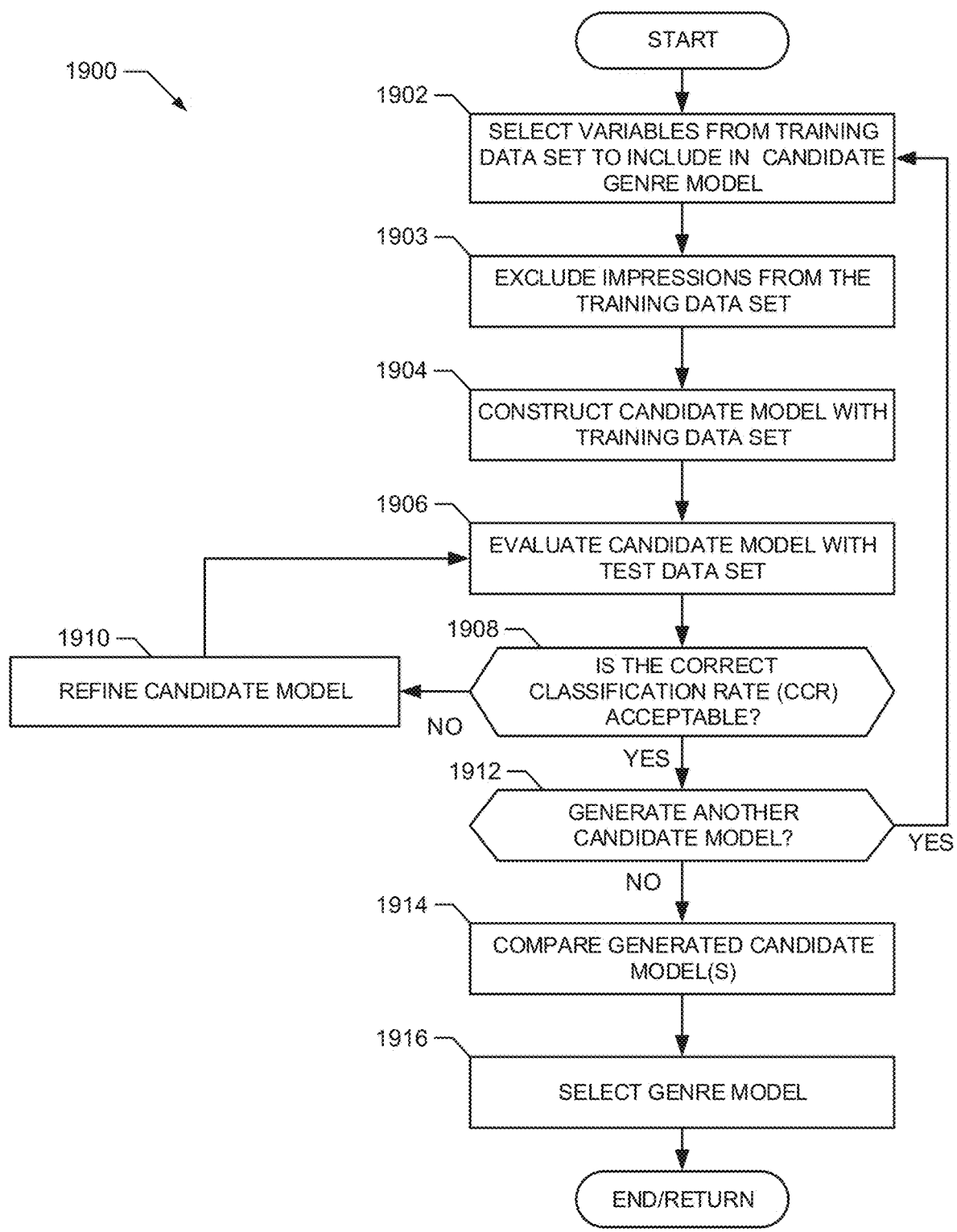
FIG. 19 is a flow diagram representative of example machine readable instructions that may be executed to implement the example genre modeler of FIGS. 14 and 18 to construct a genre model.
Figure 20:
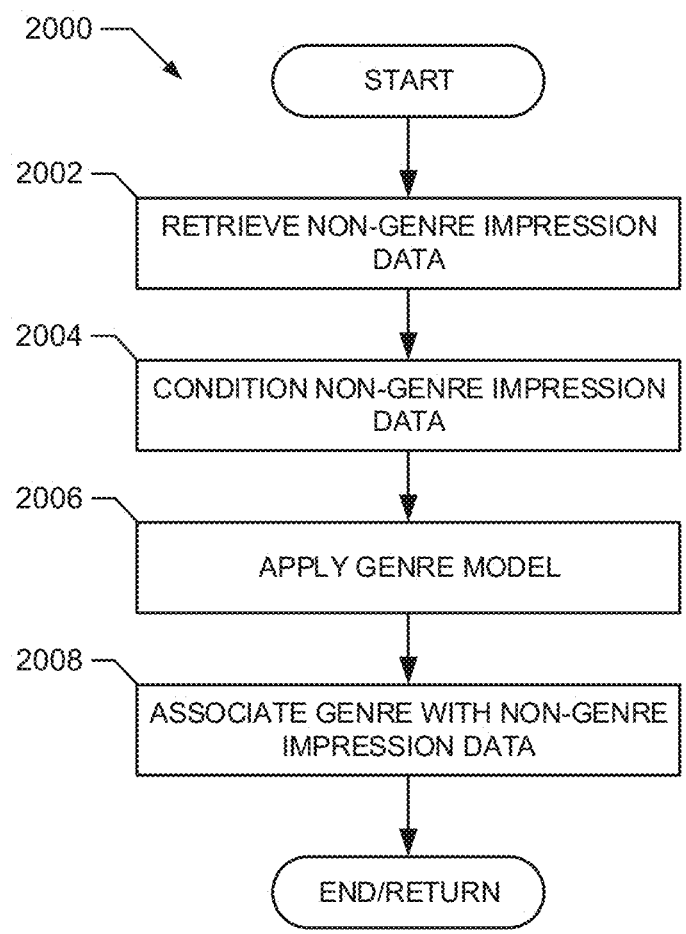
FIG. 20 is a flow diagram representative of example machine readable instructions that may be executed to implement the example genre predictor of FIGS. 14 and 15 to assign a genre to collected media impression data.

A flowchart representative of example machine readable instructions for implementing the example genre prediction modeler 1416 of FIGS. 14 and 18 is shown in FIG. 19. A flowchart representative of example machine readable instructions for implementing the example genre predictor 1418 of FIGS. 14 and 15 is shown in FIG. 20. In these examples, the machine readable instructions comprise one or more program(s) for execution by a processor such as the processor 2112 shown in the example processor platform 2100 discussed below in connection with FIG. 21. The program(s) may be embodied in software stored on a tangible computer readable storage medium such as a CD-ROM, a floppy disk, a hard drive, a digital versatile disk (DVD), a Blu-ray disk, or a memory associated with the processor 2112, but the entire program(s) and/or parts thereof could alternatively be executed by a device other than the processor 2112 and/or embodied in firmware or dedicated hardware. Further, although the example program(s) are described with reference to the flowcharts illustrated in FIGS. 19 and 20, many other methods of implementing the example genre predictor 1418 and/or the example genre prediction modeler 1416 may alternatively be used. For example, the order of execution of the blocks may be changed, and/or some of the blocks described may be changed, eliminated, or combined.

As mentioned above, the example processes of FIGS. 19 and/or 20 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). Additionally or alternatively, the example processes of FIGS. 19 and/or 20 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

FIG. 19 is a flow diagram representative of example machine readable instructions 1900 that may be executed to implement the example genre prediction modeler 1416 of FIGS. 14 and 18 to construct genre prediction model(s) (e.g., the genre prediction model(s) 1428 of FIG. 18) to be used for predicting genre for non-genre impressions logged based on the non-genre impression data 1402 (FIG. 14). Initially, at block 1902, the genre prediction model constructor 1802 (FIG. 18) selects variables or parameters (e.g., a market identifier, a station ID, an affiliate ID, a day category, a day part, and a duration) included in impressions in a training data set (e.g., the training data set 1808 of FIG. 18). In some examples, the genre prediction model constructor 1802 selects variables by performing statistical significance testing (e.g., calculating p-values, performing a chi-squared test, etc.) on the variables. At block 1903, the example genre prediction model constructor 1802 excludes impressions from the training data set 1808 based on selection criteria (e.g., exclude impressions associated with genres not of interest, exclude impressions with durations of exposure or access below a threshold, etc.). For example, some of the records 1430 (FIG. 14) in the historical genre database 1420 (FIG. 14) may be categorized in an "unclassified" genre. In some instances, it may not be desirable for a genre prediction model 1428 to predict "unclassified" genre for impressions. In such an example, to prevent the genre prediction model 1428 from assigning non-genre impressions 1402

(FIG. 14) to the "unclassified" genre, the records 1430 in the historical genre database 1420 categorized in an "unclassified" genre are excluded from the training data set 1808.

At block 1904, the example genre prediction model constructor 1802 constructs a candidate model 1800 (FIG. 18) using the variables or parameters selected at block 1902 based on the training data set 1808. Example modeling techniques that may be used to generate candidate models 1800 include logistic regression, linear discriminant analysis, quadratic discriminant analysis, k-nearest neighbor, etc. For example, the genre prediction model constructor 1802 may construct a model using a k-nearest neighbor algorithm with k equal to nine. In some examples, the genre prediction model constructor 1802 calculates the CCR of the candidate model 1800 using the training data set 1808. At block 1906, the genre prediction model evaluator 1804 (FIG. 18) evaluates the candidate model 1800 generated at block 1904. In some examples, the genre prediction model evaluator 1804 retrieves test data set(s) 1810 (FIG. 18) from the historical genre database 1420 (FIG. 14) and calculates the CCR(s) of the candidate model 1800 using the test data set(s) 1810. In some such examples, the genre prediction model evaluator 1804 calculates separate CCR(s) for each genre represented in the test data set(s) 1810.

At block 1908, the genre prediction model evaluator 1804 determines whether the CCR(s) generated at block 1906 are acceptable. If the CCR(s) are acceptable, program control advances to block 1912. Otherwise, if the CCR(s) are not acceptable, program control advances to block 1910. At block 1910, the genre prediction model constructor 1802 refines or adjusts the candidate model 1800 generated at block 1904. In some examples, the genre prediction model constructor 1802 adjusts the model parameters (e.g., selects a different value for k, etc.), adjusts the input variables (e.g., uses different day categories, adds and/or removes variables, etc.), and/or adjusts the training dataset 1808 (e.g., increases the size of the training dataset 1808, changes the composition of the training dataset 1808 to include impression that were previously excluded based on, for example, type of genre, etc.).

At block 1912, the genre prediction model evaluator 1804 determines whether another candidate model 1800 is to be generated. In some examples, the genre prediction model evaluator 1804 uses a CCR threshold to determine whether another candidate model 1800 is to be constructed. In some examples, the genre prediction model evaluator 1804 evaluates the candidate model 1800 based on processing speed and/or computing resource requirements. If another candidate model 1800 is to be constructed, program control returns to block 1902. Otherwise, if another candidate model 1800 is not to be constructed, program control advances to block 1914. At block 1914, the genre prediction model comparator 1806 (FIG. 18) compares the candidate models 1800 generated by the genre prediction model constructor 1802. In some examples, the genre prediction model comparator 1806 compares the CCRs of the candidate models 1800. In some such examples, for the genres of interest, the genre prediction model comparator 1806 may compare separate CCRs corresponding to the candidate models 1800. For example, a first candidate model may have an overall CCR (e.g., the average of the CCRs for the genre of interest, etc.) of 70%, but a CCR for the "family" genre of 30%. A second candidate model may have an overall CCR of 65%, but a CCR for the "family" genre of 57%.

At block 1916, the genre prediction model comparator 1806 selects a candidate genre prediction model 1800 to be the genre prediction model 1428 to be used by the genre prediction model predictor 1418. In some examples, the genre prediction model comparator 1806 selects the candidate model 1800 with the highest overall CCR. For example, from the above example, the genre prediction model comparator 1806 would select the first candidate model. In some examples, the genre prediction model comparator 1806 selects the candidate model 1800 with highest CCR in a particular genre of interest. For example, from the above example, if the "family" genre was of particular interest, the genre prediction model comparator 1806 would select the second candidate model because the "family" genre CCR of the second candidate model is higher than the "family" genre CCR of the first candidate model. In some examples, the genre prediction model comparator 1806 selects a candidate model 1800 based on performance factors (e.g., required processing power to predict genre, required processing speed to predict genre, etc.). The example program 1900 of FIG. 19 then ends.

FIG. 20 is a flow diagram representative of example machine readable instructions 2000 that may be executed to implement the example genre predictor 1418 of FIGS. 14 and 15 to predict genre of impressions collected for a local television program that is not encoded with genre information (e.g., non-genre impression data 1402 of FIG. 14). At block 2002, the example data categorizer 1500 (FIGS. 15 and 16) retrieves non-genre impression data (e.g., the non-genre impression records 1501 logged based on the non-genre impression data 1402 of FIGS. 14 and 15) from the collection database 1414 (FIGS. 14 and 15). At block 2004, the data categorizer 1500 transforms the non-genre impression records 1501 into categorized impression data 1504 (FIG. 15). In some examples, the data categorizer 1500 uses timestamp values (e.g., the start timestamp 1606 and the end timestamp 1608 of FIG. 16) included in the non-genre impression records 1501 to generate variables used by a genre prediction model (e.g., the genre prediction model 1428 of FIGS. 14 and 18) to categorize the non-genre impression records 1501 to be input into the genre prediction model 1428. For example, the data categorizer 1500 may generate a day category value 1614 (FIG. 16), a day part value 1616 (FIG. 16), and/or a duration value 1618 (FIG. 16).

At block 2006, the genre analyzer 1502 (FIG. 15) applies the genre prediction model 1428 generated by the genre prediction modeler 1416 (FIGS. 14 and 18) to the categorized impression data 1504 to predict genre information. In some examples, the genre predictions may include an accuracy level. In some such examples, the accuracy level may be based on the CCR(s) of the genre prediction model 1428 calculated by the genre prediction modeler 1416. At block 2008, the genre analyzer 1502 associates the genre predictions with the non-genre impression data 1402 to create the predicted-genre impressions 1424 (FIGS. 14 and 15). In some examples, the genre analyzer 1502 stores the predicted-genre impressions 1424 in the prediction database 1422 (FIGS. 14 and 15). Alternatively or additionally, the genre analyzer 1502 includes the predicted-genre impressions 1424 in the prediction report 1426 (FIGS. 14 and 15). The example program 2000 of FIG. 20 then ends.

Figure 21:
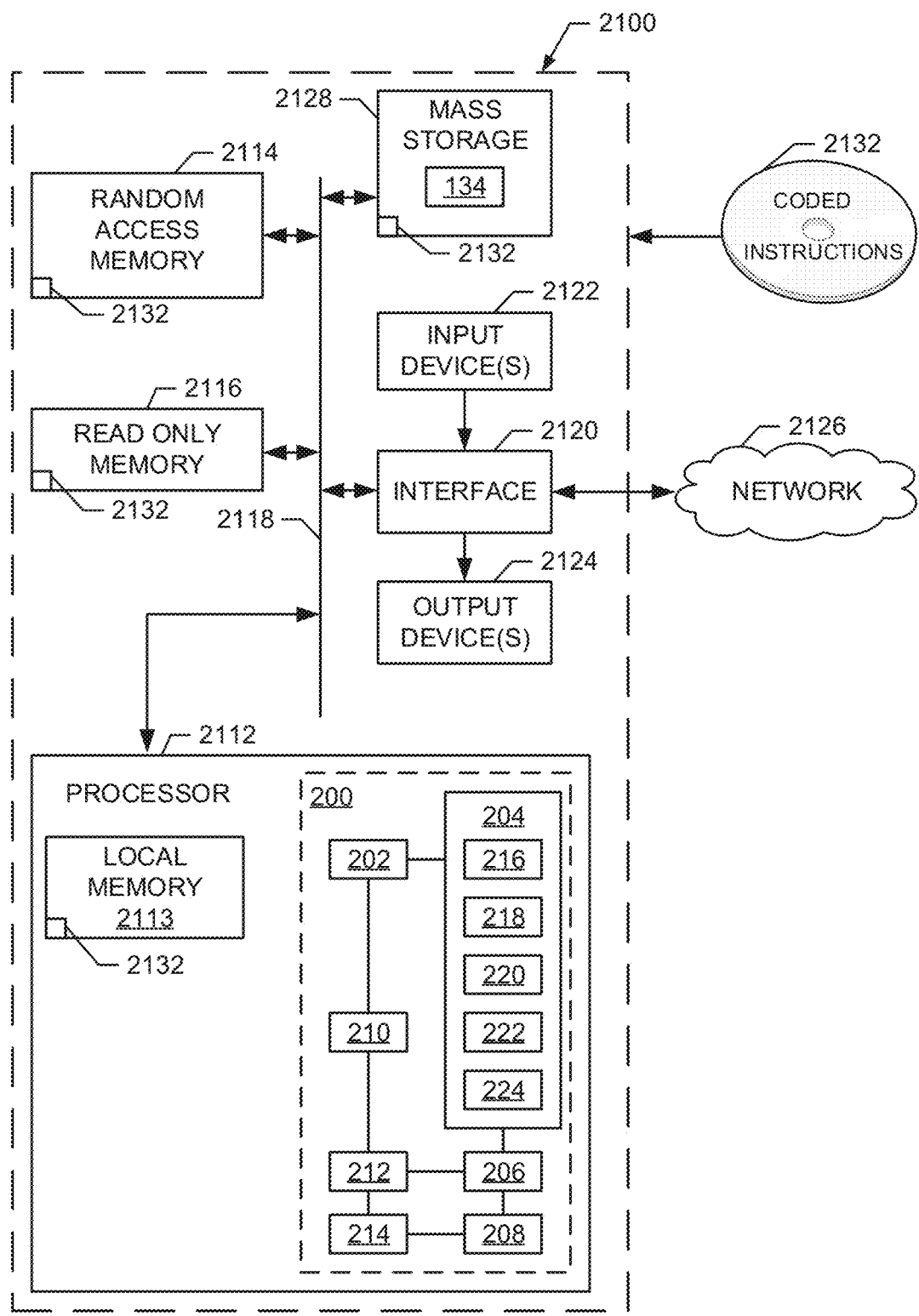
FIG. 21 is an example processor platform that may be used to execute the example instructions of FIGS. 4-13 to implement example apparatus and systems disclosed herein.

FIG. 21 is a block diagram of an example processor platform 1200 capable of executing the instructions of FIGS. 4, 5, 6, 7, 8, 9, 10, 11, 12, and/or 13 to implement the example calibration data collector 202, the example sharing matrix generator 204, the example misattribution corrector 206, the example impression information collector 208, the example non-coverage calculator 210, the example non-coverage corrector 212, the example impression information adjuster 214, the example household distribution generator 216, the example aggregated distribution generator 218, the example matrix corrector 220, the example matrix normalizer 222, the example co-viewing matrix generator 224 and/or, more generally, the example impression data compensator 200 of FIG. 2. The processor platform 2100 can be, for example, a server, a personal computer, a mobile device (e.g., a cell phone, a smart phone, a tablet such as an iPad™), an Internet appliance, or any other type of computing device.

The processor platform 2100 of the illustrated example includes a processor 2112. The processor 2112 of the illustrated example is hardware. For example, the processor 2112 can be implemented by one or more integrated circuits, logic circuits, microprocessors or controllers from any desired family or manufacturer. The example processor 2100 of FIG. 21 may implement the example calibration data collector 202, the example sharing matrix generator 204, the example misattribution corrector 206, the example impression information collector 208, the example non-coverage calculator 210, the example non-coverage corrector 212, the example impression information adjuster 214, the example household distribution generator 216, the example aggregated distribution generator 218, the example matrix corrector 220, the example matrix normalizer 222, and/or the example co-viewing matrix generator 224.

The processor 2112 of the illustrated example includes a local memory 2113 (e.g., a cache). The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a universal serial bus (USB), and/or a PCI express interface.

In the illustrated example, one or more input devices 2122 are connected to the interface circuit 2120. The input device(s) 2122 permit(s) a user to enter data and commands into the processor 2112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2124 are also connected to the interface circuit 2120 of the illustrated example. The output devices 2124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2120 of the illustrated example, thus, typically includes a graphics driver card, a graphics driver chip or a graphics driver processor.

The interface circuit 2120 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a digital subscriber line (DSL), a telephone line, coaxial cable, a cellular telephone system, etc.).

The processor platform 2100 of the illustrated example also includes one or more mass storage devices 2128 for storing software and/or data. The example mass storage device 2128 of FIG. 21 may implement the AME media impressions store 134 of FIG. 1. Examples of such mass storage devices 2128 include floppy disk drives, hard drive disks, compact disk drives, Blu-ray disk drives, RAID systems, and digital versatile disk (DVD) drives.

The coded instructions 2132 of FIGS. 4, 5, 6, 7, 8, 9, 10, 11, 12, and/or 13 may be stored in the mass storage device 2128, in the volatile memory 2114, in the non-volatile memory 2116, and/or on a removable tangible computer readable storage medium such as a CD or DVD.

Figure 22:
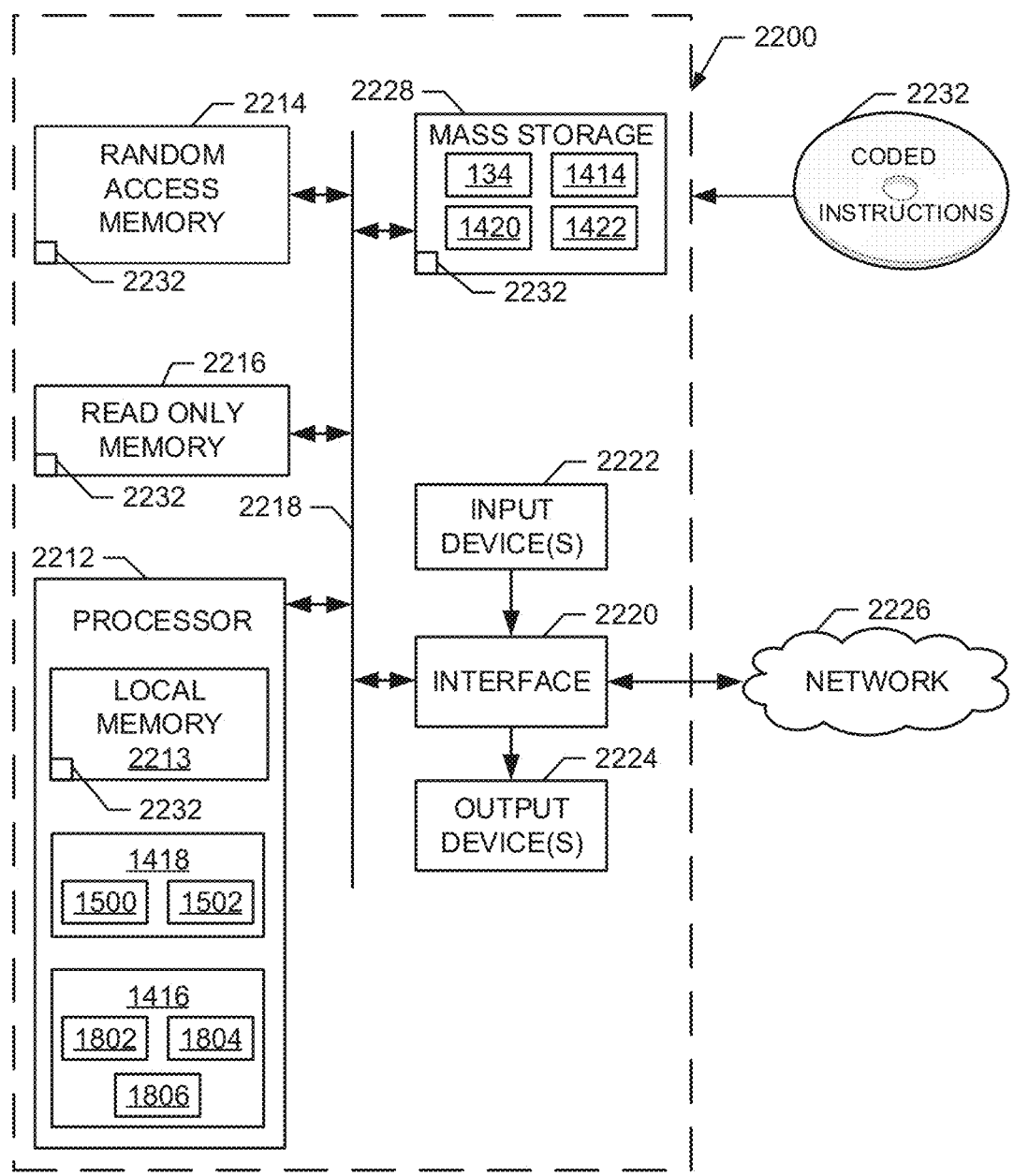
FIG. 22 is another example processor platform that may be used to execute the example instructions of FIGS. 19 and/or 20 to implement example apparatus and systems disclosed herein.

FIG. 22 is a block diagram of an example processor platform 1200 capable of executing the instructions of FIGS. 19 and/or 20 to implement the example collection database 1414, the example genre prediction modeler 1416, the example genre predictor 1418, the example historical genre database 1420, the example prediction database 1422, the example data categorizer 1500, the example genre analyzer 1502, the example genre prediction model constructor 1802, the example genre prediction model evaluator 1804, the example genre prediction model comparator 1806 and/or, more generally, the example audience measurement entity 108 of FIG. 1. The processor platform 2200 can be, for example, a server, a personal computer, a mobile device (e.g., a cell phone, a smart phone, a tablet such as an iPad™), an Internet appliance, or any other type of computing device.

The processor platform 2200 of the illustrated example includes a processor 2212. The processor 2212 of the illustrated example is hardware. For example, the processor 2212 can be implemented by one or more integrated circuits, logic circuits, microprocessors or controllers from any desired family or manufacturer. The example processor 2212 of FIG. 22 may implement the example genre prediction modeler 1416, the example genre predictor 1418, the example data categorizer 1500, the example genre analyzer 1502, the example genre prediction model constructor 1802, the example genre prediction model evaluator 1804, and/or the example genre prediction model comparator 1806.

The processor 2212 of the illustrated example includes a local memory 2213 (e.g., a cache). The processor 2212 of the illustrated example is in communication with a main memory including a volatile memory 2214 and a non-volatile memory 2216 via a bus 2218. The volatile memory 2214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2216 may be implemented by flash memory and/or any other desired type of memory device. Access to the main memory 2214, 2216 is controlled by a memory controller.

The processor platform 2200 of the illustrated example also includes an interface circuit 2220. The interface circuit 2220 may be implemented by any type of interface standard, such as an Ethernet interface, a universal serial bus (USB), and/or a PCI express interface.

In the illustrated example, one or more input devices 2222 are connected to the interface circuit 2220. The input device(s) 2222 permit(s) a user to enter data and commands into the processor 2212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2224 are also connected to the interface circuit 2220 of the illustrated example. The output devices 2224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2220 of the illustrated example, thus, typically includes a graphics driver card, a graphics driver chip or a graphics driver processor.

The interface circuit 2220 of the illustrated example also includes a communication device such as a transmitter, a receiver, a transceiver, a modem and/or network interface card to facilitate exchange of data with external machines (e.g., computing devices of any kind) via a network 2226 (e.g., an Ethernet connection, a digital subscriber line (DSL), a telephone line, coaxial cable, a cellular telephone system, etc.).

The processor platform 2200 of the illustrated example also includes one or more mass storage devices 2228 for storing software and/or data. The example mass storage device 2228 of FIG. 22 may implement the AME media impressions store 134, the example collection database 1414, the example historical genre database 1420, and/or the example prediction database 1422. Examples of such mass storage devices 2228 include floppy disk drives, hard drive disks, compact disk drives, Blu-ray disk drives, RAID systems, and digital versatile disk (DVD) drives.

The coded instructions 2232 of FIGS. 19 and/or 20 may be stored in the mass storage device 2228, in the volatile memory 2214, in the non-volatile memory 2216, and/or on a removable tangible computer readable storage medium such as a CD or DVD.

From the foregoing, it will be appreciate that methods, apparatus and articles of manufacture have been disclosed which enhance the operations of a computer to improve the accuracy of impression-based data such as unique audience, impression counts, and duration units so that computers and processing systems therein can be relied upon to produce audience analysis information with higher accuracies. In some examples, computer operations can be made more efficient based on the above equations and techniques for determining misattribution-corrected and/or non-coverage-corrected unique audience sizes, misattribution-corrected and/or non-coverage-corrected impression counts, and/or misattribution-corrected and/or non-coverage-corrected duration units. That is, through the use of these processes, computers can operate more efficiently by relatively quickly determining parameters and applying those parameters through the above disclosed techniques to determine the misattribution-corrected and/or non-coverage-corrected data. For example, using example processes disclosed herein, a computer can more efficiently and effectively correct misattribution errors (e.g., apply the misattribution correction matrix of Table 14 above to impressions, unique audience sizes, and/or duration units) and/or correct non-coverage errors (e.g., apply the non-coverage factors or the alpha factors to impressions, unique audience sizes, and/or duration units) in development or test data logged by the AME 108 and the database proprietors 104a-b without using large amounts of network communication bandwidth (e.g., conserving network communication bandwidth) and without using large amounts of computer processing resources (e.g., conserving processing resources) to continuously communicate with individual online users to request survey responses about their online media access habits and without needing to rely on such continuous survey responses from such online users. Survey responses from online users can be inaccurate due to inabilities or unwillingness of users to recollect online media accesses. Survey responses can also be incomplete, which could require additional processor resources to identify and supplement incomplete survey responses. As such, examples disclosed herein more efficiently and effectively determine misattribution-corrected data. Such misattribution-corrected data is useful in subsequent processing for identifying exposure performances of different media so that media providers, advertisers, product manufacturers, and/or service providers can make more informed decisions on how to spend advertising dollars and/or media production and distribution dollars.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
an impression collector to:
access, at a first internet domain, a first network communication received at a first server from a first computing device of a first type of computing device, the first network communication indicative of access to media at the first computing device; and
send, from the first server, a second network communication to request demographic information corresponding to the first network communication and third network communications received at the first internet domain from a second computing device of the first type of computing device;
an impression information collector to access a count of media impressions occurring on the first type of computing device, a first portion of the media impressions corresponding to first persons for whom first demographic information is recognizable by a second server of a database proprietor, and a non-coverage error resulting from the second server of the database proprietor unable to access second demographic information of second persons corresponding to a second portion of the media impressions; and
a non-coverage corrector to correct the non-coverage error resulting from the second server of the database proprietor by determining the second demographic information for the second portion of the media impressions based on a first probability that the media corresponding to the media impressions is accessed on the first type of computing device and based on a second probability that the media is accessed on a second type of device, at least one of the impression collector, the impression information collector or the non-coverage corrector implemented by a logic circuit.

2. The apparatus as defined in claim 1, further including a non-coverage calculator to multiply (1) a ratio of the first probability to the second probability with (2) a number of the media impressions attributed to a first demographic group.

3. The apparatus as defined in claim 2, wherein the first probability is a likelihood that a person in the first demographic group accesses the media on the first type of computing device and the second probability is a likelihood that the person in the first demographic group accesses the media on the second type of device.

4. The apparatus as defined in claim 2, further including a misattribution corrector to adjust the media impressions to compensate for incorrect attribution of a subset of the media impressions to third persons in a second demographic group, the number of the media impressions attributed to the first demographic group being determined from the subset of the media impressions that are adjusted to compensate for the incorrect attribution.

5. The apparatus as defined in claim 1, wherein the first type of computing device includes a mobile device and the second type of device includes a television.

6. The apparatus as defined in claim 1, wherein the first type of computing device includes at least one of a smartphone, a tablet computer, or a portable media player.

7. The apparatus as defined in claim 1, further including a non-coverage calculator to calculate the first probability and the second probability based on survey responses to a survey of people, the non-coverage calculator to calculate the first probability by determining, from the survey responses, weights associated with at least one of a demographic group, a media category, a type of computing device, or a geographic region, the weights indicating respective probabilities of accessing the media associated with the media impressions on a device type of interest.

8. The apparatus as defined in claim 7, wherein the survey is of at least one of a random panel or a panel of audience members maintained by an audience measurement entity.

9. The apparatus as defined in claim 1, wherein the first probability and the second probability correspond to a media category of the media.

10. The apparatus as defined in claim 9, wherein the media category is at least one of comedy, drama, political, reality, or a combination media category.

11. The apparatus as defined in claim 1, wherein the non-coverage corrector is to determine the second demographic information for the second portion of the media impressions by:
  determining proportions of the media impressions attributable to different demographic groups corresponding to the persons; and
  scaling the proportions of the media impressions to the second portion of the media impressions.

12. A tangible computer readable storage medium comprising computer readable instructions which, when executed, cause a first server to at least:
  access, at a first internet domain, a first network communication from a first computing device of a first type of computing device, the first network communication indicative of access to media at the first computing device;
  send a second network communication requesting demographic information corresponding to the first network communication and third network communications received at the first internet domain from a second computing device of the first type of computing device;
  access a count of media impressions occurring on the first type of computing device, a first portion of the media impressions corresponding to first persons for whom first demographic information is recognizable by a second server of a database proprietor, and a non-coverage error resulting from the second server of the database proprietor unable to access second demographic information of second persons corresponding to a second portion of the media impressions; and
  correct the non-coverage error resulting from the second server of the database proprietor by determining the second demographic information for the second portion of the media impressions based on a first probability that the media corresponding to the media impressions is accessed on the first type of computing device and based on a second probability that the media is accessed on a second type of device.

13. The tangible computer readable storage medium as defined in claim 12, wherein the instructions are to cause the first server to determine the second demographic information by multiplying (1) a ratio of the first probability to the second probability with (2) a number of the media impressions attributed to a first demographic group.

14. The tangible computer readable storage medium as defined in claim 13, wherein the first probability is a likelihood that a person in the first demographic group accesses the media on the first type of computing device and the second probability is a likelihood that the person in the first demographic group accesses the media on the second type of device.

15. The tangible computer readable storage medium as defined in claim 13, wherein the instructions are further to cause the first server to adjust the media impressions to compensate for incorrect attribution of a subset of the media impressions to third persons in a second demographic group, the number of the media impressions attributed to the first demographic group being determined from the subset of the media impressions that are adjusted to compensate for the incorrect attribution.

16. The tangible computer readable storage medium as defined in claim 12, wherein the first type of computing device includes a mobile device and the second type of device includes a television.

17. The tangible computer readable storage medium as defined in claim 12, wherein the first type of computing device includes at least one of a smartphone, a tablet computer, or a portable media player.

18. The tangible computer readable storage medium as defined in claim 12, wherein the first probability and the second probability correspond to a media category of the media.

19. The tangible computer readable storage medium as defined in claim 18, wherein the media category is at least one of comedy, drama, political, reality, or a combination media category.

20. The tangible computer readable storage medium as defined in claim 12, wherein the instructions are further to cause the first server to, before the determining of the second demographic information, adjust the media impressions for ones of the media impressions being incorrectly attributed to persons not having caused the ones of the media impressions.

21. The tangible computer readable storage medium as defined in claim 20, wherein the instructions are further to cause the first server to calculate the first probability and the second probability based on survey responses to a survey of people, the instructions to cause the first server to calculate the first probability by determining, from the survey responses, weights associated with at least one of a demographic group, a media category, a type of computing device, or a geographic region, the weights indicating respective probabilities of accessing the media associated with the media impressions on a device type of interest.

22. The tangible computer readable storage medium as defined in claim 21, wherein the survey is of at least one of a random panel or a panel of audience members maintained by an audience measurement entity.

23. The tangible computer readable storage medium as defined in claim 12, wherein the instructions are to cause the first server to determine the second demographic information for the second portion of the media impressions by:
   determining proportions of the media impressions attributable to different demographic groups corresponding to the persons; and
   scaling the proportions of the media impressions to the second portion of the media impressions.

24. A method, comprising:
   receiving, at a first server at a first internet domain, a first network communication from a first computing device of a first type of computing device, the first network communication indicative of access to media at the first computing device;
   sending, by executing an instruction with the first server, a second network communication from the first server to request demographic information corresponding to the first network communication and third network communications received at the first internet domain from second computing devices of the first type of computing device;
   accessing, by executing an instruction with at least one processor, a count of media impressions occurring on the first type of computing device, a first portion of the media impressions corresponding to first persons for whom first demographic information is recognizable by a second server of a database proprietor, and a non-coverage error resulting from the second server of the database proprietor unable to access second demographic information of second persons corresponding to a second portion of the media impressions; and
   correcting, by executing an instruction with the at least one processor, the non-coverage error resulting from the second server of the database proprietor by determining the second demographic information for the second portion of the media impressions based on (1) the first demographic information for the first portion provided by the second server of the database proprietor in response to the second network communication, (2) a first probability that the media corresponding to the media impressions is accessed on the first type of computing device, and (3) a second probability that the media is accessed on a second type of device.

* * * * *